(12) United States Patent
Mertens

(10) Patent No.: US 9,754,629 B2
(45) Date of Patent: Sep. 5, 2017

(54) METHODS AND APPARATUSES FOR PROCESSING OR DEFINING LUMINANCE/COLOR REGIMES

(71) Applicant: KONINKLIJKE PHILIPS N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/197,959

(22) Filed: Jun. 30, 2016

(65) Prior Publication Data

US 2016/0307602 A1   Oct. 20, 2016

Related U.S. Application Data

(63) Continuation-in-part of application No. 13/577,930, filed as application No. PCT/IB2011/050767 on Feb. 24, 2011.

(30) Foreign Application Priority Data

Mar. 3, 2010   (EP) .................................... 10155277

(51) Int. Cl.
  *G11B 27/11*    (2006.01)
  *H04N 19/46*    (2014.01)
  (Continued)

(52) U.S. Cl.
  CPC ............ *G11B 27/11* (2013.01); *G11B 27/031* (2013.01); *H04N 5/20* (2013.01); *H04N 5/77* (2013.01);
  (Continued)

(58) Field of Classification Search
  CPC .................................. G11B 27/11; H04N 9/64
  See application file for complete search history.

(56) References Cited

U.S. PATENT DOCUMENTS 5,420,638 A   5/1995   Riglet et al.
5,717,838 A   2/1998   LeClair
(Continued)

FOREIGN PATENT DOCUMENTS

EP   1845704 A2   10/2007
JP   H0662385 A    3/1994
(Continued)

OTHER PUBLICATIONS

Anonymous: Autodesk Lustre 2010 User Guide, Version 1; Autodesk Inc., Oct. 2009, Retrieved from the Internet: http://download.autodesk.com/us/systemdocs/pdf/lustre2010_user_guide.pdf, retrieved on Jun. 10, 2011, 818 pages.

*Primary Examiner* — Dave Czekaj
*Assistant Examiner* — Berteau Joisil

(57) ABSTRACT

To allow a better coordination between an image creation artist such as a movie director of photography and the final viewer, via a receiving-side display and its corresponding image processing, a method of adding display rendering specification information to an input image signal (I) comprises determining descriptive data (D) that includes at least identification information for at least one luminance regime subset of pixels of an input image; and encoding the descriptive data (D) into an output description data signal (DDO), relatable to an output image signal (O) based upon an input image signal (I), of the descriptive data (D) in a technical format standardized to be intended for use by a receiving-side display to control its image processing for changing the color properties of its rendered images.

34 Claims, 17 Drawing Sheets

(51) Int. Cl.
*H04N 11/24* (2006.01)
*G11B 27/031* (2006.01)
*H04N 5/20* (2006.01)
*H04N 9/68* (2006.01)
*H04N 5/77* (2006.01)
*H04N 9/82* (2006.01)

(52) U.S. Cl.
CPC ............ *H04N 9/68* (2013.01); *H04N 9/8205* (2013.01); *H04N 11/002* (2013.01); *H04N 19/46* (2014.11); *G09G 2320/0271* (2013.01); *G09G 2320/0276* (2013.01)

(56) References Cited

U.S. PATENT DOCUMENTS

| | | |
|---|---|---|
| 2001/0004739 A1 | 6/2001 | Sekiguchi et al. |
| 2005/0073527 A1 | 4/2005 | Beardow |
| 2005/0117798 A1 | 6/2005 | Patton et al. |
| 2007/0061023 A1 | 3/2007 | Hoffberg et al. |
| 2007/0268411 A1 | 11/2007 | Rehm et al. |

FOREIGN PATENT DOCUMENTS

| | | |
|---|---|---|
| JP | 2003216970 A | 1/2002 |
| JP | 2008515349 A | 5/2008 |
| JP | 2008259161 A | 10/2008 |
| WO | 2007023425 A2 | 3/2007 |
| WO | 2007097803 A1 | 8/2007 |
| WO | 2007113754 A1 | 10/2007 |
| WO | 2009095732 A1 | 8/2009 |

METHODS AND APPARATUSES FOR PROCESSING OR DEFINING LUMINANCE/COLOR REGIMES

CROSS REFERENCE TO RELATED APPLICATION

This application is a continuation-in-part application of co-pending U.S. patent application Ser. No. 13/577,930, filed on Aug. 9, 2012, which is the National Stage Application of PCT/IB2011/050767, filed Feb. 24, 2011, which claims the priority of EP Application No. 10155277.6, filed Mar. 3, 2010, the entire contents of which are incorporated herein by reference.

FIELD OF THE INVENTION

The invention relates to a method of adding image defining information to an input image signal, an image analysis apparatus for adding image defining information to image pixel information of an input image signal, and similarly corresponding to what this method and apparatus do at the image production side, a method of processing an input image signal to be rendered based on image defining information related to the input image signal, an apparatus for processing an input image signal to be rendered based on image defining information related to the input image signal, and for coordinating the desired rendering on the image production side and the actual rendering on the display side, and an image signal comprising luminance/color regime descriptions, which will typically be standardized, e.g. in an MPEG standardization.

BACKGROUND OF THE INVENTION

In the early days of color rendering, e.g. for television program display, the relationship between the content creation side (e.g. the camera operator), and the color rendering side (e.g. display on a television or computer display) was simple, and fixed by rigid technical principles. A so called standard CRT display was defined, which had particular phosphors, a certain gamma 2.2 tone reproduction curves (TRC), with 256 approximately visually equidistant driving steps etc. There are a number of fundamental color reproduction questions which were in this manner addressed, i.e. should a color rendering system be optimized to the (best) human viewer, and more importantly, should the color rendering capabilities (and in particular the color description/communication standard) be prescribed/determined (mostly) by the color capturing (camera) side or the color rendering (display) side.

A number of approximations were introduced at the time, as the ground rules for television colorimetry for the decades to come. Taking the physical display constraints of the era of the first color television into account, the first displays and displayed signals were optimized so that they would yield an ideal picture to the viewer, given the size, brightness etc. of the CRTs available at that time (NTSC, the late 1940s early 1950s: resolution fine enough for typical viewing distance, enough driving steps to just noticeable difference (JND) to perceptually reach good, indiscriminable black starting from the white luminances at the time, etc.).

Then, given that standard display of that time, which was a small, dark CRT, the rules for the content production side were laid down for converting captured scenes in reasonably looking pictures on the display, for most scenes (similar considerations took place in the world of analog photography, in which a scene had to be rendered in an often low quality photo print, which never had a contrast above 100:1, imperfect colors, etc.). E.g., even though theoretically one would need a spectral camera to measure a real life color scene (given its variable illumination), as an approximation, if one knows on which device the color is to be displayed on, camera sensitivity curves can be determined.

Images captured with such camera sensitivity curves are then supposed to reconstruct a similarly looking picture on the display, at least emulating at the same time the illumination of the scene at the capturing side, but in practice there will be errors. In addition, these camera sensitivity curves will have negative lobes. Although one could try to reproduce these theoretically optimal curves exactly with optical filter combinations, in practice (also given that the viewer does not know which colors exactly occur in the scene) matrixing will suffice to make the colors look reasonable.

Several content creation side professionals, like the camera operator and a color grader/corrector, have to do their magic with parametric transformations to make the finally encoded images look optimal when displayed. For example, what is usually done by a color corrector (in the video world where different video feeds are combined) is that the color corrector looks at the white points of the different inputs (one global rather severe type of colorimetric image error), and matches the white points of the different inputs by increasing slightly, for example, the blue contributions of pixels, whilst also looking at critical colors like faces. In movie material, further artistic considerations may be involved, e.g., a slightly bluish look for night scenes may be casted, which, if not already largely created by a color filter matching the film characteristics, will typically be done in post production by a color grader. Another example, which may typically involve also tweaking the tone reproduction curves, is to make the movie look more desaturated, i.e., to give it a desolate look.

It is of even higher importance to take care of the tone reproduction curve gamma behavior. One might suspect that just applying a 0.45 anti-gamma correction to encode the captured linear sensor data will suffice, but apart from that, the larger dynamic range of a typical scene always has to be mapped somehow to the [0-255] interval. Tone reproduction curve tweaking will also result in, for example, a coarser, high contrast look, darker or more prominent shadows, etc. The camera operator typically has tunable anti-gamma curves available, in which the camera operator may set knee and shoulder points, etc., so that the captured scene has a good look (typically somebody looks at the captured images on a reference monitor, which used to be a CRT and may now be an LCD). In wet photography, the same can be realized with "hardware" processing, such as printing and developing conditions to map faces onto zone VI of the Adams zone system. However, nowadays there is often a digital intermediate which is worked on. Even cinematographers that love shooting on classical film stock, nowadays have available to them a digital video auxiliary stream (which can be very useful in the trend of increased technical filming, in which a lot of the action may, for example, be in front of a green screen). So in summary, apart from taking the actual room conditions at the viewer's side to be a given to be ignored, the whole color capturing system is designed around a "calibrated ideal display", which is taken into account as a fixed given fact when the content creator creates his images.

The problem is that this was already very approximative in those days. The reasoning was like "if we do a bad job reproducing a scene on photographic paper anyway, we may relax all requirements regarding accuracy, and apply a more subjective definition of the technical mapping from scene to rendering, taking into account such principles as reasonable recognizability of the imaged scenes, consumer appreciated vivid color rendering, etc." However, this technology of image encoding (e.g., as prescribed in PAL, or MPEG2) should be understood as co-existing with a number of critical questions, like: "what if one changes the illumination of the captured scene, be it the illuminance or the white point, or the spatial distribution, or the special characteristics", "what about the errors introduced due to differences in illumination of the scene and the viewing environment, especially when seen in the light of a human viewer adapted to the scene vs. viewing environment", etc.

These problems and resulting errors became aggravated when displays started changing from the standard CRT in a standard living room, to a range of very different displays and viewing environments (e.g., the peak white luminance of displays increased). Note that, as used herein, the phrase "peak white luminance of a display" and the expressions "display white luminance" and "display peak brightness (PB_D)" are interchangeable, with similar meaning.

To further assist with the comprehension of material disclosed herein, the following brief discussion is included. Until a couple of years ago, all video was encoded according to the so-called low dynamic range (LDR) philosophy, also called standard dynamic range (SDR). That meant, whatever the captured scene was, that the maximum of the code (typically 8 bit luma Y'=255; or 100% voltage for analog display driving) should by standardized definition correspond to, i.e., be rendered on, a display with a peak brightness (PB) (i.e., the brightest white color it can render) being by standard agreement 100 nit. If people bought an actual display which was a little darker or brighter, it was assumed that the viewer's visual system would adapt so that the image would still look appropriate and even the same as on the reference 100 nit display, rather than, e.g., annoyingly too bright (in case one has, e.g., a night scene in a horror movie which should have a dark look).

Of course, for practical program making this typically meant maintaining a tight control of the scene lighting setup, since even in perfectly uniform lighting the diffuse reflection percentage of various objects can already give a contrast ratio of 100:1. The black of such a SDR display may typically be 0.1 nit in good circumstances, yet 1 nit or even several nits in worst circumstances, so the SDR display dynamic range (the brightest white divided by the darkest viewable black) would be 1000:1 at best, or worse, which corresponds nicely to such uniform illuminated scenes, and an 8 bit coding for all the required to be rendered pixel grey values or brightnesses, having a gamma of approximately 2.0, or encoding inverse gamma 0.5. Rec. 709 was the typically used SDR video coding.

Typically also cameras had problems capturing simultaneously both very bright and rather dark regions, i.e., a scene as seen outside a window or car window would typically be clipped to white (giving red, green and blue additive color components R=G=B=max., corresponding to their square root coded values R'=G'=B'=255). Note that if in this application a dynamic range (DR) is specified for starters with a peak brightness of a coding (PB_C), which PB_C would correspond to a theoretical reference display's peak brightness of a display (PB_D), for optimally rendering out the coded lumas as displayed luminances (i.e., the brightest rendered or renderable luminance) only, we assume that the lowest luminance value is pragmatically zero (whereas in practice it may depend on viewing conditions such as display front plate or cinema screen light reflection, e.g., 0.1 nit), and that those further details are irrelevant for the particular explanation. Note also that there are several ways to define a dynamic range (DR), and that the most natural one typically used in the below explanations is a display rendered luminance dynamic range, i.e. the luminance of the brightest color versus the darkest one.

Note also, something which has become clearer during HDR research, and is mentioned here to make sure everybody understands it, that a code system itself does not natively have a dynamic range, unless one associates a reference display with it, which states that, e.g., R'=G'=B'=Y'=255 should correspond with a PB of 100 nit, or alternatively 1000 nit, etc. In particular, contrary to what is usually pre-assumed, the number of bits used for the color components of pixels, like their lumas, is not a good indicator of dynamic range, since, e.g., a 10 bit coding system may encode either a HDR video, or an SDR video, determined by the type of encoding, and in particular the electro-optical transfer function EOTF of the reference display associated with the coding, i.e., defining the relationship between the luma codes [0, 1023] and the corresponding luminances of the pixels, as they need to be rendered on a display.

In this text it is assumed that when a HDR image or video is mentioned, it has a corresponding peak brightness or maximum luminance for the highest luma code (or equivalently highest R', G', B' values in case of an RGB coding, e.g., if RGB coding would be used instead of YCbCr encoding) which is higher than the SDR value of 100 nit, typically at least 4× higher, i.e., the to be rendered maximum display luminance for having the HDR image look optimal may be, e.g., 1000 nit, 5000 nit, or 10000 nit (note that this should not be confused with the concept that one can encode such a HDR image or video as a SDR image or video, in which case the image is both renderable on a 100 nit display, but importantly, also contains all information—when having corresponding associated metadata encoding a color transformation for recovering the HDR image—for creating a HDR image with a PB of, e.g., 1000 nit!).

So a high dynamic range coding of a high dynamic range image is capable of encoding images with to be rendered luminances of, e.g., up to 1000 nit, to be able to display render good quality HDR, with, e.g., bright explosions compared to the surrounding rendered scene, or sparkling shiny metal surfaces, etc.

In practice, there are scenes in the world which can have very high dynamic range (e.g. an indoors capturing with objects as dark as 1 nit, whilst simultaneously seeing through the window outside sunlit objects with luminances above 10,000 nit, giving a 10000:1 dynamic range, which is 10× larger than a 1000:1 DR, and even 100 times larger than a 100:1 dynamic range, and, e.g., TV viewing may have a DR of less than 30:1 in some typical situations, e.g., daylight viewing). Since displays are becoming better (a couple of times brighter PB than 100 nit, with 1000 nit currently appearing, and several thousands of nits PB being envisaged), a goal is to be able to render these images beautifully, and although not exactly identical to the original because of such factors like different viewing conditions, at least very natural, or at least pleasing.

The reader should also understand that because a viewer is typically watching the content in a different situation (e.g. sitting in a weakly lit living room at night, or in a dark home or cinema theatre, instead of actually standing in the captured bright African landscape), there is no identity between the luminances in the scene and those finally rendered on the TV (or other display). This can be handled inter alia by having a human color grader manually decide about the optimal colors on the available coding DR, i.e., of the associated reference display, e.g., by prescribing that the sun in the scene should be rendered in the image at 5000 nit (rather than its actual value of 1 billion nit). Alternatively, automatic algorithms may do such a conversion from, e.g., a raw camera capturing to what will be generically referred to herein as a master HDR (M_HDR) grading. This means one can then render this master grading on a 5000 nit PB HDR display, at those locations where such a display is available.

At the same time however, there will for the coming years be a large installed base of people having a legacy SDR display of 100 nit PB, or some display which cannot make 5000 nit white, e.g., because it is portable, and those people need to be able to see the HDR movie too. So there needs to be some mechanism to convert from a 5000 nit HDR to a 100 nit SDR look image of the same scene.

SUMMARY OF THE INVENTION

The technical solutions, described herein below, are inspired by an object to make image creation (in particular digital video, which may also be digitized film stock material, whether recently shot, or old material remastering) more versatile, to take into account present and future evolutions in image/video/film production, and in particular future displays (i.e., displays having different dynamic ranges, or display peak brightness (PB_D)). Whereas evolution in movie theatres was somewhat slower, a problem started occurring already that actual displays in the viewer's living room had become LCDs and changed in their display properties such as color primaries, tone reproduction, etc. The prior solution however was to stick to a rigid standard, and make the LCD behave like a standard CRT again, by using tone reproduction curve conversion lookup tables, etc.

However, with the appearance of high dynamic range (HDR) displays, such a prior solution became unfeasible: one just cannot pretend that a first display which is physically (as to black level, grey level controllability, brightness of peak white, etc.) very different from another second display "can be made to behave exactly like" that second (ideal) display. This prior solution might work if one really wanted to emulate exactly on a current high quality high dynamic range display the behavior of a low quality display of the 1950s, but that is not how people want to use their new high quality displays (why buy a high quality display if it only shows low quality output). Typically, whether done automatically by the TV's (i.e., rendering or receiving side, high quality display's) picture optimization algorithms, or manually by the viewer changing the picture viewing properties or preferences of the TV on his remote control, these televisions want to maximize their spectacular look, which may involve such things as increasing brightness and saturation of pictures. However, this may have several visual disadvantages regarding the actual look of the finally rendered pictures, e.g., incorrect darkness or black regions, cartoonization of the content by excessively increasing the saturation, staircase patterns in gradients such as the sky, due to the fact that the few available codes in the image/video signal are stretched excessively, etc.

If one understands that the above-described scenario is not just a problem of a single HDR display, but rather that the television/movie world is changing (e.g., not only do more consumers view movies on their low quality LCD laptops, but even on small portable displays like mobile phones and the like), one realizes that it may be advantageous to have a more controllable link between (i) what the actual content was supposed to look like (in particular, as determinable at the content creator side (also referred to herein as "creation side"), which has available not only the original scene, but also the artists/director of photography's intentions as to what look the scene should have (e.g., darkish, mystical, etc.)), and (ii) what it would actually look like on the receiver's side display 730 (FIG. 7), if no "correct" processing was done, or even "incorrect" display processing, which may worsen the resulting look.

In the past, one always wanted to solve this problem by using some fixed calibration chain (i.e., creating new, better values for the pixel data), a "good once and for all" solution, which may result in an "average" look which is actually really good for nobody, in particular now that displays have become so good that any artifact can become annoyingly perceivable. Another trend is that excessive parts of movies are becoming customizable (e.g., half of a science fiction movie may be generated in computer graphics, and the other half may have added special effects), which in turn preferably dictates that also, at the capturing side, more of the actual environment shot is captured (e.g., the illumination distribution as determinable with a sphere). This point is particularly interesting as a mindset: current imaging captures—even ignoring the above color encoding approximation—too little of the actual scene. Enough is captured for recognizable objects (but that would already be largely realized with binary line drawings), but not for beautifully renderable pictures (whether the criterion relates to realisticness, color impact, etc.).

Lastly, and for good reasons (e.g., retraining of highly specialized camera operators), technical standards are resistant to change. The disappearing PAL standard is not going to be updated anymore. However, new standards will emerge taking into account the changed image reproduction environment, and taking into account the standard's usefulness with a view towards the future such as ever increasing camera and display quality. For example, increased camera quality can include +/−14 bit. In addition, even plain consumers are using ever increasing quality cameras, which may, with their automatic optimization algorithms in the future, yield-apart from artistic input—better results than what the average old days camera operator was producing. Furthermore, the plain consumers may want to see their pictures of monument valley on their HDR display as if they were still there.

Accordingly, the embodiments of the present disclosure offer solutions to further improve the controllability of what an artist would like people to see, versus what would be displayed, e.g., on a home television. In other words, what an artist/creator on the creation side would like people to see, versus what would be displayed on a rendering/receiving side display having a given display quality can take several forms. The several forms can depend on the kind of artist and the artist's preferences, from (i) an "I mostly want to do nothing, letting the viewer or television manufacturer doing the controlling—view" in which, e.g., only severe modifications of the content as finally rendered by the display are forbidden, on the one side of the spectrum of control options, to (ii) on the other side of the spectrum, attempts to bring a rendering as close as possible to an ideal reproduction of what the artist intended, given the rendering side display limitations, e.g., a display white luminance of the rending side display.

Thereto, in addition to the normal pixel based coding of the image at the creation side, it is desired to have an additional metadata, indicating (i) what that pixel data actually means, and (ii) what the receiving side is supposed to do with it, e.g., regarding pre-rendering image processing. One could conceptualize normal pixel based coding of an image as "linear, one-to-one" coding, which is actually what a CCD sensor set to a certain sensitivity does. It should be understood that linear pixel coding is, although very powerful in its versatility to encode every scene, also relatively stupid (the other side of the coin), in that more can be said about the "blindly" encoded pixels. This can be done by introducing "color regimes" (also referred to herein as "luminance/color regimes", "luminance regimes", "regimes", or simply "regime"). So it is important to understand that the regime is not necessarily again a (blind) numerical representation of the actual "object-shading" in a certain region, but something additional about the scene. The something additional about the scene can depend on which different classes of things (e.g., objects, spatial regions, illumination categories, etc.) there are in the scene, or even on how an artistic person would see the real captured, or artistically improved scene. In that sense, it should be understood that all creators (i.e., whether human or automated) can use the embodiments of the present disclosure. Creators can include, for example, both a camera man (i.e., actually annotating properties of the, at that moment, captured scene), and a later post processor (e.g., a color grader and/or re-grading processor that artistically reinterprets the captured scene).

The above-mentioned concepts are more easily grasped if explained with a few illustrative examples. Even if one always will have examples that the actual pixel coding (especially when in [0,255] but even possibly in HDR encodings) may involve pixel values that do not accurately reflect the underlying scene object and its color characteristics, one may desire to denote the object or region of pixels as a certain "type" of image information, to which a certain display side rendering action should correspond. Note, as used herein, the term "color" is used loosely as also including luminance/lightness only. In addition, pixel values that do not accurately reflect the underlying scene object and its color characteristics can be better understood in the following. The value 255 white may represent, for example, a white wall in a somewhat darker region of the picture, as well as light reflections on an eye, as well as the interior of very bright light, or even a clipped blue sky.

Consider the following example. According to a new codification as desired by a content creator, a certain dark region should be so displayed that before a certain time moment a horror monster is (nearly) hidden in the dark, but after a certain time moment it becomes visible to a certain degree, corresponding to a regime that may be denoted as "dark_hidden". The content creator can also more precisely specify how much of a person hidden in the dark emerges, e.g., 25% of the hidden person's body, or even more specifically, the part of the hidden person's face. One can imagine if doing this blindly, more or less than desired by the content creator may actually be visible on the rendering side, e.g., due to backlight boosting, light reflecting from the display face plate, etc. Only when knowing by co-encoding what was intended (i.e., per the new codification as desired by the content creator as in the present example), the rendering side can—knowing all its rendering side local limitations—take care of actually achieving or approximating the intended rendering (which cannot be done when simply having pixel encoding, or something similar). Another example is that if one knows which colors are typically average lightness reflected colors as encoded in the scene, one could render them so that they are of coordinated luminance as the actual average lightness reflection colors in the viewer's living room surroundings.

One aspect of the embodiments of the present disclosure can be realized by having a method of adding image defining information to an input image signal (I), comprising:

showing the input image (I) to a human operator;

receiving via a user interface (303, 308) descriptive data (D) from the human operator, the descriptive data (D) including at least luminance values and/or geometrical shape information on the one hand, and a regime descriptor (rd) on the other hand;

encoding into an output description data signal (DDO), relatable to an output image signal (O) based upon the input image signal (I), the descriptive data (D) in a technical format standardized to be intended for use by a receiving display to control its image processing for changing the color properties of its rendered images, and by corresponding apparatuses at the image creation side, and corresponding methods and apparatuses at the display side, and in particular, several possible coordination signals to describe the regimes, and what the display side system should do to approximate the intended, desirable final rendering (e.g., which may be an "as close as possible" approximation of the original scene, but taking the local viewing site environment into account, such as white point of the room lights, etc.).

In another example, a color grader can with the directions of the director, look at the scene, and identify a part of a commercial lightbox on a wall (e.g., which may be specified (i) as an approximate location and color values, or (ii) by drawing a rough ellipse on it, and further segmenting), and designate not only that this is a special region, but now also encode this as what special region, namely, what rendering regime should be applied. For example, the applied rendering regime could be a regime to make "flaming eyes" (rd) on a person in the lightbox, and coordinate the surround light, as would look best given the specifics of the rendering display. The color grader may then process the input image in an encoded output image O, which according to the above philosophy would be kind of an average look. In other words, one can compare it with a latitude leading to nice recognizability of most objects in a captured picture, but then with the additional description data specifying the regimes, one can transform this average encoding in much better looking pictures in all different viewing sites. Image processing algorithms on the display rendering side may then apply tone mappings, or other image processing operations especially to modify the look of local regions, to specific regions, according to the regime descriptions.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as, e.g., selections of objects/regions (and how they may be shown on a display).

In the drawings.

DETAILED DESCRIPTION

Figure 8:
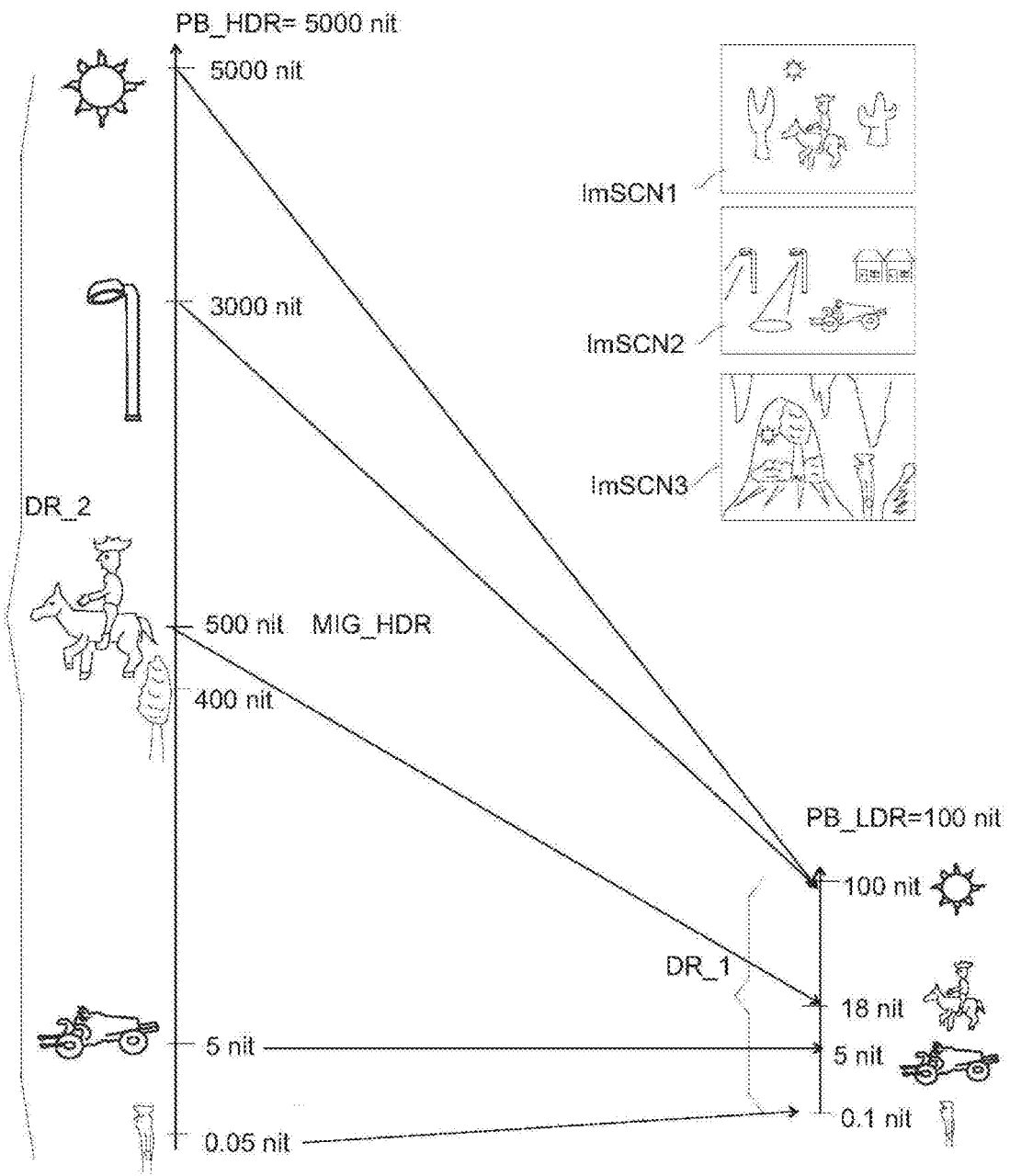
FIG. 8 schematically illustrates a number of typical color transformations which can occur when one optimally maps a high dynamic range image to a corresponding optimally color graded similarly looking image of different dynamic range and in particular peak brightness (as similar as desired and feasible given the differences in the first and second dynamic ranges, DR_1 and DR_2, respectively), which in case of reversibility would also correspond to a mapping of an LDR image of the HDR scene, to a HDR image of that scene.

With reference first to FIG. 8, there is shown a couple of illustrative examples of the many possible HDR scenes a HDR system of the future (e.g., connected to a 1000 nit PB rendering display) may need to be able to correctly handle, i.e., by rendering the appropriate luminances for all objects/pixels in the image. E.g., ImSCN1 is a sunny outdoors image from a western movie, whereas ImSCN2 is a nighttime image. What makes HDR image rendering different from how it always was in the LDR era which ended only a couple of years ago, is that the LDR had such a limited dynamic range (about PB=100 nit, and black level +−0.1 to 1 nit), that mostly only the reflectivities of the objects could be shown (which would fall between 90% for good white and 1% for good black). So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. As a result, one had to conventionally color the night scenes blue, so that the viewer would understand he or she was not looking at a daytime scene. Now of course in real life human vision would also adapt to the available amount of light, but not that much (most people in real life recognize when it's getting dark). So one would like to render the images with all the spectacular local lighting effects that one can artistically design in it, to get much more realistic rendered images at least if one has a HDR display available.

So on the left axis of FIG. 8, HDR dynamic range (DR_2), are object luminances as one would like to see them in a 5000 nit PB master HDR grading for a 5000 nit PB display. If one wants to convey not just an illusion, but a real sense of the cowboy being in a bright sunlit environment, one must specify and render those pixel luminances, in scene ImSCN1, sufficiently bright (though also not too bright), around, e.g., 500 nit. For the night scene, ImSCN2, one wants mostly dark luminances, but the main character on the motorcycle should be well-recognizable, i.e., not too dark (e.g., around 5 nit), and at the same time there can be pixels of quite high luminance, e.g., of the street lights, e.g., around 3000 nit on a 5000 nit display, or around the peak brightness on any HDR display (e.g., 1000 nit).

The third example ImSCN3 in FIG. 8 shows what is now also possible on HDR displays: one can simultaneously render both very bright and very dark pixels. In ImSCN3, we see a dark cave, with a small opening through which we see the sunny outside. For this scene one may want to make the sunlit objects like the tree somewhat less bright than in a scene which wants to render the impression of a bright sunny landscape, e.g., around 400 nit, which should be more coordinated with the essentially dark character of the inside of the cave. A color grader may want to optimally coordinate the luminances of all objects, so that nothing looks inappropriately dark or bright and the contrasts are good, e.g., the person standing in the dark in this cave may be coded in the master HDR graded image around 0.05 nit (assuming HDR renderings will not only be able to render bright highlights, but also dark regions).

It can be understood that it may not always be a trivial task to map all the object luminances for all these very different types of HDR scene to optimal luminances available in the much smaller SDR or LDR dynamic range (DR_1) shown on the right of FIG. 8, which is why preferably a human color grader may be involved for determining the color transformation (which comprises at least a luminance transformation, or luma transformation when equivalently performed on the luma codes). However, one can always choose to use automatically determined transformations, e.g., based on analyzing the color properties of the image content such as its luminance histogram, and this may e.g., be a preferred option for simpler kinds of HDR video, or applications where human grading is less preferred, e.g., as in real-time content production (in this disclosure it is assumed that without limitation grading could also involve the quick setting of a few color transformation function parameters, e.g., for the whole production quickly prior to the start of capturing). Note that for the dynamic range DR_2 of FIG. 8, there is a big difference is brightness looks for the scene objects, whereas for the dynamic range DR_1 of FIG. 8, there are small differences in brightness look in that most all objects are similarly (uniformly) lit and viewable, but lifeless.

In addition, with reference still to FIG. 8, the illustration shows that in general HDR scenes (or their master graded image as equivalent representation, and starting point of the image handling chain(s)), can just contain any brightness distribution (e.g., sunny scene, night scene, cave with dark interior and sunny outside), and this needs to be squeeze (re)graded up to the SDR (so you also see the equivalent look rendered luminances on both displays). In addition, the illustration of FIG. 8 shows that the re-grading protocol can sometimes work as a "keep the rendered luminances the same on all displays" (e.g. for dark night scene objects) and sometimes "squeeze as PB_D demands."

Furthermore, FIG. 8 helps to facilitate a comprehension of differences in brightness look for different output luminance dynamic ranges. In addition, as will be further understood herein, the embodiments of the present disclosure relate to display tuning methods and apparatus, for which a distinction is made between mere coding of object luminances and content-dependent rendering-side display tuning of images coded in a master grading PB_C of a first dynamic range (e.g., PB_C=5000 nit), to be rendered on a display having a dynamic range (PB_D) different from the master grading PB_C dynamic range.

Figure 1:
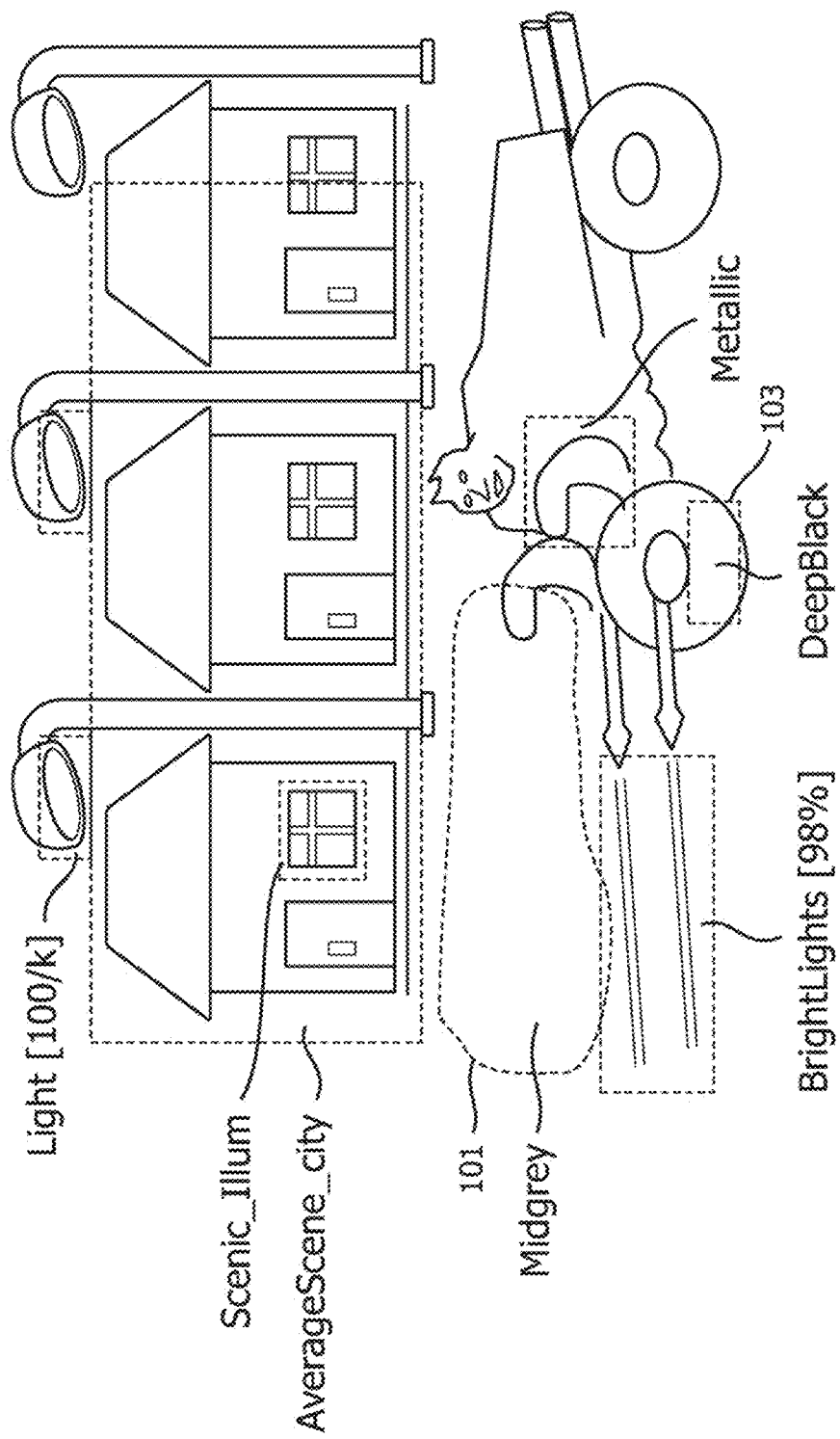
FIG. 1 schematically illustrates a few of the typical regimes which would be desirable and achievable using the principles of our invention on an exemplary movie scene.

With reference now to FIG. 1, there is shown an example of a batman movie, and some effects which can be realized on a HDR display with the current invention. At this moment, HDR displays can use whatever their internal processing is to "optimize" the image, which is however oftentimes so geared towards light output maximization (or saturation boost). So, the picture may not be shown optimally at all, perhaps even rendered in an ugly, unrealistic way (e.g., fluorescent bananas), at least not what the artist/creator would have originally intended. Typically, the boosts—even when parametrically, and dependent on image properties such as histograms—are of a "stretch-all" type, boosting all pixels similarly. However, a disadvantage of such a "stretch-all" type boosting can be understood when, for example, boosting some road lights, one may not simply want the grey road around it to become increasingly bright similarly. In contrast, a more realistic rendering may depend on the distribution of color values on the road—or even its spatial/property analysis, like texture- and make water droplets on the road increasingly bright together with the lights in the image, but not so much the diffusely reflecting parts of the road. Or, in a computer game showing a dark basement, one may indeed want to boost the power of some lights, but do something entirely different to shadow regions, dark grey pillars, etc. In fact, the optimal processing of the regions may be so non-linear that no global processing, or not even any function derived solely on the display/receiver side, will do a good job. To get out of this conundrum, the creating artist can specify "color regimes" (also referred to herein as "luminance/color regimes", "luminance regimes", "regimes", or simply "regime"), which may be few and simple, or many with complex details, but allowing the artist/creator to have a say as to what can, will, or alternatively must not happen to the final look (i.e., implying typically the processing applied by the display on the received input signals for the pixels in its different regions).

In a simple variant, the artist/creator will annotate regions of the image histogram (i.e., often of spatial sub-regions of a picture, but they may also only be, e.g., luminance, or color values for a shot of successive pictures), and give them a code or descriptor indicating which regime they belong to. In one embodiment, the code or descriptor may be a simple indication of what these regions mean. Although complex descriptors of the multimodal spatial-histogram distributions in a region may be employed, we will explain herein a simpler case in which the artist/creator only gives a luminance range for the region.

To begin with, there is typically a range of luminances (or colors) in the coded image (which will be transmitted to the receiving end, whether via a television cable, a memory device such as a blu-ray disk, etc., and serve there as input image, i.e., note that the output image O of the creation side is typically the input image on the receiving side), which will be, for example, between the minimum and maximum luminance in a region 101 (e.g., an arbitrarily shaped region) selected by the artist/creator on this input image. Corresponding to the input luminance interval in the picture, on the reproduction side there will also be at least one output luminance interval, e.g. as rendered outgoing light of the rendering side display, or an image processing modified driving image for the LCD pixels. For example, the minimum luminance may have an offset added, and the luminance range may be stretched by a multiplicative factor 2.

However, in a preferred embodiment, the reproduction scenario may be more complex. In one example, for a bimodal histogram—because region 101 contains mainly two "kinds" of objects, the somewhat darker ones, and the normal luminance ones—one may want to prescribe nonlinear mapping functions which keep a relationship between the average luminances of the sub-histograms, so that their ratio doesn't become visually unrealistic. In fact, luminance range mapping has usually been considered as a problem of cramming all the input range pixels in the output range, usually with the technical limitation of clipping (or similarly, not taking care of visibility constraints for the dark values, making the dark values effectively invisible to the viewer because the dark values fall below screen reflections), which is done by one of many heuristic smart tone mapping algorithms. However, if one has a (factual or artistic as regards to what the pixels encode) "meaning" for all the sub-regions of the histogram corresponding to objects, one can make a much smarter allocation of the optimal output luminances to pixel regions, not only to give the entire image a balanced look, but more as a (parametric) coordinated hierarchy of smartly superimposed object-related ranges, even with optimal positioning of the pixel region color values within a single selected object with a particular meaning. For example, one can imagine that one may want to coordinate the rendering and, in particular, the luminance range allocation of first pixels corresponding to a light inside a shop, with other pixels visible through the shop window on the one hand, and lights outside the shop on the other hand, knowing that such coordination relationships will tune the visual impact (i.e., for the rendering-side display).

With reference still to FIG. 1, the region 101 determines (preferably all, although it may also function as a color/texture property region for teaching the receiver how it can segment all similar regions) pixels to be coded as "Midgrey", which in this case is a plain grey road. Note that the text of the present disclosure often refers of the receiving display 730 (FIG. 7) as doing the rendering processing; however, the skilled person will know that other apparatuses such as a blu-ray disk reader, a set-top-box (STB), a personal computer, or mobile apparatus, etc., may do all or some of the signal processing, yielding the final image (IR) (FIG. 7) to be displayed at the rendering side. Since the receiving display or television may still do its own additional processing, a distinction is made between the output signal IR' of a receiving side luminance processing apparatus, e.g., the blu-ray player, and the output signal IR finally displayed on the rendering side monitor, tv, projector, etc., as will become clearer from the discussion herein below. Communication between the two devices (e.g., the receiving side luminance processing apparatus and the rendering side display) for communicating their image-related physical properties, and measured viewing environment properties may preferably be available.

Not only has coding the Midgrey region 101 as being of a particular type provided the advantage that it can be optimally rendered, but also coding of the Midgrey region 101 as being of the particular type can aid all scene analysis/understanding algorithms at the receiving side. Optimally rendered can be understood plainly as being, i.e., of not too high luminance—e.g., related to an average grey luminance in the viewer's room- and having a low saturation, which may involve putting a limit on the boosting algorithm parameters of the rendering side display. Or, optimally rendered can be understood to even invoke a desaturation operation. That is, instead of giving the movie a paler look for all scenarios, invoking an optimally rendered desaturation operation can in this way be done, tuned per display/viewer, i.e., at least partly, taking into account the viewer's visual accommodation state, etc.

Furthermore, it has always been a daunting task to separate the scene illumination from the scene object reflectances, and selection of this grey area (Midgrey region 101) can help (i.e., it can be seen as the equivalent of an a posteriori McBeth checker), and in particular, if the selection is co-stored in the output image signal from the capturing side with light properties measured in scene. Light properties measured in scene can include, for example, the actual luminance of parts of the scene corresponding, after projection, with captured image locations falling in the selected region, color cast imbalances (perhaps even measured with a simple spectrometer), etc. The quantification of what the grey was like in the original scene and/or what it should preferably look like in the final rendering, can then be used to, e.g., more optimally render the other colors, or change ambient light (which may be of the ambilight type directly surrounding the rendering display, or light speakers creating illuminations in several locations of the viewing room of the rendering display in synchrony with the displayed images), etc.

Other important types are the difficult components of dark color regimes (which have up to now been largely ignored). They may be present (and should behave differently, i.e. lead to different display processing and rendering) either in normal light scenarios like in FIG. 1 (e.g., the black motorcycle tires and batman's cape, but under normal illumination), or in dark scenes (e.g., like horror movies, in which the entire scene is optimally processed to give an overall darkish look, emphasizing mostly on the property of visibility, as will be explained in connection with a corridor example below, and preferably coordinating with the viewing room illumination, such as lowering a light output of the light speakers, and co-driving the light speakers with the picture content).

In the example of a dark regime that will now be discussed, for the artist's convenience and to keep the color grading expenses low, a single regime code for the dark regime is used, namely "DeepBlack". Depending on the properties of the rendering side display (and preferably also the measured viewing environment, see below), the rendering display will be controlled to process this in a balanced way, so that, on the one hand, the region looks very dark, but on the other hand, where possible it still shows texture. For a high end HDR display in a cinematically lighted living room, this will result in a different processing (namely mapping on a dark region of luminances, in which there are still a number of actually visible just noticeable differences (JNDs) present) than on a typical television and living room as at present, or even an outdoors mobile display (which will just clip the entire dark region to minimum black, so that at least some darkness intent is suggested).

If one starts "stretching" luminances (or colors) to at least very bright, and perhaps nicely dark, it is important to have some reference (or at least regions which are not changed too much). Thereto, the artist may use "AverageScene" codes, of which the artist may use a single default one (to which the rendering display reacts as if it was, e.g., an Adams V value, which may be mapped on the rendering-side display around what is 18% of typical low dynamic range, maximum white luminance being equal to 500 nit; or equal to a multiplicative factor times the average luminance of the viewing surround, etc.). In addition, the artist may use several variants of the "AverageScene" code so that a complex allocation can be done of darker greys, versus brighter greys more conforming to the brighter white display, etc. Having available the several variants of the "AverageScene" code, a HDR display may then use these several greys, whereas a lesser quality display (e.g., a low dynamic range (LDR) display) may render as if there was only one grey reference.

In FIG. 1, the "AverageScene_city" code is used, in which the artist may incorporate actual knowledge of typical cities (e.g., typical cites are composed of bricks of a certain reflectance), or his rendering intent (e.g., the houses may have bright paint on them, and the color grader may want to specify that this is rendered on the display with an output luminance between $L_{min}$ and $L_{max}$, and a saturation between $S_{min}$ and $S_{max}$). Note that although the artist may want the houses to look bright indeed, they are still part of the background. Although beautifying the movie, the houses which are part of the background are not the predominant objects. Accordingly, the houses should also not become too predominant as to their rendered colors (e.g., luminances), which the artist can control by specifying that whatever algorithm the rendering side display may want to use, the rendered colors (e.g., luminances) should not go above the maximum ($L_{max}$, $S_{max}$).

Of course more complicated rendering specifications can be given, in which the artist can specify values like "optimally approximate to give the average of the region a value $LA_{opt}$ and the maximum pixel $LM_{opt}$", "in case of boost, try to stay below or around an intended average luminance for the region $LA_{int}$", "in any case stay below a forbidden average luminance $LA_{forb}$", etc. This allows more freedom regarding the display manufacturer's color processing. In advanced systems, the artist may even want to prescribe exactly what processing a particular rendering side display performs, e.g., to enable the "intended rendering" mode. In general, however, the rendering side displays will do their own processing, which may be quite simple and not allow much tuning. The artist may further specify a value like "try to stay around the intended maximum luminance/color $LM_{int}$" that can then suffice for both sides, creator and display manufacturer, and then the rendering side display can, for example, predictively or iteratively measure whether its rendering has given the region a sufficiently close luminance/color.

Important in HDR, with respect to displaying images, are also the brighter regions. In particular, it is important that the brighter regions can be coordinated relatively to other regions (i.e., so that not everything looks brightened to the same degree). To accomplish the brighter region coordination relative to other regions, one has available the right regime codes to discriminate the brighter regions relative to other regions. As a guideline for discriminating, the artist may use such properties as local chroma, duration in time of the display of the region (e.g., to create a special bright flash effect, when the region is a fireball, etc.). A region may have a first regime code for a first time instant or time span, and a second regime code for a second, e.g. "fireball" versus "extinguishing fireball".

In the FIG. 1 example, a discrimination is made specifying the "BrightLights" code, which can be used for batman's laser rays, and which has as additional parameters indicating that the artist/creator's intention is that the display renders the laser rays at around 98% of the maximum achievable brightness (i.e., for that blue color). The street-lights that are always on in the shot, and should not give such a distracting spicy effect (note that in a real scene the viewer may look around them differently than on a small diagonal display, the diagonal being a factor which the rendering side display may use to determine the street-lights' final luminance, if desired also under control of the artist), so the street-lights will be given another regime code "Light". The regime code "Light" will be rendered at a luminance being the maximum achievable luminance divided by a certain factor, e.g., k=4. Depending on how bright the rendering side display can be (i.e., corresponding to display-dependent display peak brightness (PB_D)), one wants to reserve more or less luminance dynamic range for the reflecting scene object pixels versus, far offset from those, the light source pixels representative of the street-lights.

Another light code (i.e., regime code) can be used for light pixel regions which give a scenic illumination, e.g., corresponding to the light shining through the window in a wintery scene. The artist may want to give only some of the illuminated windows a "Scenic_Illum" code, e.g., corresponding to those having an eery bluish light instead of the normal warm incandescent. These regime codes can then be re-used, e.g., to drive the ambient lighting, which is now coordinated not with a heuristic average of what's happening in the scene, but with a real light in the scene. An ambient illumination calculator may use as input only the warm incandescent regions. In addition, the regime specification may be re-used, e.g., according to the patterned ambilight projection invention of WO2007/113754, by creating a spot of the window light color (and if possible also geometric distribution), and continuing to move it outside of the rendering display with the speed of the video. Even though the lights may not actually be exactly what's in the video being rendered, if the artist selects a typical room window, this will be sufficient for ambient environment simulation. Also the "Brighlights" regimes can be used to flash, e.g., a light speaker which is 90 degrees sideways of the viewer, to simulate reflections on the viewer's living room walls, etc.

Lastly an example has been provided and shown to elucidate that the regime encodings are not purely intended to parametrize multiplicative-type mappings (like offsetting and scaling a range of colors), but that more complex spatial profile control may be desirable, and compatible with what nowadays color graders desire.

Figure 2:
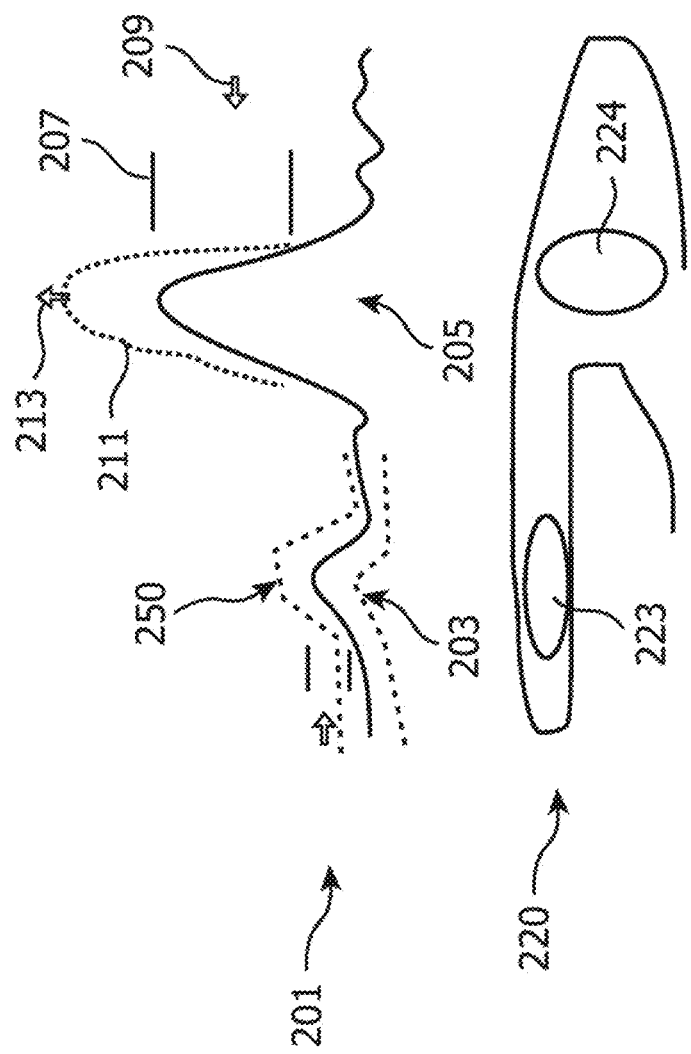
FIG. 2 schematically illustrates how one can specify a complex geometrical profile with several light reflection regions which need to be coordinated (e.g., with each other and with other regions of an image)

The metallic parts of the motorcycle handles are given the code "Metallic" to indicate that the metallic parts behave very differently in an actual environment than Lambertian diffusing objects which are relatively easy, and because especially, parametric modification may introduce artefacts, the metallic parts preferably have to be treated in a different way, which is elucidated with FIG. 2.

FIG. 2 schematically shows what would be seen on a screen of a color grader device/apparatus running a software tool for improving the captured video and doing color regime specification, and how a color grader can specify more complex color rendering behavior for the metallic handles of batman's bike. View 201 shows a cross-section luminance profile for pixels of one metallic handle, and that the metallic handle (which is shown geometrically as subpicture in view 220) mainly reflects average surround (which will not be so critical) but also specularly one of the light post lights leading to profile bump 205 (corresponding with a specular patch of pixels 224), and the blue laser flashes leading to bump 203 (corresponding with a specular patch of pixels 223). It would be strange if the profile is updated coordinating with the entire scene, which likely will coordinate with the light post light, but that the other specular highlight stays dull, although a laser fires nearby.

Preferably, to be able to artistically optimally coordinate the specular objects with different renderings of the display scene (e.g., the user increasing the brightness), an apparatus is provided to the color grader (e.g., a software module and/or other suitable apparatus) which is arranged to create and modify luminance (and possibly full color, including chromaticity) profiles of pixel regions. This can be done e.g. by modeling a part of a profile (either explicitly as adjacent pixel values, or by fitting parametric functions like, e.g., multi-Gaussian decomposition) and allowing the color grader to tune this, e.g. change the amplitude of the luminance profile bump. An example of software behavior is that the color grader can indicate a range 207 over which the luminance bump is visually predominant and needs changing, which range can be drawn with selection cursor 209. The color grader can then scale the original bump profile to a new stretched luminance bump profile 211, for example, in steps, by clicking on selection cursor 213, so that the new look is in tune with a changed global, or highlight, or scene light brightness. The color grader can look at the corresponding effects on a high quality HDR display, and toggle the display into several emulation modes for lower quality DR displays (e.g., MDR or SDR).

Different options are also available, or possible. Either a tunable function (which will typically at least have, as a tuning parameter, the average luminance of one of the light post light areas) can be stored in the video signal (e.g., as metadata) to be outputted for use (e.g., on a Blu-ray disk), and the rendering side display mandatorily uses this function as color processing for the metallic region (e.g., as a function of the viewer's brightness preferences etc.), or one or more reference models (e.g., resultant pixel luminance profiles) are stored for the rendering side display to use as guidance (i.e., for display tuning) when applying its proprietary color algorithms.

In another example, spatio (temporal) luminance profiles for three kinds of rendering displays (HDR, LDR and dynamic range other than that HDR or LDR) and 4 lightness levels for the high end (HDR) display can be encoded as starting point, and the HDR display may copy the highest brightness (mostly stretched bump) luminance profile as starting signal, upon which the HDR display may then employ a limited amount of further processing. Although this is not a 100% accurate rendering of the metallic region, the benefit of being controllable yields better results (i.e., improved luminance mapping results) than doing things blindly (i.e., without the display tuning as disclosed by the embodiments of the present disclosure). Alternatively, for a parametric encoding of all the illumination effects on a metallic handle, the rendering side display may calculate an optimal luminance bump shape for its viewing environment (e.g., display characteristics, surround, etc.).

Another example, of the need for and/or allowing of the methods/apparatuses according to the embodiments of the present disclosure of spatial color rendering control (e.g., display tuning), is that of reflections surrounding a light, e.g., on a brick wall. Typically in uncontrolled low dynamic range (LDR) systems, the reflections surrounding the light on the brick wall will map somewhere to a valid code in [0,255] (e.g., sometimes 255), and then post-processing used to generate high dynamic range (HDR) in the display may not recognize them (i.e., the reflections) as specific regions (potentially even with overexposure) and scale them (i.e., the reflections) like the rest of the average background, instead of co-scaling them (i.e., the reflections) with the increased brightness rendering of the light. This co-scaling can be achieved by either allowing a spatial sub-profile rendering intent specification in the "Light" profile itself (e.g., co-map with the average brightness of the lamp, and a reflection parameter such as an albedo, or apply a parametrized function like an exponential downfall), or an additional profile may be created, namely "Light Reflection", the properties of which are co-tuned with those of the "Light" profile. For example, the system may be configured to propose a rendering for the reflection profile to the artist/color grader, which the artist/color grader may then easily fine-tune with control parameters.

Note that the examples disclosed herein are purely illustrative to describe what kinds of control between artist/capturing side and display processing and rendering are desirable, and many more variants can be included and/or are possible. In a simple system, one or more frequently usable scenarios can be fixed and/or encoded in an image property communication standard (i.e., knowing exactly what would happen for each scenario), but of course, the image property communication standard may be upgradeable, in that the artist/color grader codifies a new class. In codifying a new class, the artist/color grader also specifies its colorimetric properties, which may include one or more of texture properties, amount of modification which may be applied, and if desired even particular types of processing algorithms, parameters, equations, etc. (e.g., a saturation algorithm, a derivative-based local brightness stretch, or other image processing algorithms like an upscaling which also leads to different visual colorfulness, noise processing, etc.). In addition, regimes descriptions may be supplemented with all kinds of further information regarding how to render, process, modify, improve, encode, etc. the various pixel regions and/or corresponding luminance profiles.

Other examples of interesting regime codes include, e.g., "Pastel" and "CommercialBoost". It has been found that often excessive saturation boosts in rendering side displays make pastels disappear. For example, sunsets may look unnatural. However, the "Pastel" regime code can enforce the pastels to stay pastel in their final rendering. With respect to the regime code "CommercialBoost", the regime allows, for example, during commercials, to boost or, even depending on the display, differently render certain objects. In other words, a multi-primary display which is able to create highly saturated oranges may color an initially more yellowish object into bright orange.

Figure 3:
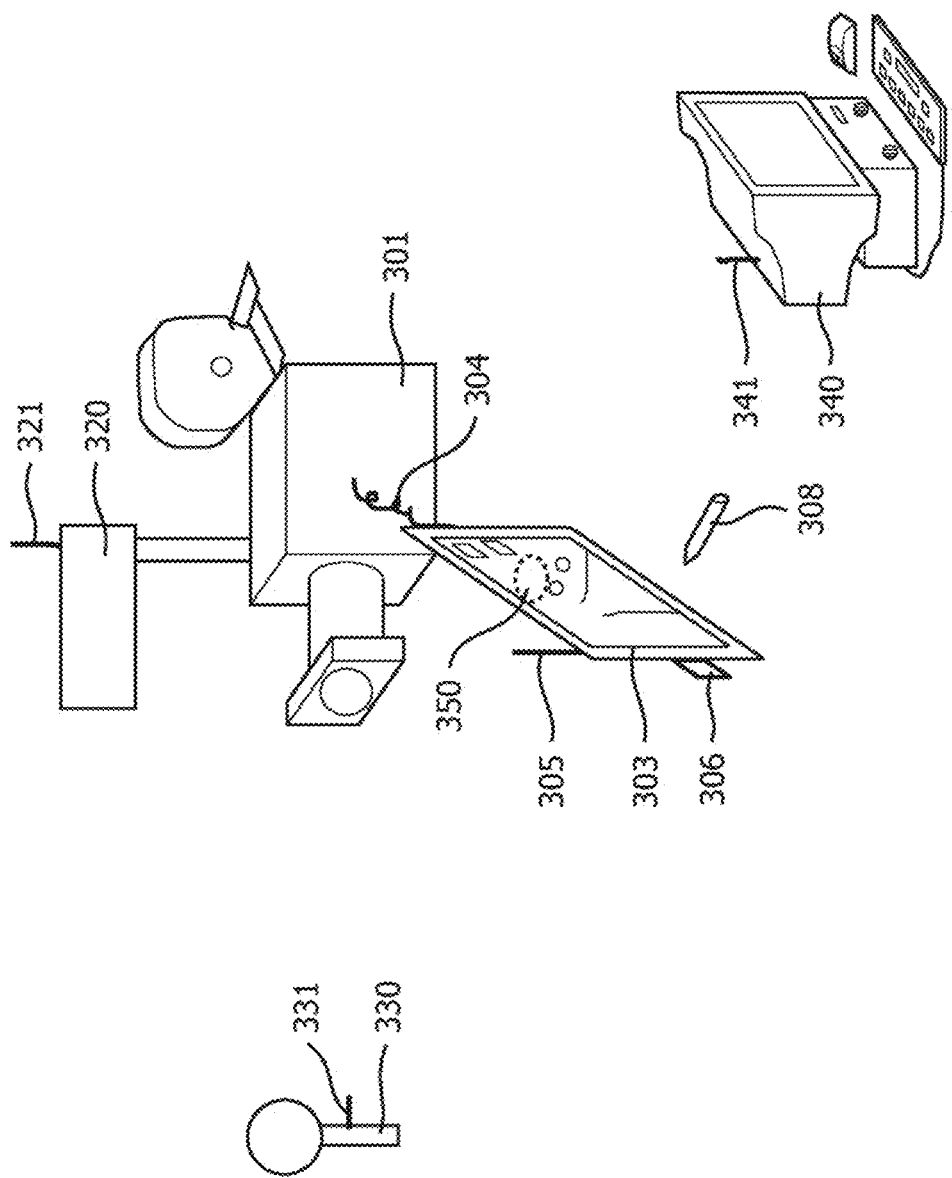
FIG. 3 schematically illustrates an environment and its apparatuses allowing an image/movie creator to add luminance/color regimes to a captured scene image.

FIG. 3 schematically shows some of the apparatuses present at the creation (transmission) side useful for creating a good color regime description signal, according to an embodiment of the present disclosure. A scenario is disclosed herein where the apparatuses are integrated with a classical celluloid film camera 301. Note that the digital assisting representation of the scene will only fully (i.e., as to the pixel values of the analog vs. digital recordings) be linkable to the actually captured celluloid picture if movie material calibration models are incorporated for mapping the two. However, the development is then still an unknown variable that can be supplementary played with. Even without those, the digital recording can still yield very valuable side information. For example, if the digital recording is geometrically co-registered with the celluloid captured view window, one can define regions, and apart from the celluloid captured developed grain values, one can code linear actual scene view values via the digital capturing. The skilled person will understand how to transpose these components to (i) a fully digital capturing embodiment in the room of a color grader, or (ii) a transcoder doing the same, for creating a regime description signal of a captured analog or digital recording, for example, an old Laurel and Hardy picture.

As shown in FIG. 3, in one embodiment, a digital display 303 is attached to the camera 301, which gets a feed, via connection 304, from a camera lens co-registered CCD (not shown). The connection 304 need not be fixed, but can also be a transmitter for a number of separate displays (e.g., one for the camera operator, and one in the overview stack of the director). Upon a corresponding display, the camera operator or director of photography can draw a region 350, for example, which they know they have calibrated with their stage lighting as a dark part of the image. Drawing the region 350 on the display can be accomplished with the use of a light pen 308, or other suitable user interface input means. While only one example of user input, via light pen 308, has been described, the skilled person can well understand that other types of system user interface input can also be used to allow a user to give feedback on a displayed image.

With reference still to FIG. 3, the display 303 may store added information (e.g., regime specifications) onto a memory 306 (e.g., a detachable memory stick), or communicate the added information via a transmission system 305. The display 303 can also receive further information from an in-filming-situ scene analysis device 320 (which may simply be a light meter or even a spatially sampling spectrometer), via its transmission system 321, which may also transmit to the final data accumulation place (i.e. computer or data accumulation apparatus 340). Furthermore, in-scene meters 330 (e.g., local illumination meters configured to measure, for example, how actor's faces where illuminated, especially when with highly variable lighting; sphere systems looking at the surrounding illumination distribution; etc.) may transmit their data to any part of the system via their transmission system 331. The receiving display can then try to reproduce the light in its original brightness, or at least a fraction (or function) thereof, typically in accordance with some psychovisual model for creating a similar look, further for coordinating the looks of the different regimes and different colors in the image. In addition, all data is accumulated on a data accumulation apparatus 340 with on-board memory, typically a computer, for example, via transmission system 341.

In another embodiment, not all components as shown in FIG. 3 need be present. That is, a simple digital duplicate, can be provided on display 303, which may be all that is desired by the director and/or color grader to make some simple annotations for only a few regime codes. However, as the skilled person understands, the system of FIG. 3 can be expanded with apparatuses to analyze the entire environment in detail (e.g., color values, light properties such as light direction or spectrum, object bidirectional reflections functions or textures, etc.). An analysis of the environment in detail by the system of FIG. 3 is not only useful for contemporary computer graphics effects insertion, but also useful for both the final living room display rendering (i.e., via the rendering side display) and ambient lighting which will advantageously benefit if more details of the scene as to both (i) its reflecting or in general light-interacting objects and (ii) the actual illumination are co-recorded with the final image signal. As a result, this allows better re-lighting to become more in-tune with the viewer's environment.

Figure 4:
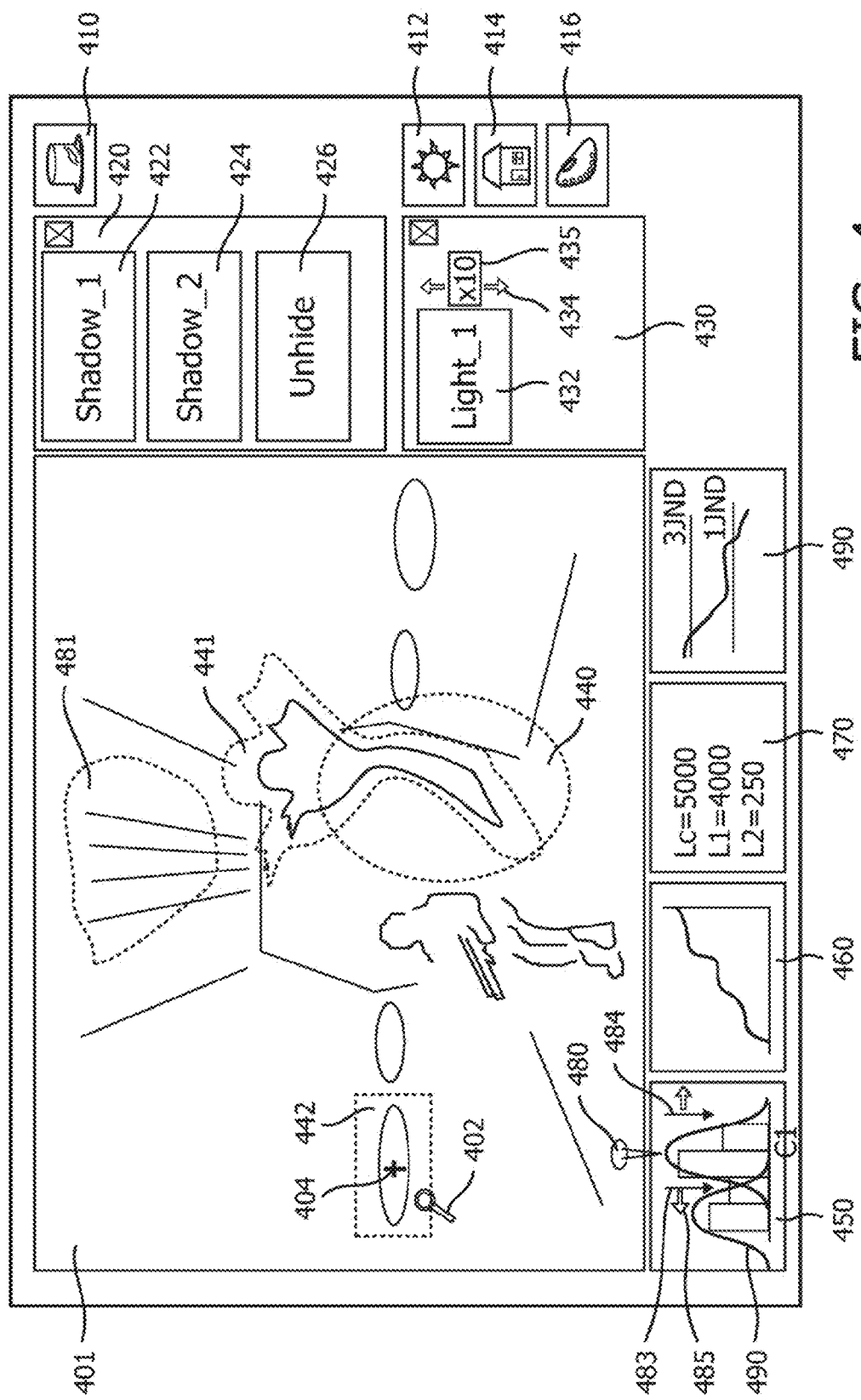
FIG. 4 schematically illustrates a user interface display of what the artistic color specialist at the creation side may see, as to the composition of the captured images, and the regimes which can be identified in them, and transformations which may be applied to them, and some schematic examples of widgets that can be used to easily interact with data corresponding to the captured images, regimes, and transformations, and create at least one regime description.

With reference now to FIG. 4, an example of what a regime annotation apparatus (or software implementation) according to another embodiment of the present disclosure, is illustrated. The regime annotation apparatus (or software) is arranged to show to a color grader, or a director of photography, various information received via its wirelessly communicated feed from any camera, and allow the color grader and/or director to annotate, and to store annotations into an outputted image signal as metadata. Shown in a picture viewing area 401 of FIG. 4 is a corridor with a photographed soldier, and a monster (which may be a simplified rendering of a computer graphics element to be added later, subsequent to the photographed soldier).

On the right-hand side of FIG. 4 are a number of regime cluster buttons for enabling the color grader and/or director to quickly select useful regimes, e.g. a "DarkRegimes" button or icon 410, a "BrightRegimes" button or icon 412, a "AverageSceneRegimes" button or icon 414, and a "CriticalColorRegimes" button or icon 416. While the illustrated embodiment in FIG. 4 shows only a few regime selection buttons/icons, there may however be more, since the illustration is merely a conceptual illustration for elucidating the invention concepts and claims. In one embodiment, responsive to the color grader and/or the director clicking on or selecting one of the regime cluster buttons, a hierarchical menu pops up showing further buttons (e.g., "Shadow_1Regime button" 422, "Shadow_2Regime" button 424, "UnhideRegime" button 426) with selectable regimes for that cluster.

In addition, as is illustrated in FIG. 4 for the "DarkRegimes" cluster, the operator has identified a region 440 which the operator wants to be "Shadow_1". In this example, the regime descriptor (rd) of the descriptive data (D) is "Shadow_1" and this regime code, or another codification derived from it, will be added in a resulting description data signal (DDO) as output). The operator may also proceed to specify some characteristic rendering and possibly further identification properties for region 440. In another scenario, only the regime itself is specified, i.e., whether as a set of luminances or as a region of pixels, and thereby the rendering side display automatically processes, in response to the specified regime, what to do with shadows, e.g. render them as dark as possible, without needing any further specifying luminance or color properties, so that a receiving side apparatus will know how to preferably handle a subset of pixels (e.g., pixels of region 440), image processing/rendering-wise.

As indicated herein above, the regime descriptor (rd) of the descriptive data (D) and/or the regime code, or another codification derived from it, is added to a description data signal (DDO). Based upon the description data signal (DDO), the receiving display will know how to preferably handle, image processing/rendering-wise, at least one subset of pixels (e.g., at least the pixels of region 440). For example, a regime specification may specify that no pixel in that region (i.e., region 440) should be shown brighter than $L_{max}$ on a rendering display, whether in the viewer's living room, or in a cinema theatre—the latter $L_{max}$ being recalibratable on a single reference encoded number in the description data signal (DDO) which will be further transformed to an in-situ usable value. In one example, an in-situ usable value of 100 Cd/m$^2$ (or 100 nit) may be changed into an actual cinema measured value, and similar for other values. In another embodiment, an actual exact number for the value $L_{max}$ is encoded per theatre or viewing room type.

In a further embodiment, there may be several specifications to define dark regimes, and their final rendering. For example, one regime specification can take into account the position of the histogram of the dark pixels, and make sure that an upper part gets a certain position, e.g., compared to the rendered luminance of mean grey pixels in the image. Whereas, on the other hand, not too many pixels are badly visible due to the glare of front screen reflections etc., so some tone mapping may be involved, e.g., posterizing the dark region.

Figure 5:
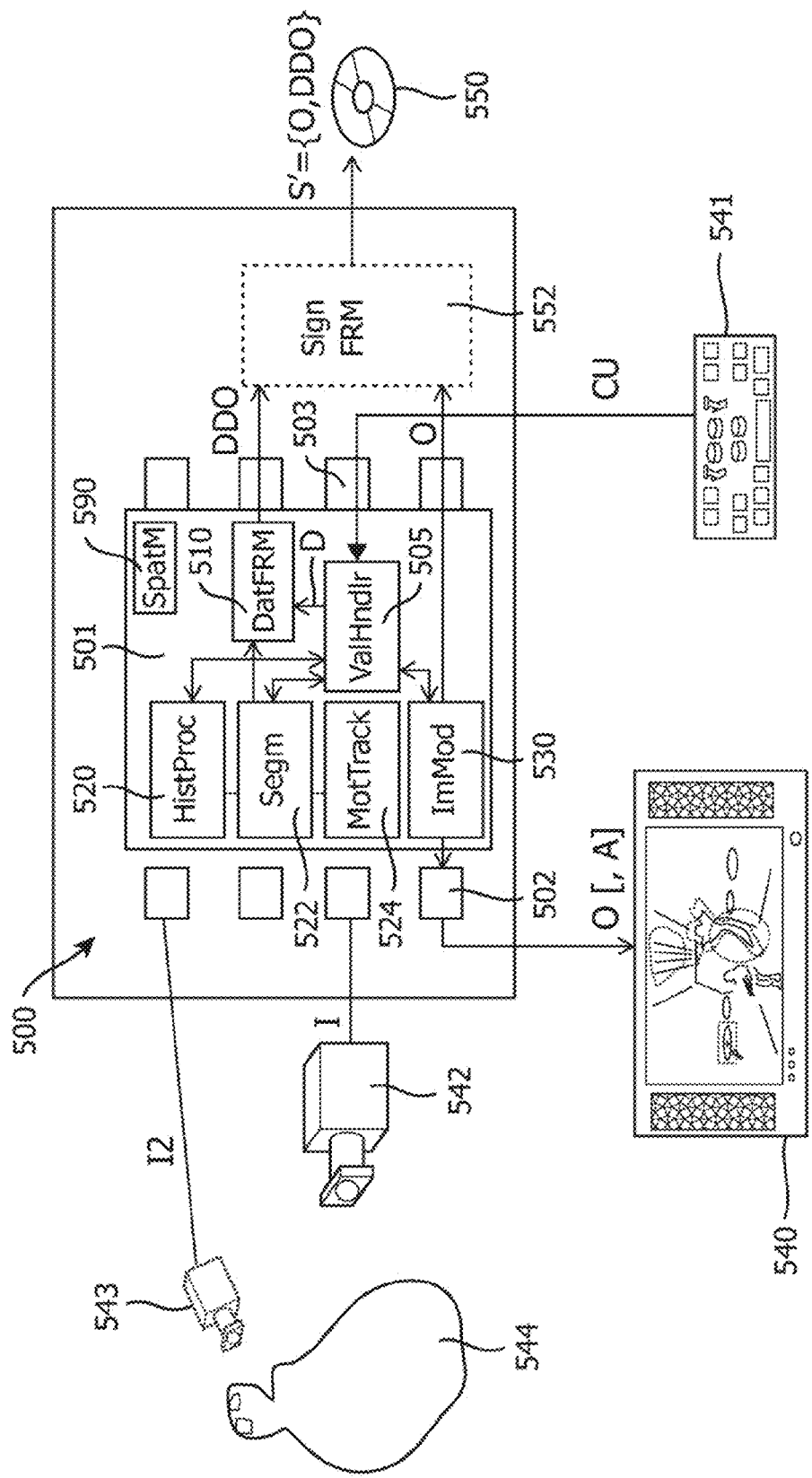
FIG. 5 schematically illustrates another environment with apparatuses and subunits allowing (i) the creation and (ii) inspection of regimes and regime specifications.

In another embodiment, the system for specifying regimes will typically have modes allowing for minimal user interaction (as the artists' time is expensive), and automatic image analysis algorithms can aid in fine-tuning (see FIG. 5). Using the system for specifying regimes, the color grader or user can very precisely delineate a spatial region on the picture which the color grader wants to treat, e.g. by moving the electronic pen 308 (FIG. 3), on an exact border of where the shadowy region may be drawn, but also a rough indication may be given like an ellipse or a rectangle 442 (FIG. 4). Because the greatest degree of control to specify regimes for selected objects or regions is offered if the user can both work on color/luminance properties (typically histograms) and image regions, there are additional information panels (450, 460, 470) as shown in FIG. 4. The additional information panels (450, 460, 470) do not merely display image information, but are widgets in which further selection can be realized by the user.

While the regime annotation apparatus (or software implementation) of FIG. 4 has been discussed herein with reference to regime cluster buttons, regime buttons, multipliers, and additional information panels for regime specification, it should be noted that for the many variants of annotation apparatuses/software, several or fewer of these components may be present to realize the job. For example, variants can include one or more of only setting luminance ranges, or only drawing spatial regions, etc.

In yet another example, in response to the color grader selecting a region 442 for highlight regime specification around a capture light in the image, the regime annotation apparatus (or software implementation) causes a histogram display panel 450 to output and/or show a bimodal histogram. The bimodal histogram in the histogram display panel 450 contains the bright pixels of the light and the darker pixels of the dark surrounding wall. Advanced regime annotation systems will model functions 490 based on this (i.e., the bimodal histogram), and allow the color grader to analyze, select and/or modify the selected regions and their pixel content on the basis of this complex information.

On the other hand, for simpler regime annotation systems, the color grader can use cursors 485 to select ranges (483, 484) of luminances. However, the simpler regime annotation system may still have the various models present because the models aid the understanding of the color grader of the local image structure/color properties; however, the models are not then modifiable in the simple regime annotation system. More particularly, the colorist can use cursors 485 to select ranges (483, 484) of luminances to specify which colors belong to a bright light regime (encoded with regime descriptor "Light_1"), whether globally in the entire picture (if they don't problematically occur in other objects anyway), or locally for that co-encoded spatial region. Mutatis mutandis to showing the histogram of a selected image region, when selecting a range of pixels in a (e.g., local) histogram, the system may show the corresponding region(s) 481 to the color grader.

The color grader can also work with local measurement cursors (a tool of image interaction helpers may contain, for example, a spyglass cursor 402, which can set a crosshair 404, from which a corresponding luminance value can be displayed in a luminance panel 470. This panel may contain coded-in-input-image luminances, or actually measured scene luminances. For example, luminances of a centre of the light Lc=5000, of selections where the light is less bright (L1=4000) being critical for optimally specifying the regime, if desired particular algorithmic transformations etc., and of the surround (L2=250), etc. The luminance panel 470 may have additional corresponding panels for allowing the color grader to specify which original scene measurements the color grader desires to be co-saved.

For example, with reference now to FIGS. 4 and 5, although the light may have a code 5000 in the captured input picture I, it may have a luminance of 9000 Cd/m$^2$ in the actual scene, as captured in situ of the camera 542, so this value may be co-stored with the other descriptive data (D) for region 442, or a ratio or other derived property may be stored. Vice versa, a sampling cursor 480 in property representations can map to the geometrical image, e.g. by placing crosshairs 404. This is merely a simple exemplary conceptual description, the skilled person understands that complex tools can be generated, for example, to indicate sub-histograms and modifications, tracking what happens qua image rendering, or the number of selected pixels or shape of the regime, etc., with interactions of the color grader.

In yet another example, the color grader may want to specify two kinds of regimes for the highlight rendering, one with a smoother gradient, and one with only a couple of different luminance values (which may show highly banded on a quality display (i.e., with HDR), yet not on a mobile outdoors display (i.e., with LDR)), and these may map with spatial clickable indicators on top of the movie image, so that the color grader can quickly toggle between them. That is, the high quality display for reviewing may then emulate typical outdoors sunlight, lowering the image quality. Thus, by simulating, one can quickly overview which luminance positioning works best under certain situations, before coding some or all of this. The overview of luminance positioning may include reviewing the ratio of the average luminance of a first region, e.g., a light, versus a second region, e.g., the wall around the light.

Because regime coding may oftentimes be linked to the rendering of ranges corresponding to pixel regions/objects which may or may not be actually specified regimes, this regime coding also relates to the transformations of these regimes. Typically, whether converting to a low dynamic range (LDR) or a high dynamic range (HDR) image representation, one may want to apply tone mapping curves on pixel regions or subsets of pixels (e.g., corresponding to the regions). For the light example selected in rectangle region 442 (FIG. 4), one may have already prescribed tone mapping for wall values, not necessarily only surrounding the light in rectangle region 442, but typically for the major amount of well lit pixels in the entire image. Tone reproduction modification panel 460 allows making such changes (while being able to judge the effects on the grading display 540 (FIG. 5) and to wisely select the (e.g., light) regimes (in particular, e.g., to which ranges of the reproducible gamut of the receiving display those should map) in correspondence with the look of other regions/elements of the image.

So in this simple example, the color grader may want to specify as further image region identification data in the descriptive data (D) the rectangle region 442 data (coordinates of top-left and size), and/or the range of the identified sub-histogram C1 identified by the color grader ($L_{min1}$, $L_{max1}$). Both the image analysis apparatus/software 500 at the creation side and the receiving display, or any intermediate apparatus, may further finetune this region identification information. For example, by means of a segmentation module 522, the actual light elliptical shape may be determined. In addition, smart algorithms of the segmentation module 522 may not need accurate specification of the range in the luminance histogram, since the smart algorithms can use these as guidance seeds in a mode which segments, taking into account dominant image edges on the borders of image objects. Furthermore, as to what the receiving display should do with the identified regime, as said above the receiving display may either use a default proprietary transformation according to only a few predefined standardized regimes (e.g., make the lights as bright as possible); however, the artist or color grader may find that look excessively ugly, and more tightly specify, if not the actual processing of the receiving display, then at least in what final rendering look (output luminances/colors) that processing would result.

With buttons 434 (FIG. 4), the artist or color grader may specify a multiplier 435 which states, for example, that preferably the lights should not be brighter than 10 times the brightness of the average luminance image regions (the ones which are typically optimally illuminated when capturing the scene, and which will get allocated a large part of the LDR gamut). The artist or color grader may specify the luminances of different regimes compared to each other, determined on new physical quantities, for example, like impact, or annoyance. More particularly, depending on the receiving side display white luminance, patches of certain size and brightness may distract too much from the actual action in a movie, so the artist or color grader may with a parametric equation specify their absolute or relative luminance levels, to take these quantities like annoyance into account. For example, a relative luminance level can be a luminance level relative to surrounding image regions, or display surroundings, and/or a local average luminance, etc. Accordingly, parameters specifying the rendering on the receiving display (i.e., typically the image processing algorithms it will perform) can be of various types, including actual parameters for mathematical image processing functions, but also parameters. Those parameters can comprise, for example, parameters encoding a rough approximation shape specified with line segments 250 into which a curve should fall, e.g., a reflection profile as in FIG. 2 (leaving some room for different processing to the receiving display, but not too much).

With reference again to FIGS. 4 and 5, a more complex example is the "Unhide" regime 426 applied to the identified monster region 441 (which the grader may have outlined with medium precision, i.e. not just an ellipse, but not pixel accurate, and then the segmentation module 522 may collocate the region 441 with the object boundaries, and a motion tracker 524 may track it in successive images). The difficulty here lies in the receiving display rendering however. The purpose is that the rendering of the monster is or isn't just visible in the dark (the color grader may specify that the monster's face is barely visible and its body not yet), which inter alia depends on the exact surrounding pixels (so a spatial profile may need to be applied, and this may have to be fine-tuned with spatial profile allocation panel 490 and module 590).

For the user's convenience in changing the intended rendering, profile shapes may be specified not just in luminances, but also in other calibrated units, such as JNDs (for one or several typical display scenarios). For optimal effect, this also depends on calibration of the images/video for the receiving display in its environment. For example, upon startup of an optical disk movie, a blu-ray disc (BD) live application can ask the viewer if the viewer wants the optimal experience, and show the viewer a couple of dark patches which the viewer still has to differentiate with the viewer's room lighting. In another example, a movie theatre may be calibrated, several times or at a few times, with a camera or other measurement devices for the displayed content in the back of the cinema, etc. Such issues are much better controlled by the color grader than ever by the cameraman and lighting director (especially, if computer graphics manipulation is involved). Further examples are presented herein below of what can be achieved by this system when classical camera capturing becomes impractical, especially for high dynamic range (HDR).

As other examples, the embodiments of the present discloser show how regimes can be used with subtypes for specifying rendering differences, and to match rendering with different categories of displays. Suppose that an image to be rendered includes an explosion, which geometrically covers a significant percentage of the image area. Boosting such an explosion too much may distract from the story, or even irritate. Similarly, the amount of boost of a fire, may depend on such parameters like area, time duration of presentation, color, surrounding colors. For example, one may want to render the sun very bright in a science fiction movie where one flies towards the sun, but less bright and relying more on hot colors, when rendering it in the sky in a desert scene. Accordingly, this could be encoded with "Brightlight_1" vs. "Brighlight_2", different regimes of high luminance rendering ranges.

In addition, returning again to the example of a fire, the amount of boost of the fire may also depend on the texture and/or structure of the fireball, e.g., how much dark smoke is covering it. Furthermore, if there is more smoke, one could make the in-between glow brighter, or at least psychovisually coordinate the colorimetry and especially the luminance relation of those two sub-regions. Accordingly, subclasses of the fireball regime could include "Fire_Hardly_Covered" for 100-80% coverage, "Fire_Partly_Covered" for 79-40% coverage, and "Fire_Largely_Covered" for 39-10% coverage with dark sub-regions.

With such additional regime characterizing information, such as, spatial properties, texture properties, object classes, artistic intent, etc., the different displays or apparatuses using the coded image can better tune their final rendering or transformations therefore. Also, the regimes can be used to map to smartly allocated luminance subranges of different displays (e.g., several "lights" and "whites", several "darks", several characteristic/control "greys", etc.).

In another example, take the rendering of a scene on two HDR displays that include (i) an intermediate, near future one with a display white luminance of 1500 nit, and (ii) a higher quality HDR display of 4000 nit display white luminance, and the rendering of the scene on a default "LDR/standard" display of 500 nit display white luminance. One can see these HDR displays as upgrades, in that there exists an additional "effect/boost" luminance range(s) above the capabilities of the lesser quality one. Naively, one could blindly boost all bright areas, e.g. the abovementioned fireball, or a light like the sun, or a street light. Whereas the effect may be powerful, but still acceptable on the 1500 nit display, on the 4000 nit display the bright region's rendering could have too excessive a brightness. Therefore, one could use the high end of the luminance range of the 4000 nit HDR display for other kinds of light source renderings (e.g., laser beams fired), and constrain the fireballs to a sub-range of lesser luminance. In the 500 nit LDR/standard display gamut, there is no room for all these different types of light regimes, so they are all rendered in the same sub-range at the high luminance end of its gamut. The regime coding could give further specifics on how to render on the different kinds of display, e.g., instruct to simulate a different luminance with other light properties, e.g. make the light slightly more yellowish or bluish.

FIG. 5 shows an example of an image analysis apparatus 500 for allowing the user (color grader, colorist, director of photography, (computer graphics) artist, etc.) to create the color regime specifications (which can include automated creation of the same, as discussed further herein). The image analysis apparatus 500 includes at least an image processing unit 501, wherein the image processing unit 501 can comprise a dedicated color grading apparatus, or a generic processor (GPU) of a normal computer running color grading and regime creation software, according to the embodiments of the present disclosure. Typically the image processing unit 501 will have a large set of image analysis units (or software tools, or plugins, e.g., edge detectors, texture characterizers, human person identifiers, etc.) allowing intelligent pre-analysis of the input image, allowing creation of quick user interaction widgets (e.g., re-shapeable spline contours) so that the artist has to spend minimal effort defining the regimes, their meaning, perhaps some linguistic explanation (which may, for example, be used if the movie is to be remastered later, by knowing the artist's intent), and what the receiving display should do. The output image (O) to be sent to the receiving display may just be a copy of the input image (I) from a main camera 542, but may also have been modified (e.g., by applying tone reproduction modification curves to selected regions) by an image modification unit 530, in which case the resulting image is what the artist would want to see on the calibration display 540.

In contrast to the embodiment shown in FIG. 3, a post-production color grader using the image analysis apparatus 500 of FIG. 5 may have a complex control panel 541 as user interaction means. A data handler 505 (ValHndlr) will take user input, for example, clicks on a button to move a cursor, and convert the user input into usable descriptive data (D), such as selected regional template colors. The data handler 505 is configured to communicate with other modules of the image processing unit 501. For example, data handler 505 can communicate with the histogram processor 520 (HistProc), which can then, e.g., if a new rectangle is selected, recalculate the histograms of all pixels inside thereof, map a set of Gaussians to the data, etc.

In addition, the data handler 505 is arranged to perform user interface interaction. User interface interaction can include not only showing, e.g., via grading display 540, the results from image analysis to the user (i) in an understandable way, but also (ii) in a way that allows easy interaction with those image analysis results. In one example, showing the results from image analysis can include emphasizing or pre-presenting special regions by automatic image analysis of the image properties. The automatic image analysis of image properties can include, not only luminance based image analysis, but also content recognition based image analysis, such as, in more advanced embodiments. In another example, showing the results from image analysis in an understandable way includes pre-showing regions and their multi-modal content by pseudo-coloring the geometry of the captured image, or pseudo-coloring property representations. Property representations can include, for example, histograms, or classification property graphs, such as a two-dimensional chart showing the extent of the region in numerical texture properties.

In yet another example, showing the results from image analysis in a way that allows easy interaction with those image analysis results includes showing what extra pixels are selected or how they get a different colorometric look, if the user manipulates the histogram, and providing feedback for user interactions. User interactions can include interactions not only to extract regime parameters, but also to reprogram the image analysis algorithms. For example, the image analysis algorithms of an image segmenter (i.e., segmentation module 522 (Segm) in FIG. 5) may be reprogrammed based on the user's new semantic designation input regarding the content and structure of the image and how it should artistically look.

With reference still to FIG. 5, the image processing unit 501 further includes a spatial modification module 590 (SpatM). The spatial modification module 590 allows the system to do all kinds of spatial action, e.g., it may apply a parametric (tuned by the artist) reshadowing profile to a selected region.

Data encoder 510 (DatFRM) formats the set of descriptive data (D) to a final output description data signal (DDO), i.e., although complex coding transformations may be used. Data encoder 510 may also simply copy selected histogram/range/color properties and/or parameters, the selected spatial information, processing algorithms, etc., directly in the signal DDO. Selected histogram/range/color properties and/or parameters can include, e.g., one or more of at least one luminance value ($L\_x$), a minimum and maximum luminance ($L_{min}$, $L_{max}$), multipliers for specifying the relationship of a first and a second luminance, etc. Multipliers for specifying the relationship of a first and a second luminance can be determined, for example, by a mathematical formula for two sets of pixels. Selected spatial information can include, e.g., parameters for a linear chain encoding of a selected image region. Lastly, processing algorithms can include, e.g., a mathematical tone reproduction curve to apply to the selected region pixels.

Image analysis apparatus 500 further includes a signal formatter 552 (SignFRM). Signal formatter 552 is configured to add regime data containing signal DDO to the image signal data O, to create a final picture signal S'. Note that image signal data O can include a potentially processed output, having been modified via image modification unit 530. The final picture signal S' may be stored on a blu-ray disk (BD) or other storage medium, indicated by reference numeral 550. But of course, if the output image data signal is directly transmitted/broadcasted (from a processing boot of a television studio, where colorimetric regime interference may be simple yet still occur nearly real-time), then the descriptive data signal DDO may also be transmitted, e.g., over a separate channel than the outputted images O, e.g., via the internet for a selective set of viewers.

As mentioned above, in one embodiment, the descriptive data signal DDO is transmitted over a separate channel than the outputted images O. Transmitting over a separate channel is in-line with providing backwards compatibility. For example, non paying customers may only get a lower color quality signal O (i.e., for use at least on a low dynamic range (LDR) rendering display), however paying customers may get the additional data DDO allowing the paying customers to get a much more perfect—artist intended rendering—on the paying customers' high quality display (e.g., high dynamic range (HDR) rending display). Another embodiment includes a scalable scenario, where several different quality image streams are possible. For example, a mobile viewer may select a lower priced, lower bitrate stream, but also a regime set to allow the mobile viewer to create an optimal rendering.

With reference still to FIG. 5, a second camera 543 (or optical measurement device such as a spectrometric camera) may be present for analyzing details of an object 544 (e.g., light-matter interaction properties, or further object properties). When capturing high dynamic range scenes, on the one hand one may need an excessive amount of image codifying data, and on the other hand one may capture more of the scene than is desirable. For example, blemishes of the décor may be captured, which the artist doesn't like to be rendered, or the rendering thereof is not necessarily very critical/important, or not even possible on some displays (e.g., in dark regions).

In accordance with an embodiment of the present disclosure, regimes can also be used to change the encodings, or more complex colorimetric modification encodings, of the underlying pixel images. For example, a "bad" camera (such as, one used in a pre-existing 1960's movie) may have captured a dark shadowy region on a wall with little texture detail (i.e., mostly noise). However, for rendering on high quality displays (e.g., HDR rendering displays), a color grader may want and/or need to show some texture in that dark shadowy region.

Showing some texture in the dark shadowy region can be accomplished, for example, by adding a last few bits with a different encoding. In other words, a computer graphics pattern of wall blemishes may be encoded to be added in the last few bits of the underlying wall image. The encoding of a computer graphics pattern of wall blemishes may also take into account artist/color grader optimized de-noising, which may be quantified in the DDO signal. For example, the optimized de-noising can be quantified in the DDO signal as either a mathematical denoising algorithm possibly with a residual profile, or a pixel value geometrical profile itself. The receiving display can, in response to the DDO signal, then take this into account to tune the receiving display's de-noising or other image improvement algorithms.

In one embodiment, the computer graphics or other encoding, such as discussed in the immediately preceding paragraphs, may be determined based on actual measurements of a scene object by a second camera/optical measurer 543 (FIG. 5). The second camera/optical measurer 543 can be configured for finely measuring fine textures, and fine changes in reflectance. A regime code "Shadow_1" can then immediately be linked to this additional data (e.g., fine textures, fine changes in reflectance, etc.) for the receiving display rendering.

The data handler 505 may also provide the artist or any post-operator with a user interface to influence the final image encoding of the picture (and potentially additional data). Influencing of the final image encoding, may include, for example, how the scratches on the wall, or any structural encoding, may be encoded to allow a certain look or looks at the receiving display end. Thereto, the apparatus 500 is constructed so that the data handler 505 can interact with the image modification unit 530 (ImMod), so that each re-specification of the colorist can directly be converted into a re-coding of at least some regions of the output image O. A re-specification could include, for example, a specification regarding an importance of a dark regime, and its need to be rendered more or less realistic, high quality, visually stunning, etc. In addition, vice versa, any re-codings can, via the data handler and the other image analysis modules, be shown to the artist as the output image with annotations (A), as indicated in FIG. 5. Re-codings may include, for example, lowering the amount of bits for encoding a region, possibly putting some of the fine texture encoding in a second encoding. In addition, some of the re-codings may, for example, model typical display rendering characteristics. Furthermore, any re-codings shown to the artist can also include, for example, spatial overlays of the regimes on the image O, which may be toggled ON/OFF, to show the actual colorimetric look for different modeled typical receiving displays.

Figure 6:
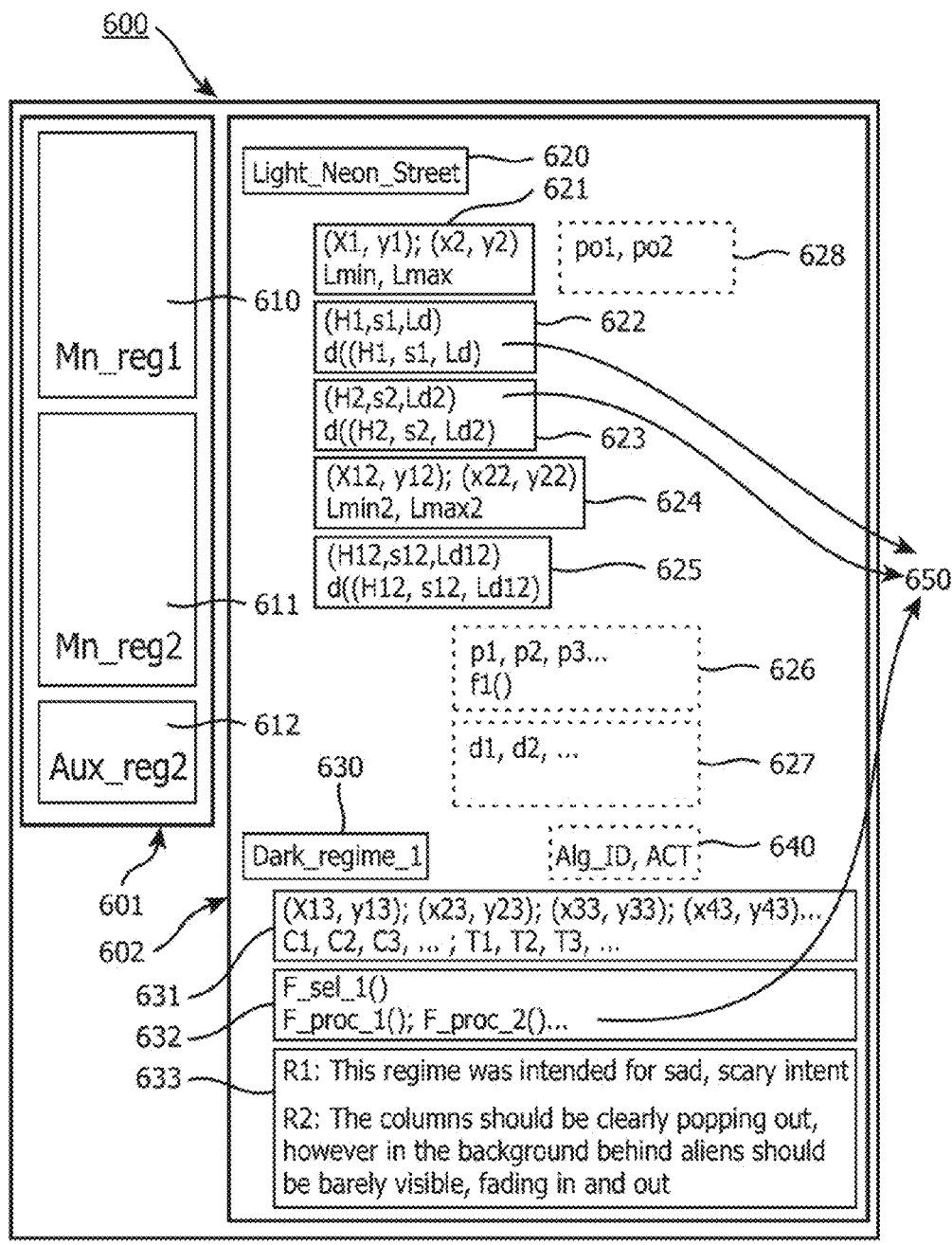
FIG. 6 schematically illustrates an image signal that can be used to communicate the rendering desires from the creation side to the display rendering side by means of luminance/color regime specifications.

FIG. 6 schematically illustrates how, according to one embodiment of the present disclosure, an image/video signal (e.g., compressed according to an MPEG standard like MPEG4.10 (AVC) or VC1, etc.) may be improved with color rendering regime descriptions. The skilled person can understand how this can be transmitted, e.g., over wireless or wired communication networks, so we will describe the following example in the light of storing on a memory medium. The memory medium may include an optical disk, harddisk, detachable memory card from a (consumer) video camera, etc. Typically, the captured video itself is stored, for example, as image signal 610 for a first region of at least one image, image signal 611 for a second image region, and there may also be an auxiliary signal 612. The captured video may comprise raw captured video, or could also comprise converted video, e.g., with tone reproduction curves. The captured video may further be stored as blocks of pixel values, DCT transformed, etc. In addition, the image signal 611 for the second region may be an overlay, e.g., a bottom ticker tape. The image signal 611 for the second region may also comprise the lighter regions of the image, e.g., if the first part only encodes captured pixel luminances below an upper value LCmax. Furthermore, the auxiliary signal 612 may comprise a signal for updating a region (e.g., of higher interest) with higher precision bits.

In the added regime specification, there is at least one regime 620 specified together with its describing data. The added regime specification may be written, for example, as disk management data on a reserved set of tracks on a disk. In this example, the at least one regime 620 is "Light_Neon_Street" and it relates to neon lights in the current shot or scene of images. The describing data can include, for example, not only what its properties are in the inputted image on the receiving side O, and what to do with it, color rendering wise, but also, for example, sharpness processing that may have an impact on the color look. Note that regime 620 is also a first regime specification of the at least one regime. As will be understood further herein, there can also be additional regimes, such as, a second regime specification 630, e.g., "Dark_regime_1", etc.

With reference again to the first regime 620 "Light_Neon_Street", in a simple signal example, there may be first region identification information 621. The first region identification information 620 may, e.g., be the rectangle surrounding a first neon light (with upper-left and lower-right coordinates (x1,y1) and (x2,y2)). The first region identification information can alternatively include information enabling selecting a range of luminances (Lmin, Lmax), e.g., so as to further select only the slanted stripe (i.e., a subset of pixels) of the neon lamp. The range of luminances (Lmin, Lmax) can thus be used to select a given subset of pixels. In other words, the information contained in the first region identification information can enable selecting a subset of pixels in the image based upon a luminance range. One could also directly link, with linking data 628, to parts in the encoded video, e.g., by using pointers po1, po2 to the start and end of a set of DCT blocks. One could also have such a rectangle (or a subset of pixels selected based upon a luminance range) for each of the successive images in the shot, which allows tracking moving objects explicitly. More complex encodings may contain a selection algorithm "F_sel_1( )" to select the region (or subset of pixels) in one or more successive images. The selection algorithm may involve picture analysis such as region growing, snakes fitting, motion tracking with coded motion parameters, etc.

In addition to the first region identification information 621 of the at least one regime 620, there are first regime rendering parameters 622. In one embodiment, the first regime rendering parameters 622 may comprise one or more of a desired average hue (H1), saturation (s1), and luminance or lightness (Ld), characterizing the light for the corresponding regime. There may be further specifications on allowed deviations d(H1,s1,Ld). Allowed deviations d(H1,s1,Ld) can include, for example, spatial deviations, deviations per rendering display, to take into account the viewing room environment, etc.

Alternatively, complex models can be encoded to what the receiving display should preferably do taking into account various parameters, e.g., maximum achievable brightness (display white luminance) of the receiving display, consumer preference settings, etc. With respect to consumer preference settings, the consumer may prefer very dark rendering of a horror movie. With very dark rendering, the "shadow regimes" may be emphasized and rendered differently, but also, the non-shadow remaining parts of the image may be darkened. On the other hand, the consumer may desire to brighten the shadow regimes to make the movie less scary (e.g., the moment or gradualness by which a monster in the corridor becomes visible—keep the monster visible out of sync with the scary music).

In addition to first regime rendering parameters 622 associated with the first region identification information 621, there can be additional regime rendering parameters, e.g., second regime rendering parameters 623. Second regime rendering parameters 623 can be used to render the first neon light in a different way, e.g., on a different receiving display or with different settings. The embodiments of the present disclosure further include versatility which advantageously allows coding of different parts of the image under the same regime. One example of coding of different parts of the image under the same regime can include allowing second region identification information 624 and third regime rendering parameters 625 to do something different with a red and a green neon light, however still retaining some coordination. For example, the red and the green neon light chromaticities or spatial profiles may be handled differently, but they may be rendered at a similar perceived brightness.

Furthermore, the describing data for the at least one regime 620 may also be encoded with rendering tuning data 626 and/or additional improvement data 627. The encoded rendering tuning data 626 may include parameters (p1, p2, p3, . . . ) or processing functions (f1( )). The parameters (p1, p2, p3, . . . ) can be for tunable algorithms, like a saturation increaser. The encoded additional improvement data 627 (d1, d2, . . . ) can be to improve a decoded image region, e.g. by adding a graphics pattern (or any other additional encoding to add to the decoded local picture) as in the black wall example above, or doing some filtering for changing the look, e.g., dedicated artifact processing etc.

In addition to the first regime 620 discussed above, the regime specifications may also include a second regime 630 specified for the same image(s), e.g., how to handle the darker regions. This may be done, similarly as discussed with reference to the first regime, by adding third region identification information 631. For example, the third region identification information 631 can include any one or more of (i) a chain code or control points for a spline or other parametrized contour code (x13, y13); (x23,y23), (x33,y33); (x43,y43), . . . , and (ii) characteristic property data of the region (or subset) of pixels in the image O corresponding to the mentioned regime which may, e.g., be used as seeds or aid otherwise in a segmentation, which can be done at the receiving side, to extract the region (or subset) of pixels to be rendered in a prescribed way. Characteristic property data of the region (or subset) of pixels in the image O corresponding to the mentioned regime can include, for example, colors C1, C2, C3, . . . which may correspond to particular colors such as predominantly occurring colors. Similarly, characteristic property data of the region (or subset) of pixels in the image O corresponding to the mentioned regime can also include histogram modes or texture values T1, T2, T3, . . . . Other geometrical specifications can also be used, e.g., covering hierarchies of rectangles, etc. Furthermore, there may be regime specification functions 632, both (i) for extracting a particular region (or subset) of pixels (F_sel_1( )), and (ii) for processing the same, e.g., for rendering it on a main display (F_proc_1( )), or derive from it a rendering for an auxiliary display (F_proc_2( )).

As can be understood from the disclosure herein, the various parameters relating to average intended color and deviations (622, 623), bounding functions, goal functions, processing functions (F_proc_1( )), etc., are all examples of rendering specification data 650. Depending on how tight the algorithmic identity of the sending and receiving side is coordinated, the rendering specification data may further include algorithmic identification codes 640 that comprise an algorithm identifier (Alg_ID) and an action identifier (ACT). The algorithm identifier (Alg_ID) identifies which receiver side algorithms or type of algorithms are involved and the action identifier (ACT) identifies how the corresponding identified receiver side algorithms or type of algorithms should coordinate their action for intended rendering. For example, a receiver side algorithm may be as simple as the artist requesting that denoising should be switched off for a certain regime, or be applied to a certain strength. Of course, it is easier if, for example, a blu-ray player is arranged to correspond to what the new generation of disks desire, and handle all processing; but, it may then be preferable to still control something regarding the additional display processing.

Still further, the rendering specification data may also include a description field 633, allowing the artist to specify what the artist's intent was in rendering the regime, how this can actually be realized psychovisually mathematically on the underlying image scene elements, etc. For example, the artist's intent could have been that "it should look dark and uninviting". Additionally, the artist's intent on how a regime can actually be realized could include, for example, "the columns should be conspicuously visible, yet the deeper parts of the cellar behind it should be rendered in a mysterious, difficult to discriminate way." This data descriptive, of the description field 633, can be used by a receiving-side transcoder on a later occasion, or be relayed to the final viewer via a user interface as textual description of the artist's intentions. Of course, more encodings could be added to this mere conceptual illustrative example.

Figure 7:
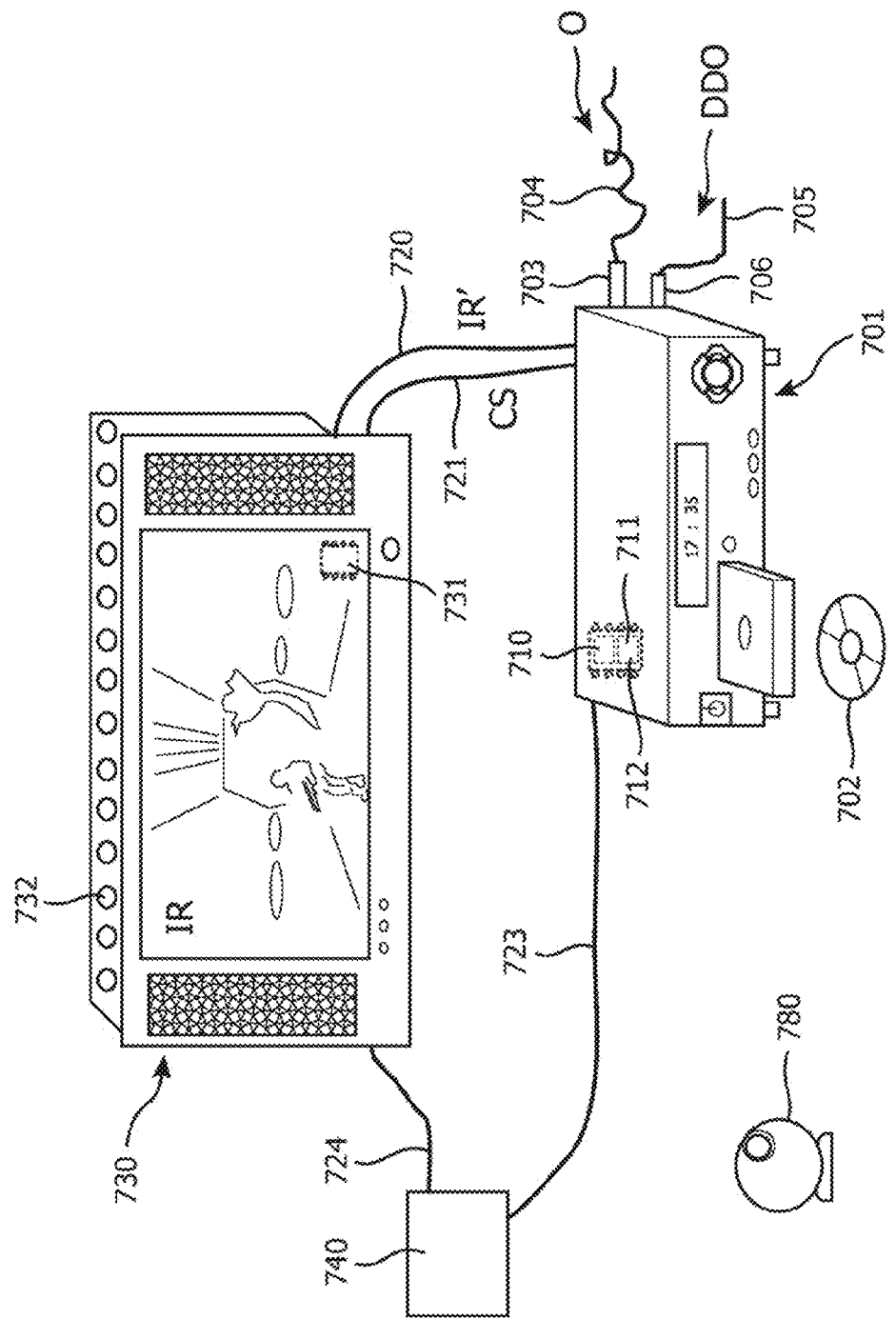
FIG. 7 schematically illustrates a display system on the receiving/rendering side, and apparatuses and components to extract regime specifications and to control the image processing for final rendering by the display system on the basis of the regime specifications.

FIG. 7 shows an exemplary image decoding and displaying system at the receiving side, e.g., in a consumer's living room. While FIG. 7 is just an illustrative example, it is noted that the skilled person will understand how a similar system according to principles of the various embodiments of the present disclosure can be implemented for a digital cinema theatre. An embodiment of color rendering image processing apparatus 701 is a set-top-box (STB) with built-in blu-ray reader. However, the color rendering image processing apparatus 701 may also comprise, for example, a laptop computer, or portable device like a mobile phone, etc. In addition, the color rendering image processing apparatus 701 can be as small as a plug-in card (i.e., as long as it is able to read the regime specifications, and allow color processing with the regime specifications), or as big as a professional cinema transcoding studio. Referring still to FIG. 7, the set-top-box with built-in blu-ray reader is able to receive a blu-ray disk (BD) 702 embodied with an entire regime-annotated image signal encoded on it, i.e., both an image signal O, and a description data signal DDO containing the descriptions of different occurring regimes. For example, the descriptions of different occurring regimes may include regime descriptions for a few artistically critical shots, e.g., where night horror action occurs, or blasts of exploding space ships, or vividly colorful dream sequences, etc.

Similarly, in one embodiment, the color rendering image processing apparatus 701 may have a first connection 703 to a television signal transmission cable 704, which carries the (typically compression encoded) input image (O) or image signal. In another embodiment, the first connection 703 may also comprise a connection to an antenna, an input for digital photos on a memory card, etc. In addition, image signal, as used herein, may also be interpreted to refer to a television standard encoded signal, a raw image file, etc. Furthermore, the description data (DDO) may come over another medium, e.g., via a second connector 706 connected to the internet 705 and a webpage (not shown) providing an image improvement service.

As disclosed herein, output description data signal (DDO) related to input image signal (O) can reasonably be interpreted as follows. Although the related DDO and O signals may typically be encoded on the same storage, or receivable via the same transmission, at least some means is provided to retrieve the additional output description data signal (DDO), which corresponds to at least some pixel region (or at least some subset of pixels) of some image of the input image signal (O).

Accordingly, in one embodiment, image processing apparatus 701 includes an integrated circuit (IC) 710 which has at least an extractor 711 arranged to extract from the output description data signal (DDO) the regime encoding data, and either output it directly or convert it to new values more suitable for doing controlled image processing by an image processing unit 712. This may be embodied so simple as to only apply some tone reproduction transformations to the pixels corresponding to the special to be rendered regime, or have complex algorithms, e.g. typically corresponding to any of the algorithms that can be applied at the creation side, e.g., a segmentation and/or tracking algorithm/unit.

In another embodiment, image processing apparatus or player 701 may output its improved intended rendering output image IR' to the receiving-side display/television 730 over a video cable 720 (e.g., an HDMI cable). In another embodiment, the television 730 may do, or be requested to do, additional processing, via its image analysis and/or processing IC 731, and thus, image processing apparatus 701 may also include a second connection (cable or wireless) 721 for communicating control signals (CS) to the television 730. The control signals (CS) may comprise any data from the output description data signal (DDO) and/or control data derived there from. Typically, additional control signals may be added over the video cable, by updating, e.g., the (wireless) HDMI protocol.

In yet another embodiment, the image processing apparatus 701 may also send color signals over connection 723 to a second, environment color display 740, which may also obtain its intended rendering color input signals via connection 724 and the receiving-side display 730. The exemplary display 730 can include a LED backlight 732, ideal for high-dynamic range (HDR) rendering. Environment measurement devices like measurement device 780 may be present, e.g., an inexpensive camera which can check the surround of the television, lights in the room, reflections on the television front plate, visibility of calibration grey scales, etc. The environment measurement devices may communicate measured environment information to image processing apparatus 701 and/or receiving-side display 730. In addition, the environment measurement devices may generate an input for colorimetrically (e.g., luminance and/or chromaticity) controlling several apparatuses in a room, such as displays, lights, shutter glasses, etc.

Figure 9:
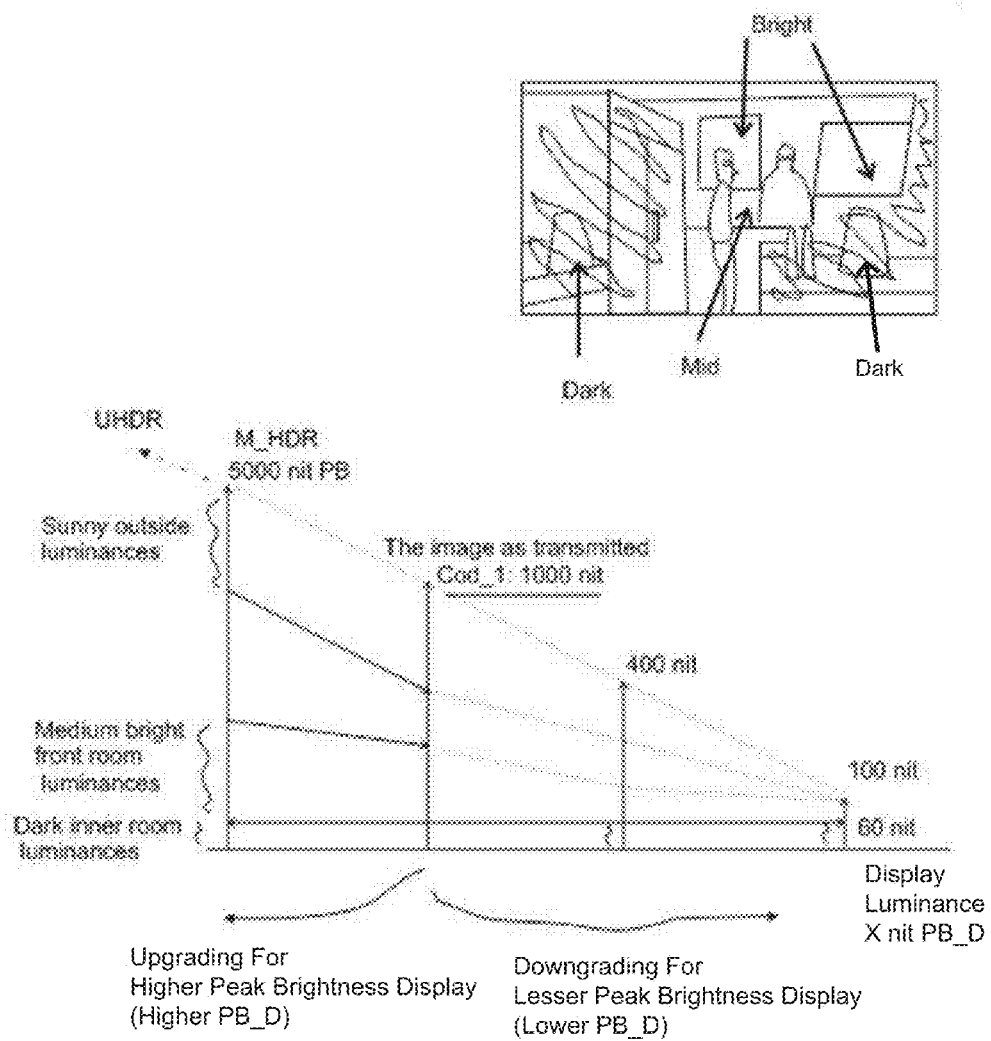
FIG. 9 schematically illustrates, in principle, an example of display tuning of three brightness regimes to a so-called "display continuum," in accordance to one embodiment of the present disclosure.

With reference now to FIG. 9, additional details according to the embodiments of the present disclosure shall be discussed. The figure schematically illustrates, in principle, an example of display tuning of three brightness regimes (Bright, Mid, and Dark) to a so-called "display continuum," in accordance to one embodiment of the present disclosure. For instance, one could segment out only the pixels being part of the outside-the-window region (e.g., corresponding to the Bright regime), and then do some processing on that (e.g., boost parameters only for that region, in case a higher peak brightness image is calculated from a lower dynamic range image), or something similar for the other regions (e.g., corresponding to Mid and Dark regimes).

However, in practice, some embodiments will just use a single Luminance_HDR-to-Luminance_LDR function (or the other way around), which happens to be tailored so that the brightest pixels (the shape of the brightest subpart of the function) automatically becomes correctly mapped. As used herein, "regime" is not to be interpreted as "code the darks this way" and "the brights that way," since mere coding is typically just a global optimized function shape, typically taking care of a sufficient amount of data to avoid such things as banding. Nor is "regime" to be viewed only indirectly in a shape or as a custom curve generalization of a simplistic gamma function linking the first and second dynamic range images. Rather, regime(s) should be linked to how the image(s) needs to be re-graded/tuned for various, e.g. typically rendering side situations taking into account that these different regimes have to be squeezed together (or stretched apart) in the various MDR/UHDR gradings.

This re-grading/tuning has to take into account both rendering side limitations such as a limited display peak brightness, and the artistic and particular needs of an image or shot of images of a HDR scene to get a reasonable look, often close in appearance to the look of the master HDR image, which can be complex to combine together. This is accomplished whether by actually communicated luminance mapping functions, or just a few parameters "guiding" the auto-TV re-grading, which then at least is neither fully blind/simplistic nor has to do all content-type analysis in the TV/STB. Note that also some embodiments can work with both communicated precise functions to do a transformation of input luminance values into output values, but also some coarse parameters could also specify a coarse remapping of the luminances, e.g., as a second step to the precise luminance remapping. In the example of FIG. 9, the re-grading or tuning takes into account the different regimes, e.g., the dark kitchen and the sunny outside should, if possible, be sufficiently luminous compared to the indoors to appear realistically sunny, etc.

With reference still to FIG. 9, in principle what is needed to tune to the so-called "display continuum" can be more complex or less complex, but in any case, it will be better than just blind gamma-stretching in an Auto_TV or doing nothing (i.e., just mapping e.g. a 1000 nit Blu-ray Disc high dynamic range (BD_HDR) video to whatever PB_D). Ideally, one uses some optimal determined tuning function (FTU) or mapping strategy (i.e., based on whatever any embodiment can send from the creating side; e.g., on real-life shows, the grader will typically be a cameraman or producer turning a dial to set his camera OETF-function a little more bright for the darkest regions, etc.). One difference with doing that in prior methods, where it yielded an optimal standard SDR, is that in one embodiment of the present disclosure, the at least one parameter of the changed OETF function is communicated, so that the receiver (or rendering-side display) can obtain, not only the optimal SDR or reconstruct a HDR image if a lower DR coded signal was received, but can render or produce any optimized medium dynamic range MDR grading or re-grading.

As illustrated in FIG. 9, for the 100 nit PB_D, there are so many different lighting regions, one may select the optimal tuning (re)grading protocol for the HDR image (artistically mastered to M_HDR 5000 nit, sufficiently characterizing everything happening in it), which maps all the sunny outside luminance pixels to the same point being clipped white (R=G=B=1023 in 10-bit coding) only (because the SDR range isn't large enough for sufficient contrast in the three regions, and there was important content which needed to be well rendered in the lower two regimes). However, for the 400 nit PB_D, there is some compressed variant showing somewhat of the colors outside, be it contrast-reduced. One can also follow the dashed lines projecting the three ranges of luminances (i.e., sunny outside luminances, medium bright front room luminances, and dark inner room luminances) to various possible PB_D re-gradings as ideally desired, where the mathematics and received parameters from the creator allow doing so. Otherwise, one must "approximate" the re-grading which results in at least better behavior than doing blind auto-mapping. In addition, the embodiments of the present disclosure can have "anything to anything" optimization scenarios, with at least one smart content-dependent, e.g., content-average dependent parameter being communicated via image metadata from the creation/transcoding side to the rendering side.

Figure 10:
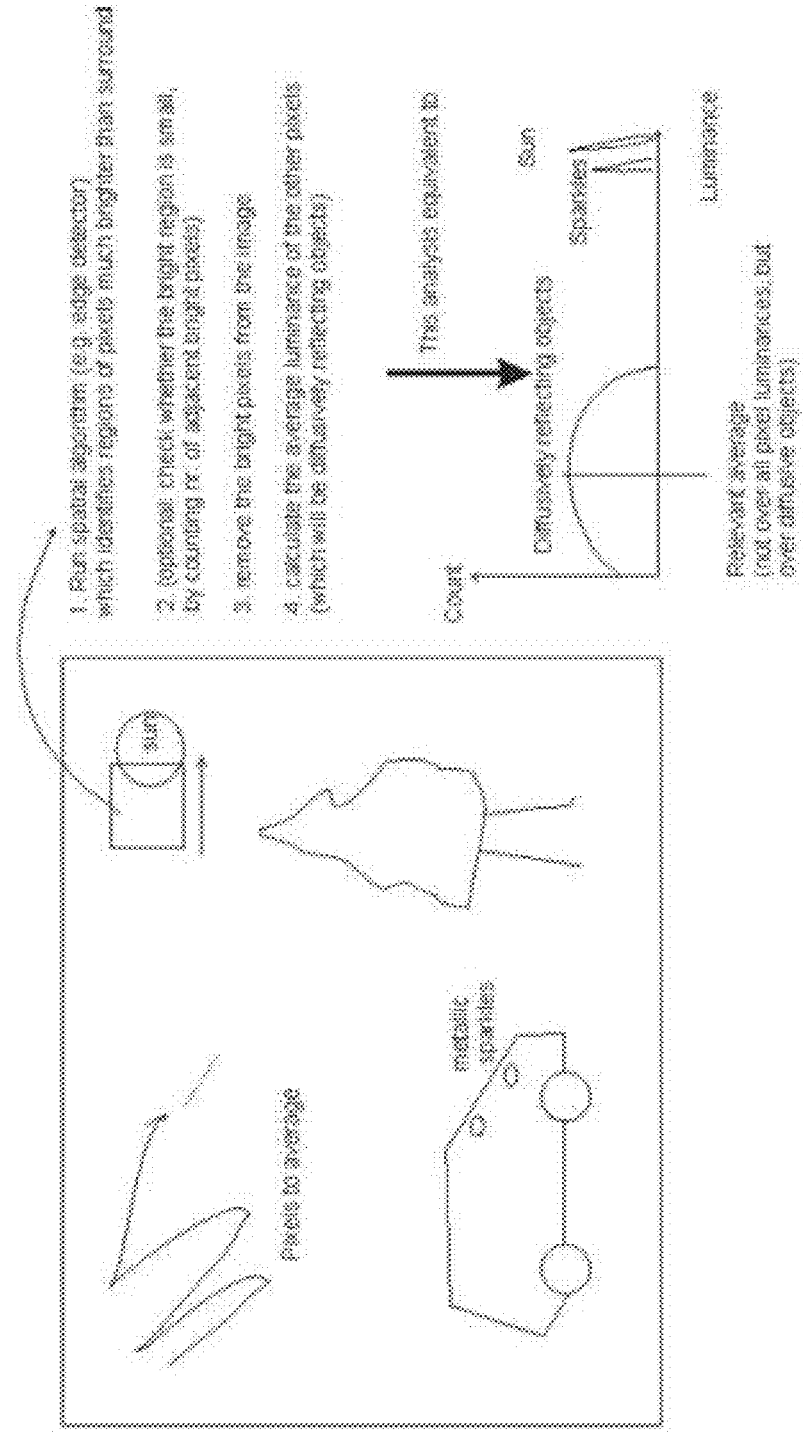
FIG. 10 schematically illustrates a master graded high dynamic range (M_HDR) image shown in conjunction with a histogram analysis algorithm in accordance with one embodiment of the present disclosure.

With reference now to FIG. 10, a master graded high dynamic range (M_HDR) image is shown in conjunction with a histogram analysis algorithm in accordance with one embodiment of the present disclosure. This method will typically be performed at a content creation or coding side, to come to a good at least one content-dependent parameter to be co-communicated. The histogram analysis algorithm in FIG. 10 is directed to an example of a bright regime and diffusive average calculation method. The M_HDR image includes, for example, the sun, a vehicle with metallic sparkles, a tree, as well as, other pixels to average. The analysis algorithm includes a first step of running a spatial algorithm across the M_HDR image (e.g., using an edge detector) which identifies regions of pixels much brighter than surrounding pixels. In a second (optional) step, the algorithm determines whether any identified bright region(s) is (are) small (e.g., by counting the number of adjacent bright pixels). In a third step, the algorithm removes regions of identified bright pixels from the image (and/or disregards those identified bright pixels with respect to the image). In a fourth step, the algorithm calculates an average luminance of the other pixels (i.e., corresponding to diffusely reflecting objects).

The algorithm analysis is equivalent to the graph of pixel count vs. luminance also illustrated in FIG. 10. The graph illustrates a pixel count of diffusely reflecting objects, sparkles, and sun, per luminance. A relevant average is calculated (relevant meaning saying something important about the content, such as where the main object content is, not including the HDR effects which can be various and depending on capturing and master grading contain any possible luminances, i.e., potentially offsetting a normal average luminance in an unknown manner), i.e., not over all pixel luminances, but over diffuse reflecting objects alone. Variations of the algorithm are also contemplated.

Accordingly, if one can calculate the histogram statistics in this manner for one image, then one can do so for a number of images (e.g., between two images identified as scene endpoints by a scene change detector) or an entire movie. In the movie, the brightness of the diffuse objects may vary (e.g., night vs. day sun vs. overcast), especially in a well-made master HDR graded image. In a simple version, the algorithm can calculate the average over the entire movie. Comparing that with the luminance of the bright histogram mode (regime) of the present image or run of images from a single scene, this gives some indication of how HDRish the current image is, which corresponds to a primary factor for the display tuning.

For example, in a received SDR image of the HDR scene, all diffuse objects are mapped up to 70%, and the brights (i.e., the pixels with luminances falling in the brightest sub-range, such as the sunny outdoors pixels) squeezed slightly above. A variable luminance mapping function can be used to reconstruct the M_HDR from this received SDR. In addition, an optimal display tuning will also depend on which regimes there are, and where, to optimally luminance-position them for each possible MDR. In a good quality HDR coding, the diffuse average luminance will vary around some average (e.g., which will be the position for some intended typical TV rendering, so that the sunscapes don't look to annoyingly bright for evening TV viewers, and the night scenes are appropriately dark). MDR images will follow similar rules, e.g., they may retain the same average luminance as the master HDR image, or, in case they cannot afford rendering so brightly because of MDR display limitations, they need to lower the average luminance, and therewith other luminances around it, whether by a sole communicated content-dependent characteristic luminance (functioning as a control parameter shaping the ultimate SDR-to-MDR or HDR-to-MDR luminance mapping function) and/or luminance transformation function shapes. Thereby the MDR image generation will not just start from the luminance data in the dynamic range image forming the starting image for the luminance changing calculations (e.g., the reconstructed or directly received HDR image) but will further take into account what this particular content (i.e., scene construction, with in particular the distribution of object luminances) needs for its re-grading like squeezing together luminance sub-ranges in particular optimized manner, as communicated by the creation side, e.g., non-limitingly a human grader selecting one most appropriate luminance value for this HDR content, for shaping the manner in which the MDR re-grading will happen for any actually present display at an image encoding receiving site.

Figure 11:
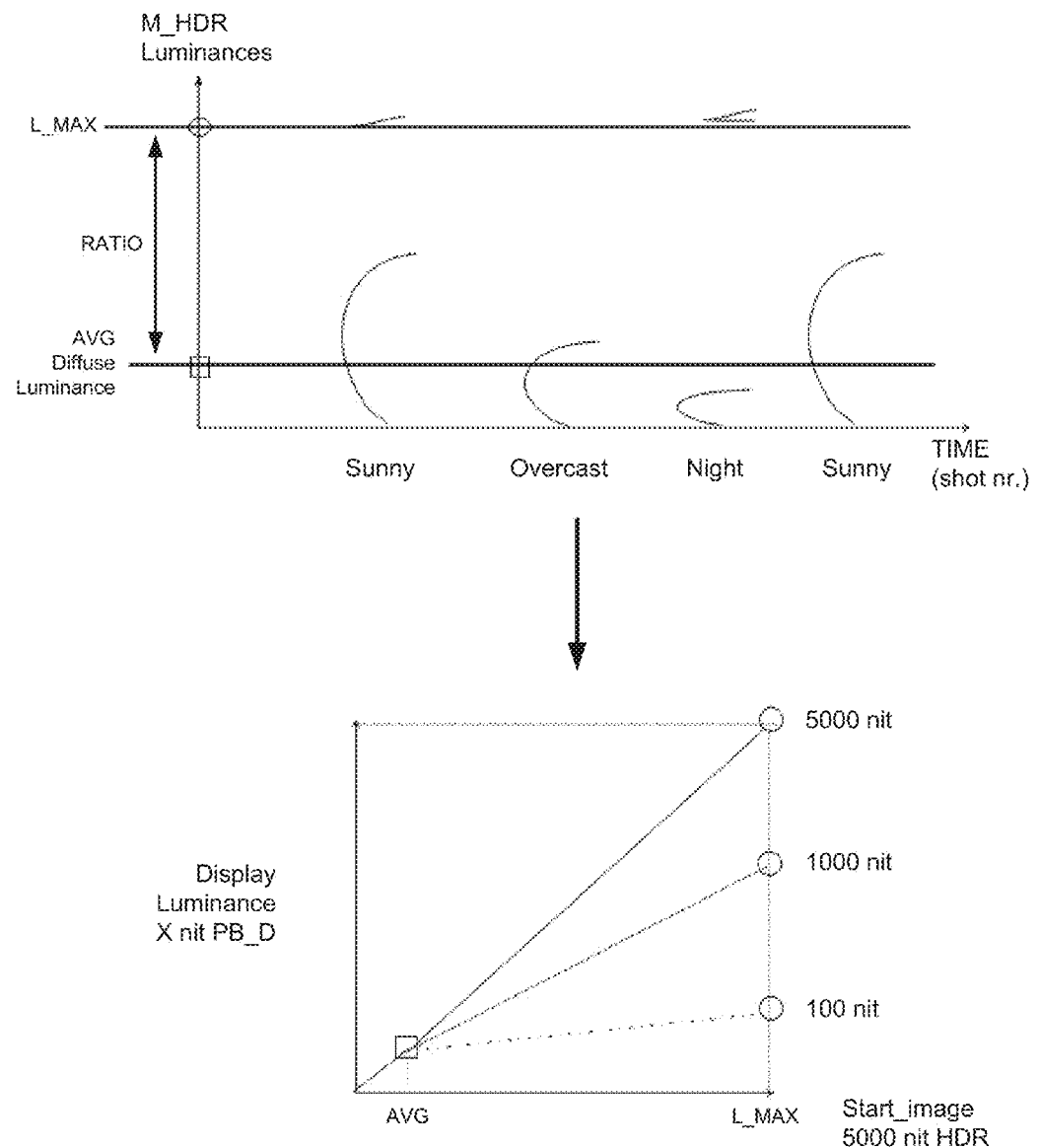
FIG. 11 schematically illustrates a plot of master graded high dynamic range (M_HDR) image luminance vs. time (i.e., image shot number (nr.)) in conjunction with a histogram analysis algorithm applied to a movie and a corresponding plot of (re)grading curves of optimal image luminance for various x nit PB_D vs. PB_C luminance, in accordance with an embodiment of the present disclosure.

With reference now to FIG. 11, a plot of master graded high dynamic range (M_HDR) image luminance vs. time (i.e., image shot number (nr.)) is shown in conjunction with a histogram analysis algorithm applied to a movie in accordance with an embodiment of the present disclosure. On the horizontal axis, exemplary shots include sunny, overcast, and night shots. Each respective shot includes a minimum and a maximum luminance. However, instead of a minimum or maximum representation of a regime, in simpler characterizations, another representative luminance can be used (e.g., an average or node position of a maximum count of a subhistogram).

As illustrated, the plot also indicates on the vertical axis an average diffuse luminance ($AVG_{Diffuse\_Luminance}$) over the entire movie and a characteristic luminance of the brightest objects (L_MAX) (or alternatively, an average sparkles luminance (AVG$_{Sparkles}$, over the entire movie. Note that averages may also be determined over a portion of the movie, other than the entire movie, e.g., for N successive shots of images and/or scenes of the movie. In one embodiment, the AVG$_{Diffuse\_Luminance}$ corresponds to the Midgrey regime, discussed earlier herein. From this a number of things can be learned which are typical for HDR videos and very atypical for LDR videos.

Firstly, the average diffuse luminance and the luminances in the lobe around it, of objects typically in this same illuminated region of the scene, will vary considerably between a night scene and a sunny day scene, because the grader really wants to convey the impression that the viewer is present in that country in that sunny scene where it was captured, or in that scare nightly environment. Secondly, there can be highlights at any position above the main lobe of average luminance objects. E.g. in a night scene, not only can the street lights be either off or on, but the content creator or grader could have decided to make those street lights bright according to any value above the average luminances. E.g., in various codings having the same average luminance of say 50 nit, the grader could have chosen to make the lights of the lamps either 5000 nit (i.e. 100× the average), or 500 nit, or 10,000 nit, or even in case they are communicated in an SDR image clipped to 100 nit.

Even if one had only a couple of different rendering scenarios with displays of different display peak brightness PB_D, a well-working HDR tuning method would still need to be able to reasonably correctly handle all those various situations. A ratio of the L_MAX (or AVG$_{Sparkles}$ to AVG$_{Diffuse\_Luminance}$ determines how much brighter the characteristic luminance of the brightest objects (e.g., sparkles) are than the rest of the image(s) (i.e., how strongly HDRish the coded image is). If the ratio is indicative that the sparkles are very much brighter than the rest of the image(s) (i.e., L_MAX and AVG$_{Diffuse\_Luminance}$ are very far apart), then it may be desirable to use a re-grading function which brings them closer to get a MDR for a particular PB_D (and likewise, use a different re-grading function when they are closer together).

With reference still to FIG. 11, the two luminance values, L_MAX and AVG$_{Diffuse\_Luminance}$, can advantageously be used to display tune (i.e., as a function of x nit PB_D) the shape of the luminance (re)grading curve. The graph at the lower portion of FIG. 11 illustrates optimal image (re) grading curves of display luminance in x nit PB_D vs. starting image M_HDR luminance. For a 5000 nit PB_C HDR image, the grading for a 5000 nit PB_D is illustrated via the top solid line or 5000 nit display curve. It is a diagonal curve corresponding with an identity transform, because for this particular 5000 nit display the luminances of a 5000 nit PB_C coding are already optimal. The regrading for a 1000 nit PB_D is illustrated via the middle dotted line or 1000 nit optimal display curve (FTU). The regrading for a 100 nit PB_D is illustrated via the lower dashed line or 100 nit optimal display curve (FTU). In addition, in this example as illustrated, the content midgrey (AVG) always maps to a given value (e.g., 25 nit) for all PB_D's. In other words, the average (AVG) locates the darker diffuse color regime. We point the reader to the fact that even such a simple embodiment already becomes content-optimal rather than solely display-dependent. If one only knew the PB_D value at the receiving side, one could do a linear compression, but would not know where to best bend the curve for various content, i.e. at the content-dependent AVG control point. That has a significant impact on the visual quality of the re-gradings for various MDR displays.

In addition, the graph in the lower portion of FIG. 11 is representative of a strategy "map content L_MAX or PB_C to rendering display max PB_D, whatever it is" and "map the communicated regime characteristic luminance value AVG for the N successive shots of images to, e.g., 25 nit, always" that can make all the PB_D display tuned curves FTU. In that case, even the HDR-to-SDR (i.e., to the particular 100 nit PB_D value down-tuning from the received or reconstructed HDR image) could now be a FTU function, i.e., a secondarily calculated one at the receiver (rendering-side display), rather than in a creation-side determined HDR-to-SDR function (or its inverse) F(L) which is communicated via metadata over a satellite channel, for example.

In accordance with one embodiment, display tuning is based on an average luminance, which is relatively lower or higher compared to the PB_D, thereby changing the tuning function (FTU) curve shape. Other embodiments condition the shape of the mappings (so also the MDR display-dependently tuned images) depending on the AVG$_{Diffuse\_Luminance}$ or average diffuse luminance over the entire movie value. For example, when mapping to SDR, M_HDR luminances of the movie can be normalized to 1.0, so that all shots are approximately the same histogram (at least of a less variable shape than the HDR luminance histograms). As a result, SDR erases, e.g., the look difference between sunny and overcast. If AVG$_{Diffuse\_Luminance}$ was (normalized to 1.0) higher for SDR than for the M_HDR over the entire movie, then the mapping function from HDR to SDR would be a boost (bringing the diffuse objects to SDR luminances of e.g., 30%), and similar boosts would apply for MDR images.

With this explanation, one can begin to understand better why the regime identifying luminance demarcator is important to have (e.g., if we want to generate the display-optimal MDR image by upgrading a received SDR image, it may not always be guaranteed that one maps always exactly to the 30% point (which may be a grader's choice), but in any case we need to exactly know where this diffuse objects regime ends with its highest demarcating luminance and how we need to (in the normalized representation) compress it for each shot independently and optimally (which will be encoded in the luminance transformation functions). So any embodiment of the luminance demarcator indicates where a regime of luminances (accurately or approximately resides), at least one regime, e.g. of the normal, most important, averagely illuminated objects. In various embodiments this could be e.g. an endpoint luminance of a luminance histogram lobe, or some position inside the lobe, e.g. a 50% halfway point, or a 75% point, etc. In all those embodiments the receiving side can use this information to optimally determine the shape of its final regrading function (FTU) to calculate the MDR image luminances.

Figure 12:
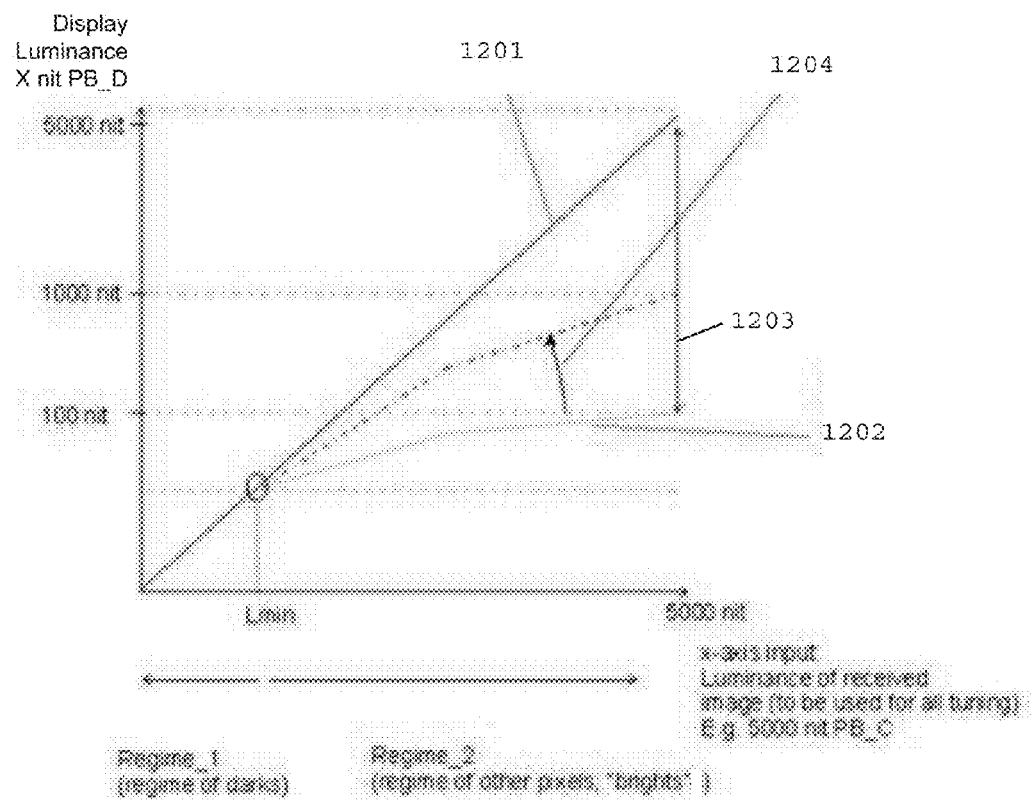
FIG. 12 schematically illustrates a plot of (re)grading mapping functions or curves of optimal image luminance for various x nit PB_D vs. PB_C luminance of a master graded high dynamic range (M_HDR) image in accordance with an embodiment of the present disclosure.

Turning now to FIG. 12, schematically illustrated is a plot of (re)grading curves of optimal image luminance for various x nit PB_D vs. PB_C luminance of a master graded high dynamic range (M_HDR) image in accordance with an embodiment of the present disclosure. This is an example of a rendering side TV (or computer, etc.) calculating all needed re-grading display tuning HDR-to-MDR functions, from whatever metadata describing the image content (in particular one or more content-dependent luminances, and/ or luminance transformation functions, etc.), or needed type of tuning, happens to be received. The example includes (absolute luminance) tuning for different TV PB_D's the brightest regions only (i.e., above Lmin communicated as the relevant demarcator by the creation side) while keeping the darks equal on all different PB_D displays. The vertical axis is representative of display luminance x nit PB_D, i.e. luminances appropriate for rendering on any chosen PB_D display wherein the PB_D value is the highest possible luminance on any FTU curve like the dashed one for 1000 nit, and the horizontal axis is representative of luminance of the received image (i.e., to be used for all tuning). In the example, the received M_HDR image is 5000 nit PB_C. The first regime, Regime_1, corresponds in this example to the regime of darks, representative of pixels of the received M_HDR image with luminance values less than Lmin. The second regime, Regime_2, corresponds to the regime of other pixels (e.g., brights, and less bright pixels, which are not of the regime of the darks), representative of pixels of the received M_HDR image with luminance values greater than Lmin.

Referring still to FIG. 12, there is included a 5000 nit PB_C to 5000 nit PB_D TV identity transform, indicated by reference numeral 1201, since the received 5000 nit PB_C grading is already optimized for that reference display. FIG. 12 also includes a 5000 nit PB_C to 100 nit PB_D TV re-grading function or transform, indicated by reference numeral 1202. In one embodiment, the luminance mapping function (change from "Identity" HDR-to-HDR to function L_SDR=F(L_HDR)) is communicated from the creation-side to the rendering-side, e.g. as metadata associated with the communicated video images. With the re-grading function 1202, a color grader (or automated creation-side grading) specified that brightest pixels should darken according to this function specification for this kind of HDR image/scene. In addition, playing room for MIDs and BRIGHTs, i.e. where one could allocate various such object luminances in various display scenarios, is illustrated via a double-headed arrow, indicated by reference numeral 1203. Furthermore, the receiver (or rendering side TV or display) can use the display white luminance (e.g., PB_D=1000 nit) and the function shape of the HDR-to-SDR grading 1202 to obtain, as indicated via arrow 1204, the final function FTU (dashed line) to create the optimally tuned output image for rendering on a 1000 nit PB_D display (given which MDR luminances correspond to input HDR luminances). In other words, the mapping function L_MDR=F2(L_HDR) is calculated by the receiver (i.e., rendering side TV or display), but ideally based on the shape of the communicated HDR-to-SDR grading 1202 mapping function.

That is, in various more complex embodiments the display may determine the ultimate shape of this curve on various factors, e.g. which darkest black can be seen on the display, what luminance the average surround like wallpaper has in the viewing room, particular choices of the TV set maker as to how images would look beautiful because of particular properties of midtone contrast, etc., but ideally it should follow the needs of this content, e.g. as by where the bending points of the segments need to be approximately located. We see from this simple elucidating example that the content creator not only decided to keep the darkest luminances identical for HDR and LDR gradings, so normally also all in-between MDR gradings, but also that he decided that there was some important regime change half-way the brighter luminances where a luminance allocation with moderate slope changes into one of low slope (to be able to fit a relatively large range of bright luminances in a relatively small remainder upper range of the range of displayable LDR luminances), so any FTU function may want to follow this shape more or less strictly, but ideally to a certain degree by that: a) there is some second upper bending point present in the HDR-to-MDR FTU tuning curves, and b) that it is close to where it ought to be, i.e. the HDR luminance coordinate on the x-axis is close to identical for all MDR tunings, and the y-coordinate of the tuning point may vary, but ideally would closely fit the needs of this content when given the limitations at the rendering side in particular the display peak brightness, ergo would conform to a distance which correlates with at which place between the HDR PB_C and 100 nit the MDR PB_D falls, approximately. In general, a display can use the information of this point to decide with how few visually discernable luminances this content should be rendered on any MDR display, i.e. how contrasty e.g. the sunny outside region should look, when balanced with the needs of the middle regime, which might e.g. be the most important regime where the movie action occurs, ergo this may need to cover a significantly large percentage of the output luminance range for any MDR display, e.g. 30% (or an absolute luminance contrast ratio between the brightest and darkest luminance of that regime), whereby that range can depend on the total luminance range of the MDR display, because for brighter MDR displays it could be a smaller percentage.

Figure 13:
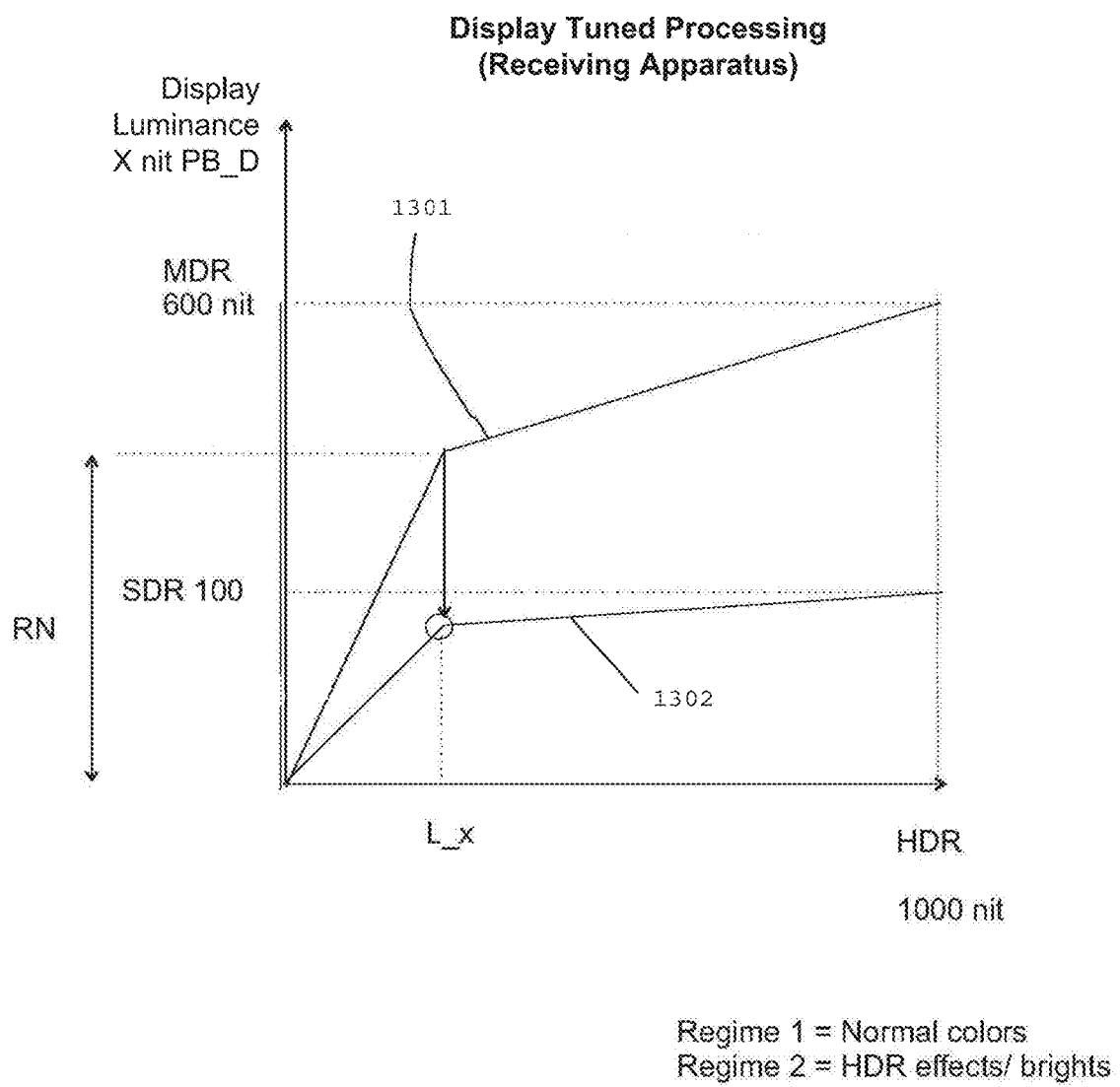
FIG. 13 schematically illustrates a plot of (re)grading mapping functions or curves of optimal image luminance for two x nit PB_D vs. PB_C luminance of a master graded high dynamic range (M_HDR) image in accordance with an embodiment of the present disclosure.

With reference now to FIG. 13, a plot is shown of (re)grading mapping functions or curves of optimal image luminance for two x nit PB_D vs. PB_C luminance of a master graded high dynamic range (M_HDR) image in accordance with an embodiment of the present disclosure, in particular, for display tune processing via a receiver apparatus. A tuning algorithm, indicated by its luminance mapping function with reference numeral 1301, for the MDR image can decide on a balance between (i) how much percentage (%) to reserve for "normal" colors (range RN) versus for bright HDR effects, depending on PB_D of the rendering-side display (e.g., 600 nit), and (ii) on L_x defining what the "normal" colors are. This shows another re-grading philosophy, in which there is not a region of pixels with the same luminance on both displays. In addition, a re-grading curve, calculated or decided via the receiver, and indicated by reference numeral 1302 for optimizing for a 100 nit LDR display is shown, which again can indicate that the most interesting information is below L_x, and above L_x corresponds with just the HDR effects. For example, the re-grading curve can map 90% of the SDR range for HDR luminances (L_HDR) below L_x, and soft-clips all L_HDR above L_x to 10% of the SDR range. For an SDR this may be what is needed for this content, because e.g. the normal colors contain important objects for which even the darker parts need to be sufficiently visible whereas the brighter pixels may be just some highlights on metal objects, but with the superior capabilities of a 600 nit display, the tuning algorithm in whatever apparatus creates the MDR image to be rendered can decide to do another optimization, corresponding with tuning function 1301.

Figure 14:
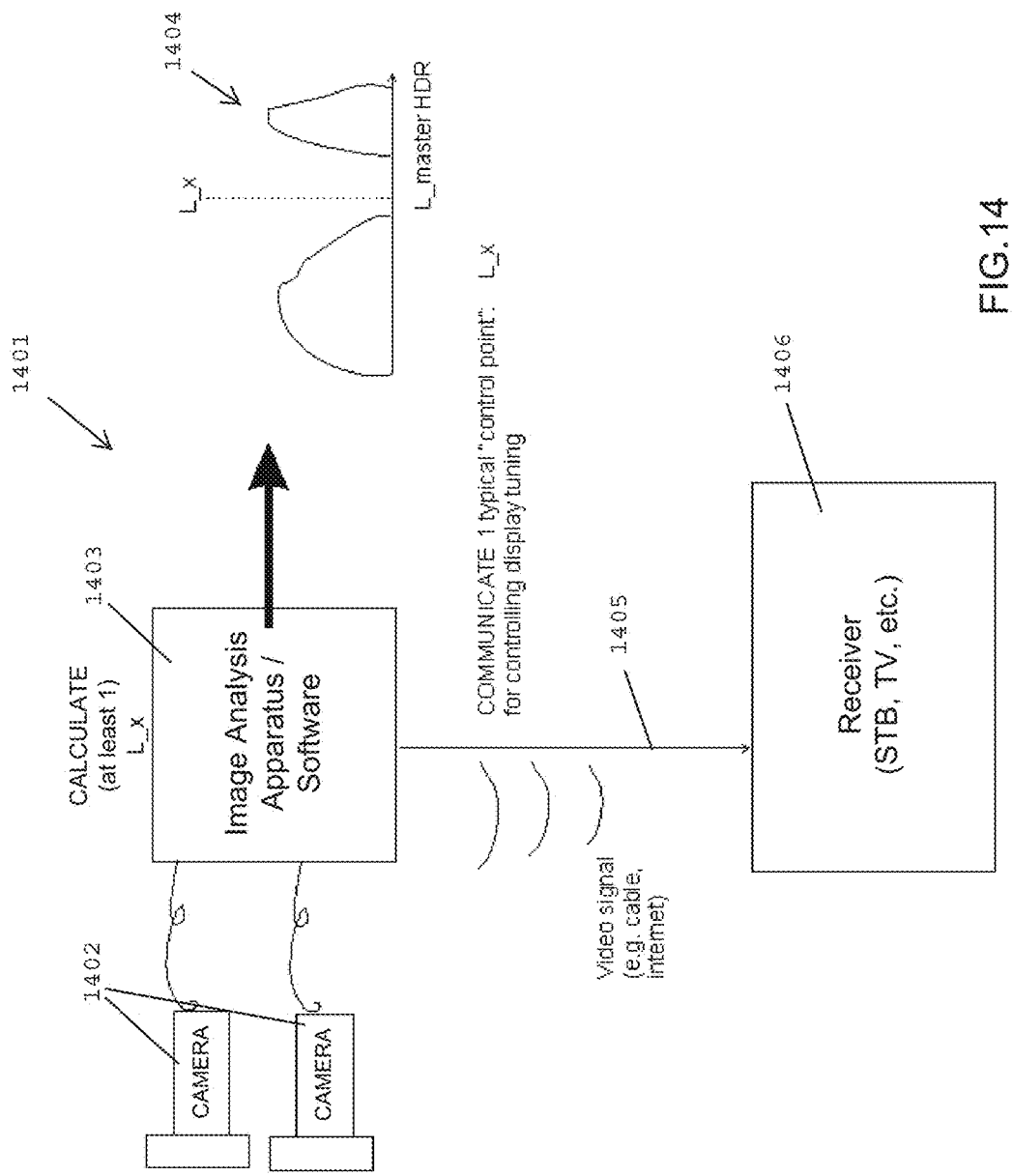
FIG. 14 schematically illustrates another environment with apparatuses and subunits allowing the creation of regimes and regime specifications.

Turning now to FIG. 14, another environment is illustrated with apparatuses and subunits allowing the creation of regimes and regime specifications. The regime creation/specification system 1401 of FIG. 14 includes one or more cameras 1402 for capturing video images and any settings used during video image capture. Cameras 1402 provide captured video images, and any image capture settings, to an analyzer unit 1403. Analyzer unit 1403 is a creation-side analyzer device, and can include for example, a portion of a production booth. Analyzer unit 1403 can also include any suitable image analysis apparatus and/or software, as discussed and disclosed earlier herein. In one embodiment, analyzer unit 1403 calculates at least one luminance value, L_x, demarcating pixels having luminance respectively above or below the at least one luminance value. In one embodiment, luminance value L_x is automatically determined with the following non-limiting embodiment assumptions: (i) no actual human SDR grade is made (i.e., not artistically precise, yielding detailed HDR-to-LDR mapping functions), just some LDR re-grading may be done or doable at a later time for the raw HDR camera capturings, which may be partially defined by some camera or production booth settings, but also largely automatic, which can be especially more suited for controlled environments like e.g. studio production, or a production in a fixed location like someone's living room or a football stadium, for which an automatic algorithm can roughly determine at least an image area of higher and lower illumination; and (ii) a study of luminance specifics of the HDR master image is performed and an interesting L_x point is derived. The study of luminance specifics can include the use of a luminance histogram, such as indicated by reference numeral 1404, and suitable analysis. The interesting L_x point can comprise, for example, an average or "upper border" of the middle range of normal brightness or "lower border" of highlights or upper of dark regime pixels. If only such a sole luminance value L_x is determined at the creation side, this is useful for system embodiments which don't actually at their side create any LDR grading, but merely communicate some scene luminances summarizing images of the raw captured scenes, e.g., some HDR or MDR image thereof, which may then be tuned according to the local needs to LDR, SDR, or other PB MDR images, by any consumption-side apparatus, solely deriving its re-grading algorithm based on the communicated L_x value.

A video signal is communicated, including descriptive data (D), as previously discussed herein, for use in specifying at least one luminance regime within the video image, via any suitable signal communication means 1405 (e.g., cable, internet, wired, wireless, etc.) to a receiver 1406 (e.g., a STB, TV, etc.) for an x nit PB_D display. The descriptive data (D) includes at least one "control point," L_x, for controlling display tuning, saying something about the luminance composition of the image(s) (or shot of N images of scene X). The control point thus provides an indication about how to re-distribute the various luminance regimes, e.g., the darkest darks versus the rest. In one embodiment, responsive to receiving the video signal and descriptive data (D), the receiver 1406 need only read the L_x parameter and perform its tuning algorithm with L_x. In another embodiment, a human grader can "correct" an auto-obtained value of L_x to a human corrected or adjusted value, L_xh, via a suitable user interface, for example, coupled to the analyzer and/or the receiver.

Figure 15:
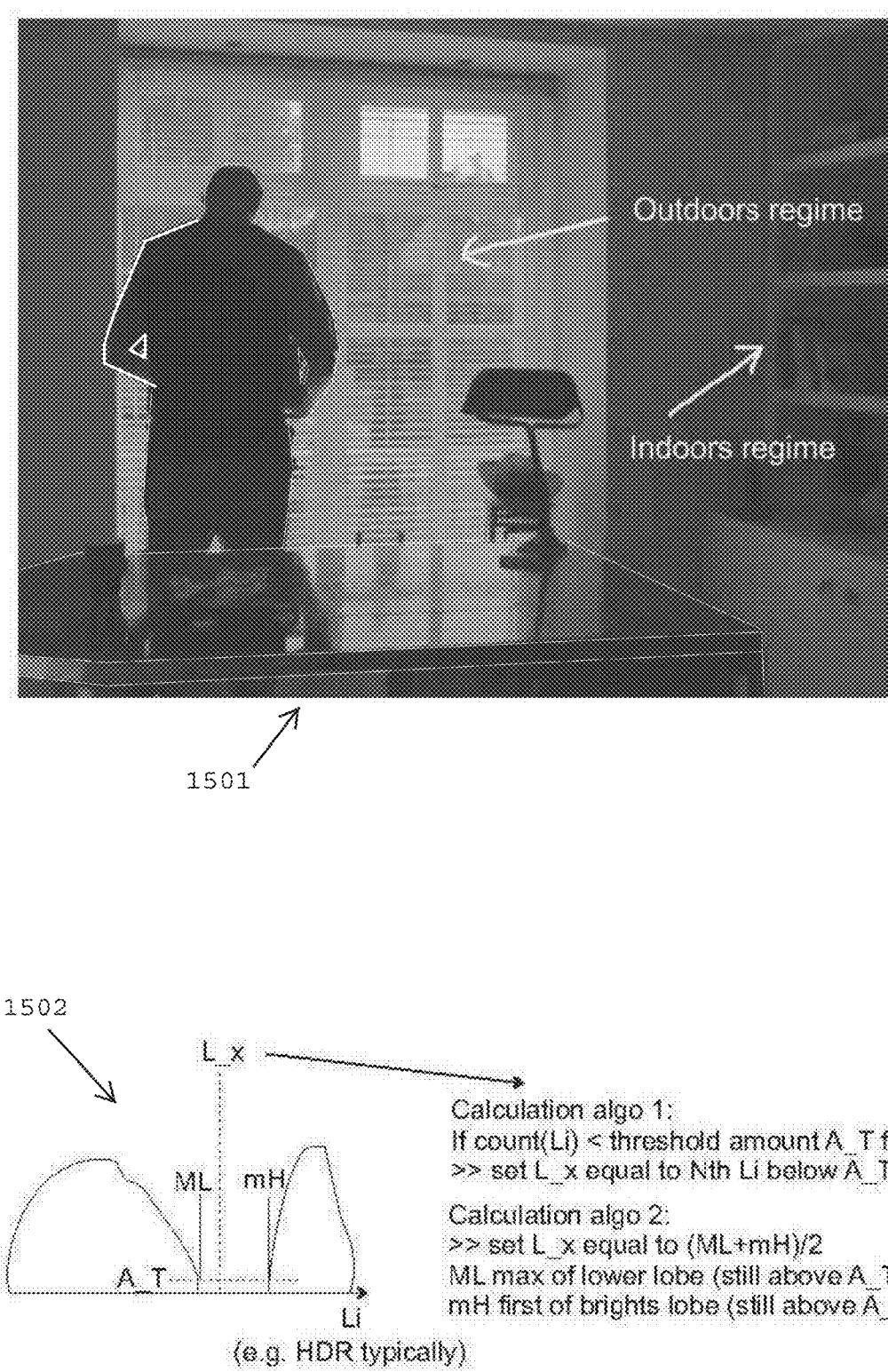
FIG. 15 schematically illustrates an image in which outdoors pixels are much brighter that any indoors pixels and wherein the method and apparatus according to the embodiments of the present disclosure use separated HDR luminances.

With reference now to FIG. 15, there is schematically illustrated an image 1501 in which outdoors pixels (corresponding to an outdoors regime) are much brighter that any indoors pixels (corresponding to an indoors regime) and wherein the method and apparatus according to the embodiments of the present disclosure use separated HDR luminances, ML and mH, as will be discussed below. If luminance lobes of two regimes are well-separated in the HDR grading, then calculation is simple. Any in-between L_x would be sufficient, that is, any L_x between HDR luminances ML and mH, e.g. (ML+MH)/2 would usually suffice, but a more precise value could be calculated taking into account the width of one or more of the lobes, and the width of the gap, e.g. the in-between L_x value lying closer to the upper lobe minimal luminance mH the wider the lobe of average, darker colors is. This principle can also be used in other embodiments, starting from a SDR (defined as 100 nit PB_C code peak brightness LDR) image(s), and needing to render HDR or MDR images, e.g., 700 nit, 1800 nit, etc. Then, in that smaller dynamic range, the brights (e.g., outdoors) may immediately start where the normal luminances (e.g., indoors) end, and the MDR generation may involve more advanced "separation" or in general representative L_x value determination. The L_x luminance determination can include the use of a luminance histogram, such as indicated by reference numeral 1502, and suitable analysis. For example, according to a first calculation algorithm (algo 1), if count (Li) is less than a threshold amount A_T for N successive Li values on the x-axis, then set L_x equal to the Nth Li below A_T. According to a second calculation algorithm (algo 2), set L_x equal to (ML+mH)/2, where ML is the maximum of the lower lobe (still above threshold A_T) and mH is the first of the upper or brights lobe (still above threshold A_T). The luminance count Li is for that of a HDR image typically. The skilled reader will understand that the details of such L_x determination don't limit the generic principle, and that alternative embodiments are of course also possible.

Figure 16:
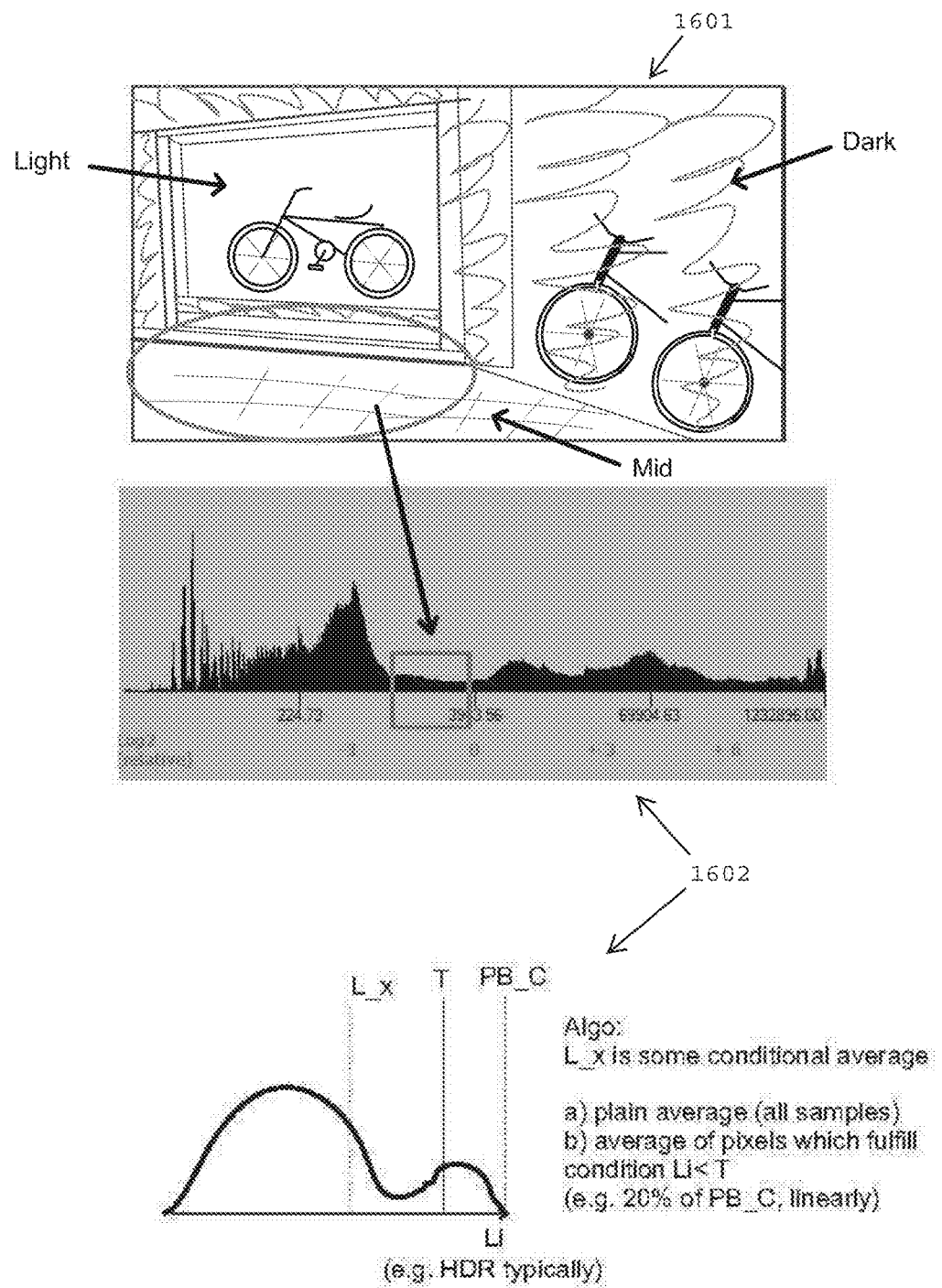
FIG. 16 schematically illustrates an image and a corresponding continuous histogram for which an average of (i) one image or (ii) shot of N images before a scene change, is determined and wherein the method and apparatus according to the embodiments of the present disclosure make use a conditional average.

Turning now to FIG. 16, an image 1601 and a corresponding continuous histogram 1602 are schematically illustrated for which an average of (i) one image or (ii) shot of N images before a scene change, is determined and wherein the method and apparatus according to the embodiments of the present disclosure make use a conditional average based upon the continuous histogram. The night scene image 1601 includes a dark outdoors (dark regime) in which bicycles are parked in a badly illuminated place, a brightly lighted indoors (light regime) of a shop window, and light (mid regime) that emanates outside the shop window onto the sidewalk. This is the physical reason why this categorical exemplary image in contrast to the previous example has a continuous histogram. A point on the floor just in front of the shop window is not that differently illuminated from a point just inside the shop, since it will almost see the same geometrical configuration of light sources, and so the local illumination will go down gradually the further away a pixel lies in the 3D scene and hence also in the 2D image from the shop window, until one ends up in very dark regions which cannot directly see the lamps, but only receive secondary reflected light from the directly illuminated pavement points. In this embodiment, the continuous histogram analysis is used, because the analysis apparatus can verify that there are no clear gaps with a number of consecutive luminances Li having zero or near zero counts, mostly for separating darks from averages. In this class of images, there can be a continuous illumination/luminance change from the brightest to the darkest part of the image (still with a luminance Li occurrence count which is below threshold A_T, but maybe not if threshold A_T too low, i.e., not A_T=+−0). The L_x luminance determination involves the use of the luminance histogram 1602, and suitable analysis. For example, according to a calculation algorithm (Algo), L_x is some conditional average. The conditional average can e.g. comprise at least one of a) a plain average (e.g., of all samples); and b) an average of pixels which fulfill the condition Li<T (e.g., 20% of PB_C, linearly). The luminance count Li is for that of a HDR image typically, although of course as was elucidated with FIG. 9 one can actually communicate the content of 5000 nit HDR images (i.e. having pixel color data enabling the rendering of perfectly looking 5000 nit images on 5000 nit PB_D displays) as e.g. 1000 nit HDR images, or potentially even 500 nit MDR images, and in that case similar histogram analysis to determine at least one suitable content-characterizing L_x value can happen on such an image similarly, e.g. even at any transcoder in an in-between location, which doesn't have access to the original master HDR image, but did receive the e.g. 500 nit MDR equivalent image thereof.

According to the embodiments of the present disclosure, a basic theory is to transmit from creation side at least one very useful representative luminance Lt (or L_x). If this is a value for a single image (or shot of N images of the same scene in a movie, with the same luminance distribution for all images) then this value can be used to tune the optimal luminance transformation function for all MDR displays, and therewith the images of this scene can be optimally tuned.

However, a representative (typical "average" grey) value for the entire movie is also very useful (not necessarily the mathematical average of all pixels, a human grader can give some best value for the movie). This is also a very useful value for the following reasons. If an HDR image contains a bright explosion, this is only experienced as bright, because it is much brighter than some other representative value (to which human vision is adapted; e.g., the average luminance of buildings in an image). In other words, if the eye was to stare for some time to a big bright explosion, it would adapt, and no longer would the explosion look very bright, but rather normal luminance.

The HDR effect (i.e., very bright or very dark) can only really significantly be rendered if compared to some typical "average" luminance value (this can also be communicated as a second meaningful content-dependent luminance Lt_2). Display tuning can then allow for a need of brighter HDR effects coming up, if currently the images are not that much brighter than the average. It could keep the present supposed to be darker images relatively dark, whatever that would optimally mean on the luminance range of any MDR display, and then the brighter scenes will have a sufficient sub-range, even on the less capable MDR displays with a smaller display luminance dynamic range, to later impressively render those bright explosion images. Therefore, one could, in simple tuning algorithms, tune only with this entire_movie Lt_2 value. However, the best algorithms take both (i) this average reference level (for the entire_movie, or at least a large part of the movie, i.e. on a longer time span, e.g. a time span during which one would assume visual adaptation to take place at least partially) and (ii) the specifics of the current image (Lt) into account, i.e., tune the MDR function shapes by both Lt and Lt_2, depending on how much the luminance statistics (one or more histogram modes) deviate from this global movie average Lt_2. One can understand it in the simpler algorithms that if the sole-Lt based function wants to bend over a certain amount (e.g., the bent maximum is 40% compared to linear continuation, the diagonal), then if one takes the image properties compared to the global Lt_2 into account, the bending becomes more, or less (e.g., 30%, or 55%), depending on the requirements of this scene, further compared to what can be rendered on this PB_D=x nit MDR display, and what this movie has as average Lt_2 (e.g., it can dim too bright scenes a little more to the average Lt_2; or: it can keep a little more boost for an explosion lobe, i.e., that part of the luminance mapping curves for the brights, etc.).

Figure 17:
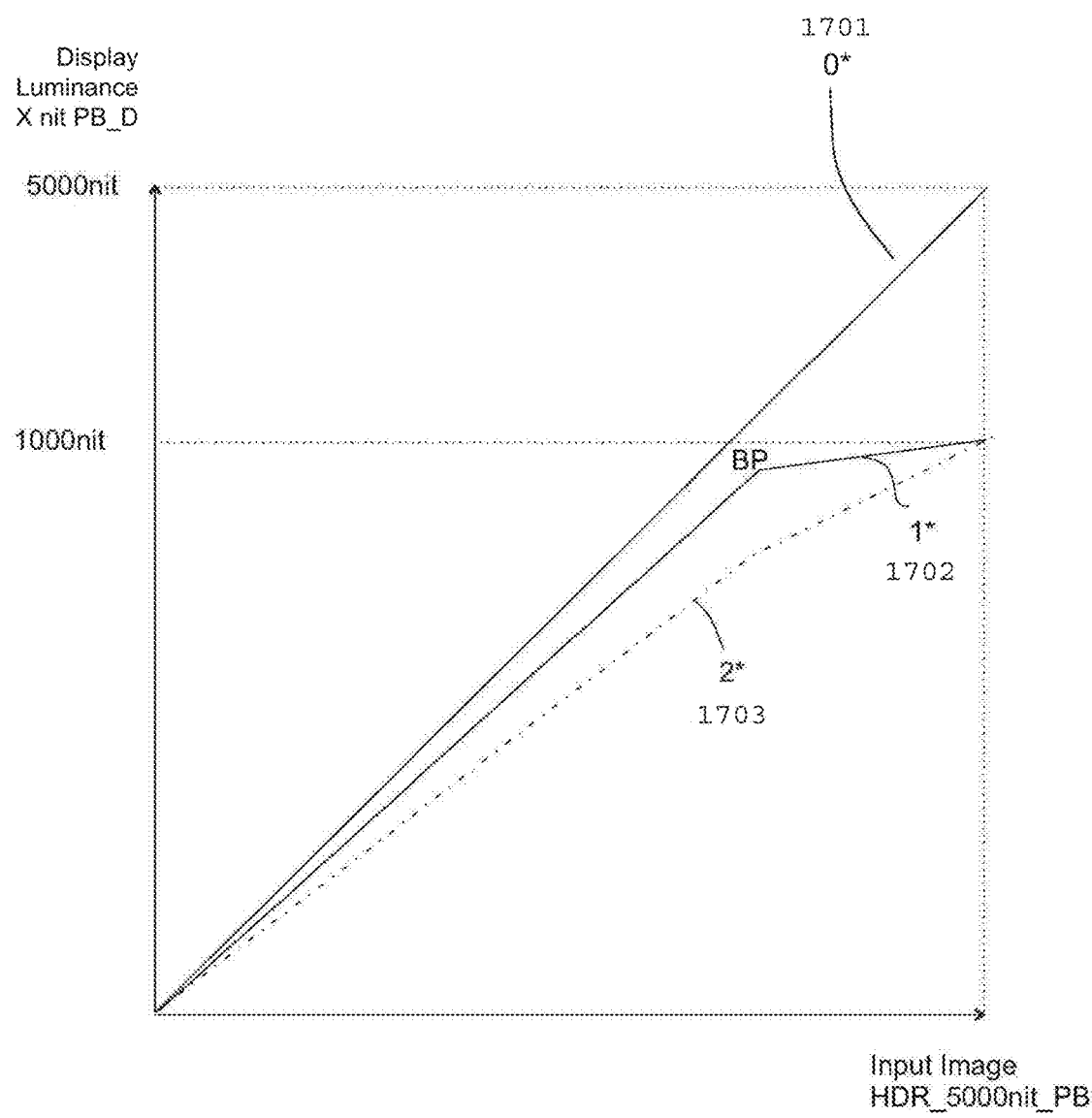
FIG. 17 schematically illustrates a plot of (re)grading mapping functions or curves of optimal image luminance for various rendering displays (x nit PB_D) vs. input image luminance of a master graded high dynamic range (M_HDR) image (HDR_5000 nit PB) in accordance with an embodiment of the present disclosure.

With reference now to FIG. 17, a plot is schematically illustrated of (re)grading mapping functions or curves of optimal image luminance for various rendering displays (x nit PB_D) vs. input image luminance of a master graded high dynamic range (M_HDR) image (HDR_5000 nit_PB) in accordance with an embodiment of the present disclosure.

A first curve, designated by reference numeral 1701, is representative of a mapping function of an optimally graded image for driving a 5000 nit PB_D display. The mapping function curve 1701 just uses all luminances as encoded in the 5000 nit PB_C input image, also referred to as an identity transform/diagonal. A second curve, designated by reference numeral 1702, is a re-grading curve for all possible luminances to derive an image for a PB_D=1000 nit display, under the assumption that no global movie representative level ("average") Lt_2 is communicated (which a content creator may decide to do, e.g. when the content is being produced live, on-the-fly), then the receiver may pretend it's a typical value, e.g., 150 nit. The fact that the curve 1702 stays high very long (close to diagonal) is controlled by a communicated Lt value (which indicates that this is a scene where there is important information to be rendered well up to the brights, e.g., houses outside in the sun seen through the window; versus a night scene with only darks and some lamps, where the bending point (BP) could be chosen lower; in general more complex mapping functions will be used, still controlled by the Lt value though). So this would be the optimal behavior for rendering such a type of HDR scene on a 1000 nit monitor, as it would show (say for an image of the type as in FIG. 15) both the indoors luminances nicely lit (not too dark, nor too bright), and the outdoors luminances impressively bright, e.g. up to 700 nit. What is of even higher luminances, may be e.g. a reflection of the sun on a car outside, and may faithfully be rendered close to the maximum possible luminance on this display of PB_D=1000 nit, which will be handled by the gently sloping upper part of curve 1702.

A third curve, designated by reference numeral 1703 (dashed-dotted curve), is the re-grading curve to be used in case a lower Lt_2 total movie reference value does get communicated, because then higher brightnesses may be too much compared to that lower reference level to which the human comfortably adapts (as one can see, most luminances, if they occur in the image, will be outputted lower than on the solid curve 1702). A similar double-control-behavior one will see is in the other downgrading curves (e.g., downgrading to 100 nit).

So to be clear, this FIG. 17 elucidates a situation where the third curve 1703 is for exactly the same rendering side limitations (e.g., the same PB_D=1000 nit, and e.g., the same viewing environment brightness, etc.), but a different characterization of the content, to which good tunings should also be adaptable. This nicely illustrates what the tuning technologies taught in this disclosure can bring beyond the classical mere coding of images solely by communicating a rectangular area of pixel colors. By additionally characterizing the communicated images by representative luminances, and in particular how the information (hence receiver-side understanding) of such a HDR scene (the totality of the luminance composition, and the use of that for display-spectrum optimized MDR re-grading) as communicated by two instead of just one characteristic luminance changes, can greatly influence how it hence should be handled. That is in fact the communication of a higher structure of the HDR scene than just a mere image of colored pixels thereof, namely the regimes of that HDR scene, and how they should be handled under any varying receiving-side situation, in particular the optimal re-grading of MDR images, for various display capabilities and/or viewing environment characteristics.

By now it should be appreciated that there has been provided a method of processing an input image signal (O) that comprises video images graded or defined in accordance with a maximum luminance value being a coding peak brightness (PB_C) of an image encoding that corresponds with an uppermost luminance of a luminance dynamic range (DR), which video images are encoded in a video transmission encoding suitable for communicating video to a video rendering-side, the video images for being processed to be rendered on one of various rendering-side video displays having different output luminance dynamic ranges defined by the uppermost luminance being a display-dependent display peak brightness (PB_D), and the processing being based on descriptive data (D) of an output description data signal (DDO) related to the video images. The method comprises extracting from an encoding of the output description data signal (DDO), the descriptive data (D) for use in specifying at least one luminance regime. The descriptive data (D) comprises at least identification information for at least one subset of pixels of an input video image. The identification information includes at least one luminance value (L_x) demarcating pixels having luminance respectively above or below the at least one luminance value (L_x). The method further comprises color processing the input image signal (O), for a particular rendering-side video display having a display peak brightness (PB_D) of the various rendering-side video displays having different output luminance dynamic ranges, to obtain an output image (IR') to be rendered based upon a color transformation processing. The color transformation processing is determined from at least (i) the display peak brightness (PB_D) of the particular rendering-side video display, and (ii) a formulation of luminance rendering as a function of at least the identification information.

In one embodiment, the descriptive data (D) further comprises regime descriptor (rd) information that encodes a luminance rendering specification for the demarcated pixels for at least one of the various rendering-side video displays having different output luminance dynamic ranges defined by respective PB_D's. In addition, the regime descriptor (rd) information comprises a parametric formulation of an intended luminance rendering as a function of at least a display peak brightness (PB_D). Furthermore, the formulation of luminance rendering further includes the parametric formulation of the intended luminance rendering. Still further, the color processing applies, in conformance with the regime descriptor (rd) information, at least one of (i) a tone mapping function and (ii) a color transformation on at least the luminance of pixels in the input video image of the at least one subset of pixels demarcated by the identification information.

In another embodiment, color processing the input image signal further includes determining a re-grading curve shape based on a first parameter of the at least one luminance value (L_x) and a second parameter of a darkest dark that the particular rendering-side video display can render just still barely visible to a viewer. In a further embodiment, the video transmission encoding comprises a legacy SDR video encoding standard selected from the group consisting of MPEG, MPEG HEVC, and MPEG AVC.

As disclosed herein, an apparatus has also been provided for processing an input image signal (O) that comprises video images graded or defined in accordance with a maximum luminance value being a coding peak brightness (PB_C) of an image encoding that corresponds with an uppermost luminance of a luminance dynamic range (DR), which video images are encoded in a video transmission encoding suitable for communicating video to a video rendering-side, the video images for being processed to be rendered on one of various rendering-side video displays having different output luminance dynamic ranges defined by the uppermost luminance being a display-dependent display peak brightness (PB_D), and the processing being based on descriptive data (D) of an output description data signal (DDO) related to the video images. The apparatus comprises an extractor and a processing unit. The extractor is adapted to extract from an encoding of the output description data signal (DDO), the descriptive data (D) specifying at least one luminance regime. The descriptive data (D) comprises at least identification information for at least one subset of pixels of an input video image, wherein the identification information includes at least one luminance value (L_x) demarcating pixels having luminance respectively above or below the at least one luminance value (L_x). The processing unit is adapted to color process the input image signal (O) for a particular rendering-side video display having a display peak brightness (PB_D) of the various rendering-side video displays having different output luminance dynamic ranges, to obtain an output image (IR') to be rendered, based upon a color transformation processing determined from at least (i) the display peak brightness (PB_D) of the particular rendering-side video display, and (ii) a formulation of luminance rendering as a function of at least the identification information.

According to another embodiment, there has been provided a method of processing an input signal including descriptive data (D) of a description data signal (DDO) representative of an original image graded or defined in accordance with a maximum luminance value being a coding peak brightness (PB_C) of an image encoding that corresponds with an uppermost luminance of a luminance dynamic range (DR) to be rendered on one of various rendering-side video displays having different output luminance dynamic ranges defined by the uppermost luminance being a display-dependent display peak brightness (PB_D). The method comprises extracting from the input signal the descriptive data (D) for use in specifying at least one luminance regime. The descriptive data (D) comprises at least identification information demarcating at least one subset of pixels of the original image included in the at least one luminance regime. The method further comprises processing the extracted descriptive data (D) to effect color rendering of an image representative of the original image in response to (i) the display peak brightness (PB_D) of a particular rendering-side video display of the various rendering-side video displays having different output luminance dynamic ranges and (ii) a formulation of luminance rendering of the at least one luminance regime as a function of at least the identification information.

In one embodiment, the descriptive data (D) further comprises regime descriptor (rd) information that encodes a luminance rendering specification for the demarcated at least one subset of pixels for at least one of the various rendering-side video displays having different output luminance dynamic ranges defined by respective PB_D's. In addition, the regime descriptor (rd) information comprises a parametric formulation of an intended luminance rendering of the at least one luminance regime as a function of at least a display peak brightness (PB_D). Furthermore, the formulation of luminance rendering further includes the parametric formulation of the intended luminance rendering. Still further, the processing further includes applying, in conformance with the regime descriptor (rd) information, at least one of (i) a tone mapping function and (ii) a color transformation on at least the luminance of pixels in the original image of the at least one subset of pixels demarcated by the identification information. In yet another embodiment, the formulation of luminance rendering further includes a parametric formulation that comprises a parameter-based re-grading curve shape based on a first parameter of the at least one luminance value (L_x) and a second parameter of a darkest dark that the particular rendering-side video display can render just still barely visible to a viewer.

As disclosed herein, another apparatus has also been provided for processing an input signal including descriptive data (D) of a description data signal (DDO) representative of an original image graded or defined in accordance with a maximum luminance value being a coding peak brightness (PB_C) of an image encoding that corresponds with an uppermost luminance of a luminance dynamic range (DR) to be rendered on one of various rendering-side video displays having different output luminance dynamic ranges defined by the uppermost luminance being a display-dependent display peak brightness (PB_D). The apparatus comprises an extractor and a processing unit. The extractor is adapted for extracting from the input signal the descriptive data (D) for use in specifying at least one luminance regime, wherein said descriptive data (D) comprises at least identification information demarcating at least one subset of pixels of the original image included in the at least one luminance regime. The processing unit is adapted to process the extracted descriptive data (D) to effect color rendering of an image representative of the original image in response to (i) the display peak brightness (PB_D) of a particular rendering-side video display of the various rendering-side video displays having different output luminance dynamic ranges and (ii) a formulation of luminance rendering of the at least one luminance regime as a function of at least the identification information.

According to yet another embodiment, there has been provided a method of adding display rendering specification information to an input image (I) of a set of video images graded or defined in accordance with a maximum luminance value being a coding peak brightness (PB_C) of an image encoding that corresponds with an uppermost luminance of a luminance dynamic range (DR), the display rendering specification information being usable by a receiving-side luminance processing apparatus to control a rendering of luminances of subsets of image pixels corresponding to at least one luminance regime subset of pixels with particular luminance values of one or more respective image(s) for various receiving-side video displays having different output luminance dynamic ranges defined by the uppermost luminance being a display-dependent display peak brightness (PB_D). The method comprises determining, via at least one of (i) an image processor, (ii) a display device, and (iii) a user interface, descriptive data (D) for use in specifying at least one luminance regime subset of pixels within the input image. The descriptive data (D) comprises at least identification information for the at least one luminance regime subset of pixels of the input image. The identification information includes at least one luminance value (L_x) demarcating pixels having luminance respectively above or below the at least one luminance value (L_x). In addition, a receiving-side luminance processing apparatus for a particular receiving-side video display of the various receiving-side video displays having different output luminance dynamic ranges can determine a luminance rendering based upon (i) the display peak brightness (PB_D) for the particular receiving-side video display and (ii) a formulation of luminance rendering of the at least one luminance regime as a function of at least the identification information. The method further comprises encoding (i) the descriptive data (D) into an output description data signal (DDO) as metadata in a video transmission encoding signal (S') suitable for communicating video to a receiving-side apparatus, and (ii) an image (O) of pixels, derived from the input image, according to a video transmission encoding definition for the video transmission encoding signal (S').

In one embodiment, the descriptive data (D) further comprises regime descriptor (rd) information that encodes a luminance rendering specification for the demarcated pixels for one of at least two possible receiving-side video displays on a basis of receiving an image which is optimal for the other one of the at least two possible receiving-side video displays having different output luminance dynamic ranges defined by respective PB_D's. In addition, the regime descriptor (rd) information comprises a parametric formulation of an intended luminance rendering as a function of at least a coding peak brightness (PB_C) of an optimal image for one of the two possible receiving-side video displays, so that a receiving-side luminance processing apparatus for a receiving-side video display can determine a final intended luminance rendering based upon (a) an actual value of display peak brightness (PB_D) for the receiving-side video display and (b) the formulation of the intended luminance rendering. Furthermore, the formulation of luminance rendering further includes the parametric formulation of the intended luminance rendering. Still further, the regime descriptor (rd) information further comprises at least one or more of a regime parameter and a regime function, wherein the at least one or more of the regime parameter and the regime function are configured for effecting changes in luminance properties of a rendered image on the receiving-side video display. Encoding further comprises encoding the at least one or more of the regime parameter and the regime function into the output description data signal (DDO).

In yet another embodiment, the formulation of luminance rendering further includes a parametric formulation that comprises a parameter-based re-grading curve shape based on a first parameter of the at least one luminance value (L_x) and a second parameter of a darkest dark that a particular rendering-side video display should render just still barely visible to a viewer. In another embodiment, the video transmission encoding comprises a legacy SDR video encoding standard selected from the group consisting of MPEG, MPEG HEVC, and MPEG AVC. In one embodiment, the identification information for the at least one luminance regime subset of pixels of the input image is further based upon a luminance histogram of at least a portion of the input image. In a further embodiment, the identification information for the at least one luminance regime subset of pixels of the input image is further based upon an average light level over a number of N images before a scene change in the set of video images.

In yet another embodiment, the descriptive data (D) further includes specifications on how to map at least one subset of luminance values of the input image to a sub-range of luminance values of the display peak brightness (PB_D) of the receiving-side video display. In another embodiment, the different output luminance dynamic ranges comprise at least two of a high dynamic range (HDR), a low dynamic range (LDR), and dynamic ranges other than that HDR or LDR. In another embodiment, the descriptive data (D) is encoded into the output description data signal (DDO) as metadata.

Still further, according to another embodiment, a non-transitory computer-readable medium has been provided. The computer-readable medium is embodied with instructions executable by a processor for causing the processor to perform the method for adding display rendering specification information to an input image (I) from a set of video images. As disclosed, the display rendering specification information is usable by a receiving-side luminance processing apparatus to control a rendering of luminances of subsets of image pixels corresponding to at least one luminance regime subset of pixels with particular luminance values of respective image(s) for various receiving-side video displays having different output luminance dynamic ranges defined by an uppermost luminance being a display-dependent display peak brightness (PB_D).

As additionally disclosed herein, an image analysis apparatus has been provided for adding display rendering specification information to an input image (I) of a set of video images graded or defined in accordance with a maximum luminance value being a coding peak brightness (PB_C) of an image encoding that corresponds with an uppermost luminance of a luminance dynamic range (DR). The display rendering specification information is usable by a receiving-side luminance processing apparatus to control a rendering of luminances of subsets of image pixels corresponding to at least one luminance regime subset of pixels with particular luminance values of one or more respective image(s) for various receiving-side video displays having different output luminance dynamic ranges defined by the uppermost luminance being a display-dependent display peak brightness (PB_D). The apparatus comprises an image processor and an encoder.

The image processor is configured to determine descriptive data (D) for use in specifying at least one luminance regime subset of pixels within the input image, wherein the descriptive data (D) comprises at least identification information for the at least one subset of pixels of the input image. The identification information includes at least one luminance value (L_x) demarcating pixels having luminance respectively above or below the at least one luminance value (L_x). In addition, a receiving-side luminance processing apparatus for a particular receiving-side video display of the various receiving-side video displays having different output luminance dynamic ranges can determine a luminance rendering based upon (i) the display peak brightness (PB_D) for the particular receiving-side video display and (ii) a formulation of luminance rendering of the at least one luminance regime as a function of at least the identification information.

The encoder is configured to encode (i) the descriptive data (D) into an output description data signal (DDO) in a video transmission encoding signal (S') suitable for communicating video to a receiving-side apparatus, and (ii) an image (O) of pixels, derived from the input image, according to a video transmission encoding definition for the video transmission encoding signal (S').

According to one embodiment, the descriptive data (D) further comprises regime descriptor (rd) information that encodes a luminance rendering specification for the demarcated pixels for one of at least two possible receiving-side video displays on a basis of receiving an image which is optimal for the other one of the at least two possible receiving-side video displays having different output luminance dynamic ranges defined by respective PB_D's. In addition, the regime descriptor (rd) information comprises a parametric formulation of an intended luminance rendering as a function of at least a coding peak brightness (PB_C) of an optimal image for one of the two possible receiving-side video displays, so that a receiving-side luminance processing apparatus for a receiving-side video display can determine a final intended luminance rendering based upon (i) an actual value of display peak brightness (PB_D) for the receiving-side video display and (ii) the formulation of the intended luminance rendering.

In addition, the formulation of luminance rendering further includes the parametric formulation of the intended luminance rendering. Furthermore, the regime descriptor (rd) information comprises at least one or more of a regime parameter and a regime function, wherein the at least one or more of the regime parameter and the regime function are configured for effecting changes in luminance properties of a rendered image on the receiving-side video display. Still further, the encoder is configured to encode the at least one or more of the regime parameter and the regime function into the output description data signal (DDO). In one embodiment, the descriptive data (D) is encoded into the output description data signal (DDO) as metadata.

As disclosed herein, the algorithmic components of the various embodiments of the present disclosure may, whether entirely or in part, be realized in practice as hardware (e.g., parts of an application specific integrated circuit or ASIC, or similar) or as software running on a special digital signal processor, or a generic processor, etc.

It should be understandable to the skilled person from the various embodiments of the present disclosure that various components may be optional improvements and can be realized in combination with other various components, and how (e.g., optional) steps of methods correspond to respective means of apparatuses, and vice versa. The word "apparatus" in this application is used in its broadest sense, namely a group of means allowing the realization of a particular objective, and can hence, e.g., be (a small part of) an integrated circuit (IC), or a dedicated appliance (such as, an appliance with a display), or part of a networked system, etc. "Arrangement" is also intended to be used in the broadest sense, so it may comprise, inter alia, a single apparatus, a part of an apparatus, a collection of (i.e., parts of) cooperating apparatuses, etc.

The computer program product denotation should be understood to encompass any physical realization of a collection of commands or instructions enabling a generic or special purpose processor, after a series of loading steps (which may include intermediate conversion steps, such as translation to an intermediate language, and a final processor language) to enter the commands into the processor, and to execute any of the characteristic functions according to one or more embodiments of the present disclosure. In particular, the computer program product may be realized as data embodied on a carrier such as, e.g., a non-transitory computer-readable disk or tape, data present in a memory, data traveling via a network connection (wired or wireless), or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, the present disclosure has, for conciseness, not mentioned all these options in-depth. Apart from combinations of elements of the invention as combined in the claims, other combinations of the elements are possible. Any combination of elements can be realized in a single dedicated element.

Any reference sign between parentheses in a claim is not intended for limiting the claim. The word "comprising" does not exclude the presence of elements or aspects not listed in a claim. The word "a" or "an" preceding an element does not exclude the presence of a plurality of such elements.

The invention claimed is:

1. A method of processing (i) an input image signal (O) that comprises video images, the video images having been graded or defined in accordance with a maximum luminance value, the maximum luminance value being a coding peak brightness (PB_C) of an image encoding, wherein the coding peak brightness corresponds with an uppermost luminance of a luminance dynamic range (DR), the video images further having been encoded in a video transmission encoding suitable for communicating video to a video rendering-side, the video images for being processed to be rendered on one of various rendering-side video displays, the various rendering-side video displays having different output luminance dynamic ranges, wherein a respective output luminance dynamic range is defined by an uppermost luminance output that corresponds with a display-dependent display peak brightness (PB_D) of a respective rendering-side video display of the various rendering-side video displays, and (ii) an output description data signal (DDO) that comprises descriptive data (D) related to the video images, said method comprising:

extracting the descriptive data (D) from an encoding of the output description data signal (DDO), wherein the descriptive data (D) specifies at least one luminance regime and comprises, for each respective at least one luminance regime, at least identification information for at least one subset of pixels of an input video image of the video images, wherein the identification information includes at least one luminance value (L_x) demarcating pixels having luminance respectively above or below the at least one luminance value (L_x); and color processing the input image signal (O), for a particular rendering-side video display having a respective display-dependent display peak brightness (PB_D) of the various rendering-side video displays having different output luminance dynamic ranges, to obtain an output image (IR') to be rendered based upon a color transformation processing determined from at least (i) the respective display-dependent display peak brightness (PB_D) of the particular rendering-side video display, and (ii) a formulation of luminance rendering as a function of at least the identification information.

2. The method according to claim 1, wherein the descriptive data (D) further comprises regime descriptor (rd) information that encodes a luminance rendering specification for the demarcated pixels for at least one of the various rendering-side video displays having different output luminance dynamic ranges defined by respective PB_D's, wherein the regime descriptor (rd) information comprises a parametric formulation of an intended luminance rendering as a function of at least a display peak brightness (PB_D), wherein the formulation of luminance rendering further includes the parametric formulation of the intended luminance rendering, and wherein the color processing further applies, in conformance with the regime descriptor (rd) information, at least one of (i) a tone mapping function and (ii) a color transformation on at least the luminance of pixels in the input video image of the at least one subset of pixels demarcated by the identification information.

3. The method according to claim 1, wherein color processing the input image signal further includes determining a re-grading curve shape or mapping function of optimal image luminance based on (i) a first parameter of the at least one luminance value (L_x) and (ii) a second parameter of a darkest dark of a respective output luminance dynamic range that the particular rendering-side video display can render just still barely visible to a viewer.

4. The method according to claim 1, wherein the video transmission encoding comprises a legacy SDR video encoding standard selected from the group consisting of MPEG, MPEG HEVC, and MPEG AVC.

5. An apparatus for processing (i) an input image signal (O) that comprises video images, the video images having been graded or defined in accordance with a maximum luminance value, the maximum luminance value being a coding peak brightness (PB_C) of an image encoding, wherein the coding peak brightness corresponds with an uppermost luminance of a luminance dynamic range (DR), the video images further having been encoded in a video transmission encoding suitable for communicating video to a video rendering-side, the video images for being processed to be rendered on one of various rendering-side video displays, the various rendering-side video displays having different output luminance dynamic ranges, wherein a respective output luminance dynamic range is defined by an uppermost luminance output that corresponds with a display-dependent display peak brightness (PB_D) of a respective rendering-side video display of the various rendering-side video displays, and (ii) an output description data signal (DDO) that comprises descriptive data (D) related to the video images, said apparatus comprising:

an extractor adapted to extract the descriptive data (D) from an encoding of the output description data signal (DDO), wherein the descriptive data (D) specifies at least one luminance regime and comprises, for each respective at least one luminance regime, at least identification information for at least one subset of pixels of an input video image of the video images, wherein the identification information includes at least one luminance value (L_x) demarcating pixels having luminance respectively above or below the at least one luminance value (L_x); and a processing unit adapted to color process the input image signal (O), for a particular rendering-side video display having a respective display-dependent display peak brightness (PB_D) of the various rendering-side video displays having different output luminance dynamic ranges, to obtain an output image (IR') to be rendered, based upon a color transformation processing determined from at least (i) the respective display-dependent display peak brightness (PB_D) of the particular rendering-side video display, and (ii) a formulation of luminance rendering as a function of at least the identification information.

6. The apparatus according to claim 5, wherein the descriptive data (D) further comprises regime descriptor (rd) information that encodes a luminance rendering specification for the demarcated pixels for at least one of the various rendering-side video displays having different output luminance dynamic ranges defined by respective PB_D's, wherein the regime descriptor (rd) information comprises a parametric formulation of an intended luminance rendering as a function of at least a display peak brightness (PB_D), wherein the formulation of luminance rendering further includes the parametric formulation of the intended luminance rendering, and wherein the processing unit is further adapted to apply, in conformance with the regime descriptor (rd) information, at least one of (i) a tone mapping function and (ii) a color transformation on at least the luminance of pixels in the input video image of the at least one subset of pixels demarcated by the identification information.

7. The apparatus according to claim 5, wherein color processing the input image signal further includes determining re-grading curve shape or mapping function of optimal image luminance based on (i) a first parameter of the at least one luminance value (L_x) and (ii) a second parameter of a darkest dark of a respective output luminance dynamic range that the particular rendering-side video display can render just still barely visible to a viewer.

8. The apparatus according to claim 5, wherein the video transmission encoding comprises a legacy SDR video encoding standard selected from the group consisting of MPEG, MPEG HEVC, and MPEG AVC.

9. A method of processing an input signal including descriptive data (D) of a description data signal (DDO) representative of an original image having been graded or defined in accordance with a maximum luminance value, the maximum luminance value being a coding peak brightness (PB_C) of an image encoding, wherein the coding peak brightness corresponds with an uppermost luminance of a luminance dynamic range (DR), the original image to be rendered on one of various rendering-side video displays, the various rendering-side video displays having different output luminance dynamic ranges, wherein a respective output luminance dynamic range is defined by an uppermost luminance output that corresponds with a display-dependent display peak brightness (PB_D) of a respective rendering-side video display of the various rendering-side video displays, the method comprising:
  extracting the descriptive data (D) from the input signal, wherein said descriptive data (D) specifies at least one luminance regime and comprises, for each respective at least one luminance regime, at least identification information demarcating at least one subset of pixels of the original image included in the at least one luminance regime; and
  processing the extracted descriptive data (D), for a particular rendering-side video display having a respective display-dependent display peak brightness (PB_D) of the various rendering-side video displays having different output luminance dynamic ranges, to effect color rendering of an image representative of the original image in response to (i) the respective display-dependent display peak brightness (PB_D) of the particular rendering-side video display of the various rendering-side video displays having different output luminance dynamic ranges and (ii) a formulation of luminance rendering of the at least one luminance regime as a function of at least the identification information.

10. The method according to claim 9, wherein the descriptive data (D) further comprises regime descriptor (rd) information that encodes a luminance rendering specification for the demarcated at least one subset of pixels for at least one of the various rendering-side video displays having different output luminance dynamic ranges defined by respective PB_D's, wherein the regime descriptor (rd) information comprises a parametric formulation of an intended luminance rendering of the at least one luminance regime as a function of at least a display peak brightness (PB_D), wherein the formulation of luminance rendering further includes the parametric formulation of the intended luminance rendering, and wherein processing further includes applying, in conformance with the regime descriptor (rd) information, at least one of (i) a tone mapping function and (ii) a color transformation on at least the luminance of pixels in the original image of the at least one subset of pixels demarcated by the identification information.

11. The method according to claim 9, wherein the formulation of luminance rendering further includes a parametric formulation that comprises a parameter-based re-grading curve shape or mapping function of optimal image luminance based on (i) a first parameter of at least one luminance value (L_x) demarcating pixels having luminance respectively above or below the at least one luminance value (L_x), and (ii) a second parameter of a darkest dark of a respective output luminance dynamic range that the particular rendering-side video display can render just still barely visible to a viewer.

12. The method according to claim 9, wherein the video transmission encoding comprises a legacy SDR video encoding standard selected from the group consisting of MPEG, MPEG HEVC, and MPEG AVC.

13. An apparatus for processing an input signal including descriptive data (D) of a description data signal (DDO) representative of an original image having been graded or defined in accordance with a maximum luminance value, the maximum luminance value being a coding peak brightness (PB_C) of an image encoding, wherein the coding peak brightness corresponds with an uppermost luminance of a luminance dynamic range (DR), the original image to be rendered on one of various rendering-side video displays, the various rendering-side video displays having different output luminance dynamic ranges, wherein a respective output luminance dynamic range is defined by an uppermost luminance output that corresponds with a display-dependent display peak brightness (PB_D) of a respective rendering-side video display of the various rendering-side video displays, the apparatus comprising:
  an extractor for extracting the descriptive data (D) from the input signal, wherein said descriptive data (D) specifies at least one luminance regime and comprises, for each respective at least one luminance regime, at least identification information demarcating at least one subset of pixels of the original image included in the at least one luminance regime; and
  a processing unit adapted to process the extracted descriptive data (D), for a particular rendering-side video display having a respective display-dependent display peak brightness (PB_D) of the various rendering-side video displays having different output luminance dynamic ranges, to effect color rendering of an image representative of the original image in response to (i) the respective display-dependent display peak brightness (PB_D) of the particular rendering-side video display of the various rendering-side video displays having different output luminance dynamic ranges and (ii) a formulation of luminance rendering of the at least one luminance regime as a function of at least the identification information.

14. The apparatus according to claim 13, wherein the descriptive data (D) further comprises regime descriptor (rd) information that encodes a luminance rendering specification for the demarcated at least one subset of pixels for at least one of the various rendering-side video displays having different output luminance dynamic ranges defined by respective PB_D's, wherein the regime descriptor (rd) information comprises a parametric formulation of an intended luminance rendering of the at least one luminance regime as a function of at least a display peak brightness (PB_D), wherein the formulation of luminance rendering further includes the parametric formulation of the intended luminance rendering, and wherein the processing unit is further adapted to apply, in conformance with the regime descriptor (rd) information, at least one of (i) a tone mapping function and (ii) a color transformation on at least the luminance of pixels in the original image of the at least one subset of pixels demarcated by the identification information.

15. The apparatus according to claim 13, wherein the formulation of luminance rendering further includes a parametric formulation that comprises a parameter-based re-grading curve shape or mapping function of optimal image luminance based on (i) a first parameter of at least one luminance value (L_x) demarcating pixels having luminance respectively above or below the at least one luminance value (L_x), and (ii) a second parameter of a darkest dark of a respective output luminance dynamic range that the particular rendering-side video display can render just still barely visible to a viewer.

16. The apparatus according to claim 13, wherein the video transmission encoding comprises a legacy SDR video encoding standard selected from the group consisting of MPEG, MPEG HEVC, and MPEG AVC.

17. A method of adding display rendering specification information to an input image (I) of a set of video images, the video images having been graded or defined in accordance with a maximum luminance value, the maximum luminance value being a coding peak brightness (PB_C) of an image encoding, wherein the coding peak brightness corresponds with an uppermost luminance of a luminance dynamic range (DR), the display rendering specification information being usable by a receiving-side luminance processing apparatus to control a rendering of luminances of subsets of image pixels corresponding to at least one luminance regime subset of pixels with particular luminance values of one or more respective image(s) for various receiving-side video displays, the various receiving-side video displays having different output luminance dynamic ranges, wherein a respective output luminance dynamic range is defined by an uppermost luminance output that corresponds with a display-dependent display peak brightness (PB_D) of a respective receiving-side video display of the various receiving-side video displays, the method comprising:
  determining, via at least one of (i) an image processor, (ii) a display device, and (iii) a user interface, descriptive data (D) for use in specifying at least one luminance regime subset of pixels within the input image, wherein the descriptive data (D) comprises at least identification information for each respective at least one luminance regime subset of pixels of the input image, wherein the identification information includes at least one luminance value (L_x) demarcating pixels having luminance respectively above or below the at least one luminance value (L_x), wherein a receiving-side luminance processing apparatus for a particular receiving-side video display of the various receiving-side video displays having different output luminance dynamic ranges can determine a luminance rendering based upon (i) the respective display-dependent display peak brightness (PB_D) for the particular receiving-side video display and (ii) a formulation of luminance rendering of the at least one luminance regime as a function of at least the identification information; and
  encoding (i) the descriptive data (D) into an output description data signal (DDO) as metadata in a video transmission encoding signal (S') suitable for communicating video to the receiving-side luminance processing apparatus, and (ii) an image (O) of pixels, derived from the input image, according to a video transmission encoding definition for the video transmission encoding signal (S').

18. The method according to claim 17, wherein the descriptive data (D) further comprises regime descriptor (rd) information that encodes a luminance rendering specification for the demarcated pixels for one of at least two possible receiving-side video displays on a basis of receiving an image which is optimal for the other one of the at least two possible receiving-side video displays having different output luminance dynamic ranges defined by respective PB_D's, wherein the regime descriptor (rd) information comprises a parametric formulation of an intended luminance rendering as a function of at least a coding peak brightness (PB_C) of an optimal image for one of the two possible receiving-side video displays, so that a receiving-side luminance processing apparatus for a receiving-side video display can determine a final intended luminance rendering based upon (a) an actual value of display peak brightness (PB_D) for the receiving-side video display and (b) the formulation of the intended luminance rendering, wherein the formulation of luminance rendering further includes the parametric formulation of the intended luminance rendering, and wherein the regime descriptor (rd) information further comprises at least one or more of a regime parameter and a regime function, further wherein the at least one or more of the regime parameter and the regime function are configured for effecting changes in luminance properties of a rendered image on the receiving-side video display, and wherein encoding further comprises encoding the at least one or more of the regime parameter and the regime function into the output description data signal (DDO).

19. The method according to claim 17, wherein the formulation of luminance rendering further includes a parametric formulation that comprises a parameter-based re-grading curve shape or mapping function of optimal image luminance based on at least a parameter of the at least one luminance value (L_x).

20. The method according to claim 17, wherein the video transmission encoding comprises a legacy SDR video encoding standard selected from the group consisting of MPEG, MPEG HEVC, and MPEG AVC.

21. The method according to claim 17, wherein the identification information for the at least one luminance regime subset of pixels of the input image is further based upon a luminance histogram of at least a portion of the input image.

22. The method according to claim 17, wherein the identification information for the at least one luminance regime subset of pixels of the input image is further based upon an average light level over a number of N images before a scene change in the set of video images.

23. The method according to claim 17, wherein the descriptive data (D) further includes specifications on how to map at least one subset of luminance values of the input image to a sub-range of luminance values of the display peak brightness (PB_D) of the receiving-side video display.

24. The method according to claim 17, wherein the different output luminance dynamic ranges comprise at least two of a high dynamic range (HDR), a low dynamic range (LDR), and dynamic ranges other than that HDR or LDR.

25. A non-transitory computer-readable medium embodied with instructions executable by a processor for causing the processor to perform the method of claim 17, for adding display rendering specification information to an input image (I) from a set of video images, the display rendering specification information being usable by a receiving-side luminance processing apparatus to control a rendering of luminances of subsets of image pixels corresponding to at least one luminance regime subset of pixels with particular luminance values of respective image(s) for various receiving-side video displays having different output luminance dynamic ranges defined by an uppermost luminance being a display-dependent display peak brightness (PB_D).

26. An image analysis apparatus for adding display rendering specification information to an input image (I) of a set of video images, the video images having been graded or defined in accordance with a maximum luminance value, the maximum luminance value being a coding peak brightness (PB_C) of an image encoding, wherein the coding peak brightness corresponds with an uppermost luminance of a luminance dynamic range (DR), the display rendering specification information being usable by a receiving-side luminance processing apparatus to control a rendering of luminances of subsets of image pixels corresponding to at least one luminance regime subset of pixels with particular luminance values of one or more respective image(s) for various receiving-side video displays, the various receiving-side video displays having different output luminance dynamic ranges, wherein a respective output luminance dynamic range is defined by an uppermost luminance output that corresponds with a display-dependent display peak brightness (PB_D) of a respective receiving-side video display of the various receiving-side video displays, the apparatus comprising:

an image processor configured to determine descriptive data (D) for use in specifying at least one luminance regime subset of pixels within the input image, wherein the descriptive data (D) comprises at least identification information for each respective at least one luminance regime subset of pixels of the input image, wherein the identification information includes at least one luminance value (L_x) demarcating pixels having luminance respectively above or below the at least one luminance value (L_x), wherein a receiving-side luminance processing apparatus for a particular receiving-side video display of the various receiving-side video displays having different output luminance dynamic ranges can determine a luminance rendering based upon (i) the respective display-dependent display peak brightness (PB_D) for the particular receiving-side video display and (ii) a formulation of luminance rendering of the at least one luminance regime as a function of at least the identification information; and an encoder configured to encode (i) the descriptive data (D) into an output description data signal (DDO) in a video transmission encoding signal (S') suitable for communicating video to the receiving-side luminance processing apparatus, and (ii) an image (O) of pixels, derived from the input image, according to a video transmission encoding definition for the video transmission encoding signal (S').

27. The apparatus according to claim 26, wherein the descriptive data (D) further comprises regime descriptor (rd) information that encodes a luminance rendering specification for the demarcated pixels for one of at least two possible receiving-side video displays on a basis of receiving an image which is optimal for the other one of the at least two possible receiving-side video displays having different output luminance dynamic ranges defined by respective PB_D's, wherein the regime descriptor (rd) information comprises a parametric formulation of an intended luminance rendering as a function of at least a coding peak brightness (PB_C) of an optimal image for one of the two possible receiving-side video displays, so that a receiving-side luminance processing apparatus for a receiving-side video display can determine a final intended luminance rendering based upon (i) an actual value of display peak brightness (PB_D) for the receiving-side video display and (ii) the formulation of the intended luminance rendering, wherein the formulation of luminance rendering further includes the parametric formulation of the intended luminance rendering, and wherein the regime descriptor (rd) information comprises at least one or more of a regime parameter and a regime function, further wherein the at least one or more of the regime parameter and the regime function are configured for effecting changes in luminance properties of a rendered image on the receiving-side video display, and wherein the encoder is further configured to encode the at least one or more of the regime parameter and the regime function into the output description data signal (DDO).

28. The apparatus according to claim 26, wherein the formulation of luminance rendering further includes a parametric formulation that comprises a parameter-based re-grading curve shape or mapping function of optimal image luminance based on at least a parameter of the at least one luminance value (L_x).

29. The apparatus according to claim 26, wherein the video transmission encoding comprises a legacy SDR video encoding standard selected from the group consisting of MPEG, MPEG HEVC, and MPEG AVC.

30. The apparatus according to claim 26, wherein the identification information for the at least one luminance regime subset of pixels of the input image is further based upon a luminance histogram of at least a portion of the input image.

31. The apparatus according to claim 26, wherein the identification information for the at least one luminance regime subset of pixels of the input image is further based upon an average light level over a number of N images before a scene change in the set of video images.

32. The apparatus according to claim 26, wherein the descriptive data (D) further includes specifications on how to map at least one subset of luminance values of the input image to a sub-range of luminance values of the display peak brightness (PB_D) of the receiving-side video display.

33. The apparatus according to claim 26, wherein the different output luminance dynamic ranges comprise at least two of a high dynamic range (HDR), a low dynamic range (LDR), and dynamic ranges other than that HDR or LDR.

34. The apparatus according to claim 26, wherein the descriptive data (D) encoded into the output description data signal (DDO) is metadata.

* * * * *